(12) United States Patent
Okuyama et al.

(10) Patent No.: US 7,910,252 B2
(45) Date of Patent: *Mar. 22, 2011

(54) HYDROGEN SUPPLY SYSTEM

(75) Inventors: Ryoichi Okuyama, Kyoto (JP);
Yoshihiro Yamamoto, Kyoto (JP);
Masashi Motoi, Kyoto (JP); Katsuji Ashida, Kyoto (JP)

(73) Assignee: GS Yuasa Corporation, Kyoto-Shi, Kyoto (JP)

( * ) Notice: Subject to any disclaimer, the term of this patent is extended or adjusted under 35 U.S.C. 154(b) by 1044 days.

This patent is subject to a terminal disclaimer.

(21) Appl. No.: 10/594,711

(22) PCT Filed: Mar. 30, 2005

(86) PCT No.: PCT/JP2005/006735
§ 371 (c)(1),
(2), (4) Date: Sep. 28, 2006

(87) PCT Pub. No.: WO2005/095264
PCT Pub. Date: Oct. 13, 2005

(65) Prior Publication Data
US 2008/0090125 A1 Apr. 17, 2008

(30) Foreign Application Priority Data

Mar. 31, 2004 (JP) .................................. 2004-107932
Nov. 26, 2004 (JP) .................................. 2004-342471

(51) Int. Cl.
*H01M 8/10* (2006.01)
*H01M 8/06* (2006.01)
*C25B 9/00* (2006.01)

(52) U.S. Cl. ..................... 429/416; 429/400; 429/422

(58) Field of Classification Search ............ 429/400, 429/416, 422
See application file for complete search history.

(56) References Cited

U.S. PATENT DOCUMENTS 4,846,950 A * 7/1989 Yao et al. .................... 204/229.2
2002/0036147 A1 * 3/2002 Lehmann et al. ............. 205/343
(Continued)

FOREIGN PATENT DOCUMENTS
EP 0438902 * 7/1991
(Continued)

OTHER PUBLICATIONS

"Chemical Reaction," Online Britannica Encyclopedia. Accessed Mar. 26, 2010, http://www.search.eb.com/eb/print?tocID=277189&fullArticle=false.*

(Continued)

*Primary Examiner* — Dah-Wei D Yuan
*Assistant Examiner* — Amanda Barrow
(74) *Attorney, Agent, or Firm* — Manabu Kanesaka

(57) ABSTRACT

A hydrogen supply system includes at least a hydrogen supply device for supplying hydrogen to a hydrogen storing device, and a hydrogen generating device producing hydrogen containing gas to be supplied to the hydrogen supply device. The hydrogen generating device produces the hydrogen containing gas by decomposing a fuel containing an organic compound, and includes a partition membrane, a fuel electrode provided on one surface of the partition membrane for generating hydrogen containing gas, a device for supplying a fuel containing the organic compound and water to the fuel electrode, an oxidizing electrode provided on the other surface of the partition membrane, a device for supplying an oxidizing agent to the oxidizing electrode, and a device for collecting the hydrogen containing gas directly from the fuel electrode.

19 Claims, 37 Drawing Sheets

U.S. PATENT DOCUMENTS

| | | | |
|---|---|---|---|
| 2003/0062268 A1* | 4/2003 | Kosek et al. | 205/637 |
| 2003/0132097 A1* | 7/2003 | Kenet et al. | 203/11 |
| 2003/0205482 A1* | 11/2003 | Allen | 205/630 |
| 2003/0226763 A1 | 12/2003 | Narayanan et al. | |

FOREIGN PATENT DOCUMENTS

| | | |
|---|---|---|
| JP | H06-73583 A | 3/1994 |
| JP | H11-229167 A | 8/1999 |
| JP | 2001-297779 A | 10/2001 |
| JP | 3328993 B2 | 7/2002 |
| JP | 3360349 B2 | 10/2002 |

OTHER PUBLICATIONS

Ye et al., "Electrochemical Reactions in a DMFC under Open-Circuit Conditions," Electrochemical and Solid-State Letters, 8 (1) A52-A54 (2005).*

Electrochemical Reactions in a DMFC under Open-circuit conditions; Q. Ye, T. S. Zhao, H. Yang, and J. Prabhuram; Manuscript submitted Jul. 17, 2004; revised manuscript received Atugut 28, 2004; Available electronically Nov. 29, 2004; pp. A52 to A54.

* cited by examiner

HYDROGEN SUPPLY SYSTEM

TECHNICAL FIELD

The present invention relates to a hydrogen supply system for supplying hydrogen to a hydrogen storing tank for supplying hydrogen to hydrogen storing means such as a hydrogen storage container loaded on a fuel cell automobile, a fuel cell automobile and the like.

Recently, as measures for problems of environment and natural resources, development of an electric automobile is actively pursued. As a fuel cell automobile, a fuel cell automobile loading a container storing hydrogen in the form of a hydrogen gas or a hydrogen storage alloy is being developed, but an important problem in its spread is improvement of hydrogen supply infrastructure. That is, how to improve the wide-area hydrogen supply infrastructure for freely running fuel cell automobiles is the problem. Then, a system in which a utility gas or a liquid fuel (desulfurized naphtha, gasoline, lamp oil, diesel oil, methanol, etc.) is steam-reformed by a reforming device at a hydrogen supply station and is stored in a hydrogen storage tank, and the hydrogen is supplied to a hydrogen storage container loaded on a fuel cell automobile is the most actively developed since it has a merit that an existing infrastructure such as a utility gas piping network, a gas station and the like can be utilized at the maximum (See Patent Documents 1 to 4, for example).

However, the above hydrogen supply system has problems that the reforming device is expensive, the device size is large or maintenance and operation thereof is complicated and requires an advanced technology.

[Patent Document 1] Japanese Unexamined Patent Application Publication No. 2002-315111

[Patent Document 2] Japanese Unexamined Patent Application Publication No. 2002-337999

[Patent Document 3] Japanese Unexamined Patent Application Publication No. 2003-118548

[Patent Document 4] Japanese Unexamined Patent Application Publication No. 2004-79262

Also, as the reforming device, development of a reforming device of methanol with the lowest reforming temperature is advanced, and three methods of steam reforming, partial oxidization reforming and reforming using both are employed (See Non-Patent Document 1), but in any reforming method, in order to produce a hydrogen containing gas, reforming should be carried out at a temperature as high as 200° C. or more, and there are problems of poisoning of reforming catalyst, removal of CO contained in the reformed gas (gas including hydrogen), mixture of nitrogen in the air into the reformed gas obtained by partial oxidization reform or reform using the both methods.

[Non-patent Document 1] "Development and Practical Application of Solid Polymer type Fuel Cell", PP 141 to 166, May 28, 1999, issued by Technical Information Institute, Co., Ltd.

On the other hand, such a system in which water is electrically decomposed to generate hydrogen instead of reforming a fuel containing an organic compound as above, this is stored in a hydrogen storage tank and this hydrogen is supplied to a hydrogen storage container loaded on a fuel cell automobile is under development (See Patent Documents 5 and 6, for example).

According to this system, though a high temperature to reform a fuel containing an organic compound is not needed, there is a problem that a large volume of electric power is required.

[Patent Document 5] Japanese Unexamined Patent Application Publication No. 2002-161998

[Patent Document 6] Japanese Unexamined Patent Application Publication No. 2002-363779

Moreover, an invention of a method for generating hydrogen by electrochemical reaction (See Patent Documents 7, 9) and an invention of a fuel cell using hydrogen generated by an electrochemical method (See Patent Documents 8 to 10) are also known.

[Patent Document 7] Japanese Patent Publication No. 3328993

[Patent Document 8] Japanese Patent Publication No. 3360349

[Patent Document 9] U.S. Pat. Nos. 6,299,744, 6,368,492, 6,432,284, 6,533,919, and United States Patent Publication No. 2003/0226763

[Patent Document 10] Japanese Unexamined Patent Application Publication No 2001-297779

Patent Document 7 cited above describes (claim 1), "a method for generating hydrogen comprising providing a pair of electrodes on the two opposite surfaces of a cation exchange membrane, contacting a fuel containing at least methanol and water with one electrode having a catalyst, applying a voltage between the pair of electrodes so that electrons are withdrawn from the electrodes thereby causing a reaction to occur on the electrodes whereby hydrogen ions are generated from methanol and water, and allowing hydrogen ions to be converted on the other electrode, being supplied with electrons, into hydrogen molecules." The same patent document discloses another method (paragraphs [0033] to [0038]) for selectively generating hydrogen using a conversion system, the method comprising supplying water or water vapor together with methanol which serves as a fuel, providing a voltage via an external circuit to cause electrons to be withdrawn from a fuel electrode, so that reaction represented by $CH_3OH+2H_2O \rightarrow CO_2+6e^-+6H^+$ occurs on the fuel electrode, and allowing hydrogen ions thus produced to pass through a cation exchange membrane to reach the opposite electrode where the hydrogen ions undergo reaction represented by $6H^++6e^- \rightarrow 3H_2$. Patent Document 8 cited above describes (paragraphs [0052] to [0056]) a fuel cell which utilizes hydrogen generated by a method as described above.

According to the inventions described in Patent document 7 (paragraph [0042]) and Patent Document 8 (paragraph [0080]) cited above, it is possible to generate hydrogen at a low temperature. However, the methods described in those inventions are obviously different from the hydrogen generating device used in the hydrogen supply system of the present invention which will be given below in following points: those methods require the application of voltage, and hydrogen is generated on the electrode opposite to the electrode (fuel electrode) to which fuel is supplied, and no oxidizing agent is supplied to the opposite electrode.

This holds true also for the inventions disclosed by Patent Document 9 cited above similarly to Patent Documents 7 and 8 cited above. Those inventions use a system for generating hydrogen where protons generated on anode 112 serving as fuel electrode pass through partition membrane 110 to reach cathode 114 opposite to the anode, and according to the system, voltage from DC power source 120 is applied between anode (fuel electrode) and cathode (opposite electrode) to decompose organic fuel such as methanol or the like electrochemically. In addition, hydrogen is generated on the electrode opposite to the fuel electrode, and no oxidizing agent is supplied to the opposite electrode.

Patent Document 10 cited above discloses a fuel cell system incorporating a hydrogen generating device. According to the disclosure (claim 1) of the invention, "Liquid fuel containing alcohol and water is supplied to porous electrode 1 (fuel electrode), air is supplied to gas diffusion electrode 2 (oxidizing agent-applied electrode) opposite to electrode 1, and a load is inserted between a terminal leading to porous electrode 1 and another terminal leading to gas diffusion electrode 2 to achieve electric connection allowing a positive voltage to be applied to porous electrode 1 via the load from gas diffusion electrode 2 which corresponds to the positive electrode of MEA2 capable of acting as a conventional fuel cell." The same patent document further adds (paragraph [0007]), "As a result, alcohol reacts with water to produce carbon dioxide gas and hydrogen ion, the hydrogen ion passes through an electrolyte membrane 5 to reach a gas diffusion electrode 6 located centrally where the hydrogen ion is converted into hydrogen gas. On the opposite surface of gas diffusion electrode 6 in contact with another electrolyte layer 7, there arises another electrode reaction where hydrogen gas is reconverted into hydrogen ion, and hydrogen ions migrate through electrolyte layer 7 to reach another gas diffusion electrode 2 where hydrogen ions react with oxygen in air to produce water." Thus, with this system, electric energy generated by a fuel cell is utilized to generate hydrogen on the hydrogen generating electrode (gas diffusion electrode 6) which is then supplied to the fuel cell. Moreover, the system is the same with those described in the patent documents 7 to 9 in that hydrogen is generated on the electrode opposite to the fuel electrode.

There are some other known methods for generating hydrogen (See Patent Documents 11 and 12). According to the inventions, a reaction system with a partition membrane is used where anode (electrode A) and cathode (electrode B) are placed opposite to each other with a proton conducting membrane (ion conductor) inserted therebetween, and where alcohol (methanol) is oxidized with or without concomitant application of voltage, or with concomitant uptake of electric energy. All those methods, however, are based on a method whereby alcohol is oxidized by means of an electrochemical cell (the reaction product includes carbonic diester, formalin, methyl formate, dimethoxymethane, etc.), and not on a method whereby alcohol is converted by reduction into hydrogen."

[Patent Document 11] Japanese Unexamined Patent Application Publications No. 6-73582 (claims 1 to 3, paragraph [0050])

[Patent Document 12] Japanese Unexamined Patent Application Publications No. 6-73583 (claims 1 and 8, paragraphs [0006] and [0019])

DISCLOSURE OF THE INVENTION

With a view to give a solution to the above problems, the present invention aims to provide a hydrogen supply system using a hydrogen generating device which can easily supply hydrogen to a hydrogen storage tank for supplying hydrogen to hydrogen storing means such as a hydrogen storage container loaded on a fuel cell automobile, a fuel cell automobile, etc., for example and can produce a hydrogen containing gas at a low temperature and moreover, a large electric energy is not needed.

Proposed to give a solution to the problems, the present invention can be reduced to following constitutive elements.

(1) A hydrogen supply system provided with at least hydrogen supply means for supplying hydrogen to hydrogen storing means and a hydrogen generating device producing hydrogen containing gas to be supplied to the hydrogen supply means, wherein the hydrogen generating device produces the hydrogen containing gas by decomposing a fuel containing an organic compound and comprises a partition membrane, a fuel electrode provided on one surface of the partition membrane, means for supplying a fuel containing the organic compound and water to the fuel electrode, an oxidizing electrode provided on the other surface of the partition membrane, means for supplying an oxidizing agent to the oxidizing electrode, and means for collecting the hydrogen containing gas from the fuel electrode.

(2) The hydrogen supply system according to the above (1), wherein the hydrogen storing means is a hydrogen storage container loaded on a fuel cell automobile.

(3) The hydrogen supply system according to the above (1), wherein the hydrogen generating device is an open circuit having neither means for withdrawing electric energy to outside from a hydrogen generating cell constituting the hydrogen generating device, nor means for providing electric energy from outside to the hydrogen generating cell.

(4) The hydrogen supply system according to the above (1) or (2), wherein the hydrogen generating device has means for withdrawing electric energy to outside with the fuel electrode serving as a negative electrode and the oxidizing electrode as a positive electrode.

(5) The hydrogen supply system according to the above (1) or (2), wherein the hydrogen generating device has means for providing electric energy from outside with the fuel electrode serving as cathode and the oxidizing electrode as anode.

(6) The hydrogen supply system according to the above (1) or (2), wherein two or more of hydrogen generating devices selected from a group consisting of a hydrogen generating device, which is an open circuit having neither means for withdrawing electric energy to outside from a hydrogen generating cell, nor means for providing electric energy from outside to the hydrogen generating cell, a hydrogen generating device having means for withdrawing electric energy to outside with the fuel electrode serving as a negative electrode and the oxidizing electrode as a positive electrode, and a hydrogen generating device having means for providing electric energy from outside with the fuel electrode serving as cathode and the oxidizing electrode as anode are combined in use.

(7) The hydrogen supply system according to the above (1) or (2), wherein voltage between the fuel electrode and the oxidizing electrode is 200 to 1000 mV in the hydrogen generating device.

(8) The hydrogen supply system according to the above (3), wherein voltage between the fuel electrode and the oxidizing electrode is 300 to 800 mV in the hydrogen generating device.

(9) The hydrogen supply system according to the above (4), wherein voltage between the fuel electrode and the oxidizing electrode is 200 to 600 mV in the hydrogen generating device.

(10) The hydrogen supply system according to the above (4) or (9), wherein voltage between the fuel electrode and the oxidizing electrode and/or the evolution volume of hydrogen-containing gas are/is adjusted by varying the volume of electric energy withdrawn from the hydrogen generating device.

(11) The hydrogen supply system according to the above (5), wherein voltage between the fuel electrode and the oxidizing electrode is 300 to 1000 mV in the hydrogen generating device.

(12) The hydrogen supply system according to the above (5) or (11), wherein voltage between the fuel electrode and the oxidizing electrode and/or the evolution volume of hydrogen-containing gas are/is adjusted by varying the volume of electric energy provided in the hydrogen generating device.

(13) The hydrogen supply system according to any of the above (1) to (12), wherein the evolution volume of hydrogen-containing gas is adjusted by varying voltage between the fuel electrode and the oxidizing electrode in the hydrogen generating device.

(14) The hydrogen supply system according to any of the above (1) to (13), wherein voltage between the fuel electrode and the oxidizing electrode and/or the evolution volume of hydrogen-containing gas are/is adjusted by varying the supply volume of the oxidizing agent in the hydrogen generating device.

(15) The hydrogen supply system according to any of the above (1) to (14), wherein voltage between the fuel electrode and the oxidizing electrode and/or the evolution volume of hydrogen-containing gas are/is adjusted by varying the concentration of the oxidizing agent in the hydrogen generating device.

(16) The hydrogen supply system according to any of the above (1) to (15), wherein voltage between the fuel electrode and the oxidizing electrode and/or the evolution volume of hydrogen-containing gas are/is adjusted by varying the supply volume of fuel containing an organic compound and water in the hydrogen generating device.

(17) The hydrogen supply system according to any of the above (1) to (16), wherein voltage between the fuel electrode and the oxidizing electrode and/or the evolution volume of hydrogen-containing gas are/is adjusted by varying the concentration of fuel containing an organic compound and water in the hydrogen generating device.

(18) The hydrogen supply system according to any of the above (1) to (17), wherein the operation temperature of the hydrogen generating device is not higher than 100° C.

(19) The hydrogen supply system according to the above (18), wherein the operation temperature is between 30 and 90° C.

(20) The hydrogen supply system according to any of the above (1) to (19), wherein the organic compound supplied to the fuel electrode of the hydrogen generating device is one or two or more organic compounds selected from a group consisting of alcohol, aldehyde, carboxyl acid and ether.

(21) The hydrogen supply system according to the above (20), wherein the alcohol is methanol.

(22) The hydrogen supply system according to any of the above (1) to (21), wherein the oxidizing agent supplied to the oxidizing electrode of the hydrogen generating device is an oxygen-containing gas or oxygen.

(23) The hydrogen supply system according to the above (22), wherein the oxidizing agent supplied to the oxidizing electrode of the hydrogen generating device is an exhaust air exhausted from the hydrogen generating device.

(24) The hydrogen supply system according to any of the above (1) to (21), wherein the oxidizing agent supplied to the oxidizing electrode of the hydrogen generating device is a liquid containing hydrogen peroxide solution.

(25) The hydrogen supply system according to any of the above (1) to (24), wherein the partition membrane of the hydrogen generating device is a proton conducting solid electrolyte membrane.

(26) The hydrogen supply system according to the above (25), wherein the proton conducting solid electrolyte membrane is a perfluorocarbon sulfonate-based solid electrolyte membrane.

(27) The hydrogen supply system according to any of the above (1) to (26), wherein a catalyst of the fuel electrode of the hydrogen generating device is made of platinum-ruthenium alloy supported by carbon powder serving as a base.

(28) The hydrogen supply system according to any of the above (1) to (27), wherein a catalyst of the oxidizing electrode of the hydrogen generating device is made of platinum supported by carbon powder serving as a base.

(29) The hydrogen supply system according to any of the above (1) to (28), wherein means for circulating fuel containing an organic compound and water is provided at the hydrogen generating device.

(30) The hydrogen supply system according to any of the above (1) to (29), wherein a carbon dioxide absorbing portion for absorbing carbon dioxide contained in the generated hydrogen-containing gas is provided at the hydrogen generating device.

(31) The hydrogen supply system according to any of the above (1) to (30), wherein a hydrogen permeable film is provided at the outlet of the hydrogen-containing gas of the hydrogen generating device.

(32) The hydrogen supply system according to any of the above (1) to (31), wherein an insulating material for insulating a heat generated by the hydrogen generating device is not provided.

Here, the hydrogen generating device used in the hydrogen supply system in the above (3) to (5) has the means for supplying the fuel and the oxidizing agent to the hydrogen generating cell constituting the hydrogen generating device, and as this means, a pump, a blower or the like can be used. Besides that, in the case of the above (4), the discharge control means for withdrawing electric energy from the hydrogen generating cell is provided, and in the case of the above (5), the electrolytic means for providing the electric energy to the hydrogen generating cell is provided. The case of the above (3) is an open circuit having neither discharge control means for withdrawing electric energy from the hydrogen generating cell, nor electrolyte means for providing electric energy from outside to the hydrogen generating cell. And the hydrogen generating device used in the hydrogen supply system in the above (1) or (2) includes the hydrogen generating device used in the hydrogen supply system in the above (3) to (5). Moreover, these hydrogen generating device have a function to control the supply volume or concentration of the fuel and the oxidizing agent and the electric energy to be withdrawn (in the case of the above (4)) or the electric energy to be provided (in the case of the above (5)) by monitoring the voltage of the hydrogen generating cell and/or the evolution volume of hydrogen-containing gas. The basic construction of the hydrogen generating cell constituting the hydrogen generating device is that the fuel electrode is provided on one surface of the partition membrane, a structure for supplying the fuel to the fuel electrode, while the oxidizing electrode is provided on the other surface of the partition membrane, a structure for supplying the oxidizing agent to the oxidizing electrode.

Also, the fuel cell automobile is not limited to those obtaining a driving force of the vehicle only by a fuel cell but includes a hybrid car also using another power source.

EFFECT OF THE INVENTION

Since the hydrogen supply system of the present invention uses the hydrogen generating device which can reform the fuel at 100° C. or less from a room temperature, which is extremely lower than the conventional reforming temperature, both time required for start and energy amount to raise the temperature of a reformer can be reduced. Also, such effects are exerted that an insulating material for insulating a heat generated by the reforming device can be made unnecessary, and hydrogen can be supplied easily to a hydrogen storage tank for supplying hydrogen to hydrogen storing means such as a hydrogen storage container loaded on a fuel cell automobile, a fuel cell automobile or the like, for example.

Moreover, since the hydrogen-containing gas generated from the hydrogen generating device does not contain CO, a CO removing device is not needed.

The hydrogen generating device used in the hydrogen supply system of the present invention can generate hydrogen without supplying the electric energy from the outside to the hydrogen generating cell, but even if the means for withdrawing the electric energy is provided, or the means for providing the electric energy from the outside is provided, hydrogen can be generated.

If the means for withdrawing the electric energy is provided, the electric energy can be used for operating the pump, blower or other auxiliary machines, and its effect is great in terms of effective utilization of energy.

Even if the means for providing the electric energy from the outside is provided, by supplying a small amount of electric energy from the outside to the hydrogen generating cell, hydrogen larger than the inputted electric energy can be generated, which is another effect.

Moreover, in any case, a process control is made possible by monitoring the voltage of the hydrogen generating cell and/or the evolution volume of the hydrogen-containing gas, the size of the hydrogen generating device can be reduced, which can also reduce the manufacturing costs of the hydrogen supply system.

REFERENCE NUMERALS

Figure 1:
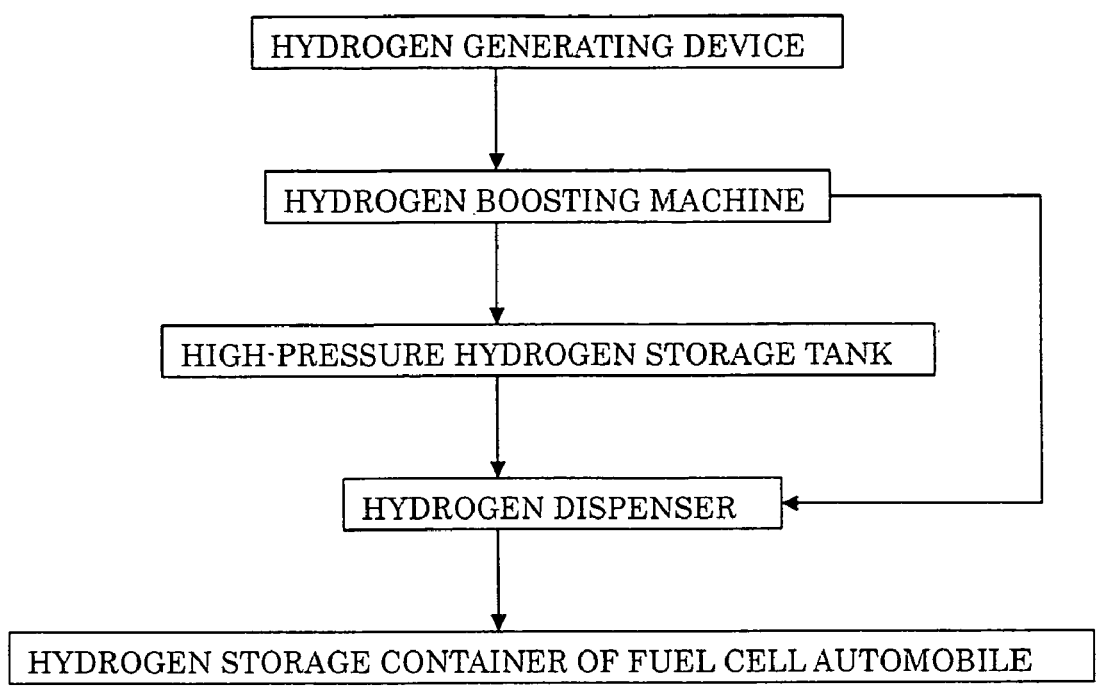
FIG. 1(a) is a diagram for showing an example of a system flow of a hydrogen supply system of the invention.
FIG. 1(b) is a schematic diagram for showing an example of a hydrogen generating device used in the hydrogen supply system of the invention.
Figure 1:
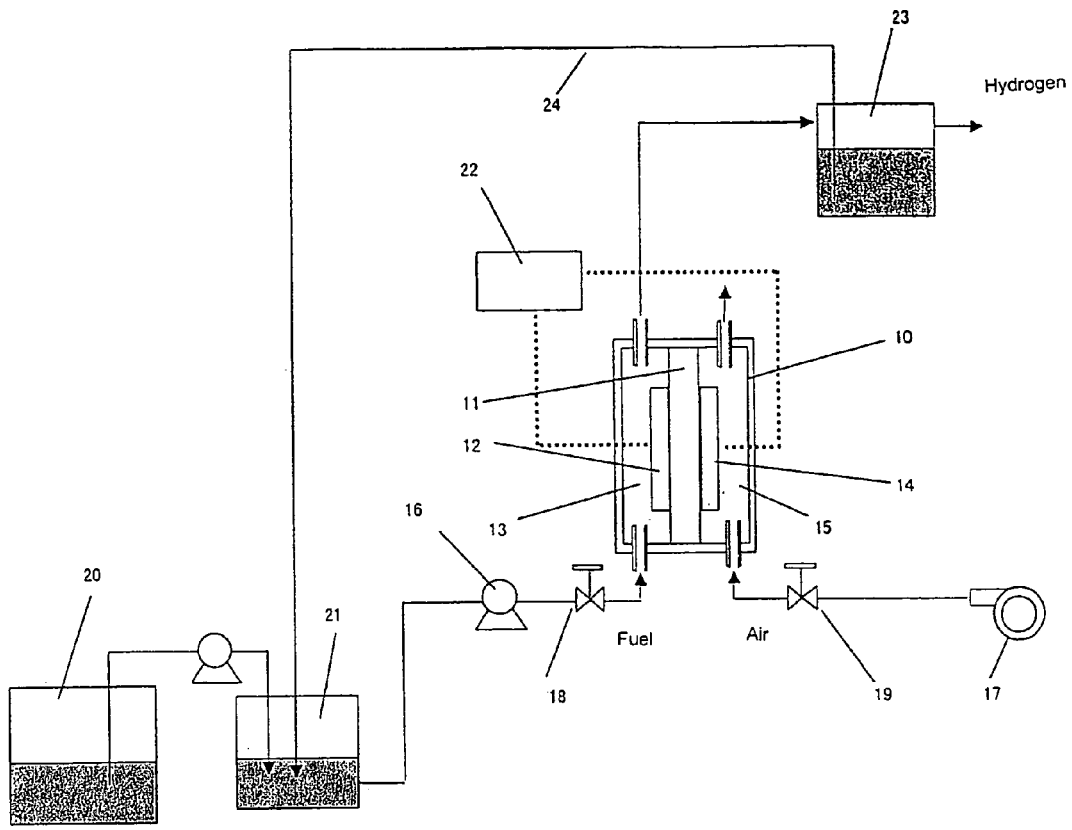

10. Hydrogen generating cell
11. Partition membrane
12. Fuel electrode
13. Feed channel for supplying fuel containing organic compound and water (aqueous solution of methanol)
14. Oxidizing electrode (air electrode)
15. Feed channel for supplying oxidizing agent (air)
16. Fuel pump
17. Air blower
18. Fuel flow control valve
19. Air flow control valve
20. Fuel tank
21. Fuel control vessel
22. Voltage controller
23. Gas/liquid separator
24. Guide tube

BEST MODE FOR CARRYING OUT THE INVENTION

The most preferred embodiments in the execution of the present invention will be illustrated below.

The hydrogen generating device used in the hydrogen supply system of the invention is basically novel, and the embodiments thereof described herein are given only for the illustrative representation of the invention, and not for limiting the scope of the invention.

The basic construction of the hydrogen supply system of the invention comprises, if the hydrogen storing means is a hydrogen storage container loaded on a fuel cell automobile, hydrogen supply means for supplying hydrogen to the hydrogen storage container and a hydrogen generating device for generating a hydrogen containing gas to be supplied to the hydrogen supply means.

FIG. 1(*a*) shows an example of a system flow of the hydrogen supply system of the invention.

The hydrogen supply means for supplying hydrogen to the hydrogen storage container loaded on the fuel cell automobile comprises, for example, a hydrogen booster machine, a high-pressure hydrogen storage tank, and a hydrogen dispenser.

As the hydrogen booster machine, a hydrogen compression pump is generally used, but any device can be used only if the pressure of hydrogen can be boosted. The hydrogen gas pressure at the hydrogen booster outlet is preferably higher in view of a volume efficiency, preferably at 50 atmospheric pressure (5 MPa) or more, more preferably at 100 atmospheric pressure (10 MPa) or more or further preferably at 200 atmospheric pressure (20 MPa) or more. An upper limit is not particularly limited, but 1000 atmospheric pressure (100 MPa) or less is preferable.

After the hydrogen-pressure boosting process, a hydrogen storage tank (high-pressure hydrogen storage tank) is preferably provided for storing hydrogen. As the high-pressure hydrogen storage tank, its form is not particularly limited only if it can withstand the boosted hydrogen, and a publicly known device can be used. Besides a high-pressure hydrogen storage tank for storing a high-pressure hydrogen gas as it is, a high-pressure hydrogen storage tank incorporating a hydrogen storage alloy can be used.

The hydrogen gas is guided to the hydrogen dispenser from the high-pressure hydrogen storage tank. Alternatively, the outlet gas of the hydrogen booster can be directly guided to the hydrogen dispenser without going through the high-pressure hydrogen storage tank. In that case, a piping is provided for connecting the hydrogen boosting machine to the hydrogen dispenser.

The hydrogen dispenser is to supply a hydrogen gas to the hydrogen storage container of the fuel cell automobile using hydrogen as a fuel, and a publicly known dispenser can be used. This hydrogen storage container may be a hydrogen storage container as loaded on a fuel cell automobile, and if this container can be removed from the fuel cell automobile, it may be the hydrogen storage container in the state removed from the fuel cell automobile.

One example of the hydrogen generating device used in the hydrogen supply system of the invention is shown in FIG. 1(*b*). This hydrogen generating device has a hydrogen generating cell (10) and auxiliary components for driving the hydrogen generating device.

Since the hydrogen generating device operates at a low temperature, it is not necessary to provide a heater to raise the temperature as shown in FIG. 1(b), the heater may be provided as necessary.

Structurally, the hydrogen generating cell (10) comprises a fuel electrode (12) provided on one surface of a partition membrane (11), a feed channel (13) through which fuel containing an organic compound and water (aqueous solution of methanol) is supplied to the fuel electrode (12), an oxidizing electrode (14) provided on the other surface of partition membrane (11), and another feed channel (15) through which an oxidizing agent (air) is supplied to the oxidizing electrode (14).

Auxiliary components for supporting the operation of the hydrogen generating system comprise a fuel pump (16) for supplying the aqueous solution of methanol to fuel electrode (12) and an air blower for supplying air to oxidizing electrode (14).

The feed channel (13) to fuel electrode is connected via a guide tube operation through a flow control valve (18) to fuel pump (16). The feed channel (15) to oxidizing electrode is connected via a guide tube operation through a flow control valve (19) to air blower (17).

Fuel (100% methanol) is stored in a fuel tank (20). Fuel is transferred to a fuel control vessel (21) where fuel is mixed with water to give, for example, about 3% aqueous solution of methanol. The aqueous solution is then supplied to fuel electrode (12).

Also, if two or more hydrogen generating devices are used in combination, as air to be supplied to the oxidizing electrode (14) of one of the hydrogen generating cells (10), an exhaust air exhausted from the other hydrogen generating cell (10) can be used.

According to the hydrogen generating system configured as described above, when electric energy is supplied to fuel pump (16) and air blower (17) to drive them into action, and flow control valve (18) is opened, by virtue of the activated fuel pump (16), the aqueous solution of methanol is transported from fuel control vessel (21) through channel (13) to fuel electrode (12). On the other hand, when the flow control valve (19) is opened, by virtue of the activated air blower, air is transported through channel (15) to oxidizing electrode (14).

As a result of the aforementioned operation, reactions as described below will occur on the fuel electrode and on the oxidizing (air) electrode which will result in the generating of hydrogen-containing gas on the fuel electrode (12).

The evolution volume of hydrogen-containing gas is adjusted by providing a voltage controller (22) for monitoring the voltage (open-circuit voltage or operation voltage) of hydrogen generating cell (10), and by controlling as appropriate the supply volume or concentration of fuel and air, or the magnitude of electric energy withdrawn from or provided to the cell based on the monitor result.

Hydrogen-containing gas is allowed to pass through a gas/liquid separator (23) so that hydrogen-containing gas is separated from unreacted aqueous solution of methanol, and part or all of the unreacted aqueous solution of methanol may be returned to fuel control vessel (21) by means of a circulating means comprising a guide tube (24). In certain cases as needed, water may be supplied from outside to the solution.

The hydrogen generating cell (10) in the hydrogen generating device used in the hydrogen supply system of the invention is basically composed of a partition membrane (11), a fuel electrode (12) provided on one surface of partition membrane (11) and an oxidizing electrode (14) provided on the other surface of partition membrane as described above. The element configured as described above may be represented by an MEA (membrane/electrode assembly) used in a direct methanol fuel cell.

The method for fabricating an MEA is not limited to any specific one, but a method similar to a conventional one may be employed wherein a fuel electrode and an oxidizing electrode (air electrode) with a partition membrane inserted therebetween are compressed at a high temperature to be assembled.

Suitable partition membranes may include a proton conducting solid electrolyte membrane which has been used as a polymer electrolyte membrane of a fuel cell. The proton conducting solid electrolyte membrane preferably includes a membrane based on perfluorocarbon sulfonate having sulfonic acid group such as Nafion provided by Dupont.

The fuel electrode or oxidizing (air) electrode is preferably an electrode which is conductive and has a catalytic activity. Production of such an electrode may be achieved by applying a catalyst paste onto a gas diffusion layer and drying the paste, wherein the paste is comprised of a catalyst with carbon powder serving as a base, a binding agent such as a PTFE resin, and an ion conductivity conferring substance such as Nafion solution.

The gas diffusion layer is preferably made of a carbon paper treated to be water-repellent.

The catalyst to be applied to fuel electrode is not limited to any specific one, but is preferably a platinum-ruthenium alloy supported by carbon powder serving as a base.

The catalyst applied to air electrode is not limited to any specific one, but is preferably platinum supported by carbon powder serving as a base.

For a hydrogen generating device configured as described above, when fuel containing an organic compound such as an aqueous solution of methanol is supplied to the fuel electrode, and an oxidizing agent such as air, oxygen or hydrogen peroxide is supplied to the oxidizing (air) electrode, gas containing hydrogen evolves on the fuel electrode under specified conditions.

In the hydrogen generating device used in the hydrogen supply system of the invention, the hydrogen generating method are quite different from conventional hydrogen generating methods, and it is still difficult at present to explain the mechanism. The hypothesis which is currently thought most likely to be true will be described below, but it can not be denied that the hypothesis would be upset by new reactions which will shed new light to the phenomenon.

According to the hydrogen generating device used in the hydrogen supply system of the invention, hydrogen-containing gas evolves, at a temperature as low as 30 to 90° C., from the fuel electrode which receives the supply of methanol and water as will be described below. When no electric energy is supplied from outside to the hydrogen generating cell, gas containing hydrogen at 70 to 80% evolves, while when electric energy is supplied from outside to the cell, gas containing hydrogen at 80% or higher evolves. The evolution of gas depends on the open circuit voltage or operation voltage between the two electrodes. Base on these results, the most likely explanation of the mechanism underlying the evolution of hydrogen is as follows. For brevity, description will be given below on the premise that the cell is kept under circuit-open condition.

Let's assume for example that methanol is applied, as fuel, to a hydrogen generating device of the invention. Firstly proton is likely to be generated on the fuel electrode by virtue of a catalyst, as is the case with a DMFC.

$$CH_3OH + H_2O \rightarrow CO_2 + 6H^+ + 6e^- \tag{1}$$

When Pt—Ru is used as a catalyst, methanol is adsorbed to the surface of Pt, and undergoes a series of electrochemical oxidization reactions as described below, resulting in the production of chemical species firmly adhered to the surface of the catalyst ultimately leading to reaction (1) described above, so it is contended ("Handbook of Electric Cell," Feb. 20, 2001, p. 406, Maruzen, 3rd edition).

$$CH_3OH + Pt \rightarrow Pt—(CH_3OH)ads \rightarrow Pt—(CH_2OH)ads + H^+ + e^-$$

$$Pt—(CH_2OH)ads \rightarrow Pt—(CHOH)ads + H^+ + e^-$$

$$Pt—(CHOH)ads \rightarrow Pt—(COH)ads + H^+ + e^-$$

$$Pt—(COH)ads \rightarrow Pt—(CO)ads + H^+ + e^-$$

To further oxidize Pt—(CO)ads, it is necessary to prepare (OH)ads from water.

$$Ru + H_2O \rightarrow Ru—(H_2O)ads \rightarrow Ru—(OH)ads + H^+ + e^-$$

$$Ru—(OH)ads + Pt—(CO)ads \rightarrow Ru + Pt + CO_2 + H^+ + e^-$$

For a DMFC, $H^+$ (proton) generated on the fuel electrode as a result of the reaction represented by formula (1) migrates through a proton conducting solid electrolyte membrane to reach the oxidizing electrode where it reacts with oxygen-containing gas or oxygen supplied to the oxidizing electrode as represented by the following reaction formula.

$$3/2O_2 + 6H^+ + 6e^- \rightarrow 3H_2O \quad (2)$$

Since the hydrogen generating device works under open-circuit condition, $e^-$ generated as a result of the reaction represented by formula (1) can not be supplied through an external circuit to the oxidizing electrode. Therefore, for the reaction represented by formula (2) to occur, it is necessary to supply $e^-$ to the oxidizing electrode from a different reaction.

By the way, with regard to a DMFC using a proton conducting solid electrolyte membrane such as Nafion, there has been known a phenomenon called methanol crossover, that is, the crossover of methanol from the fuel electrode to the oxidizing electrode. Thus, it is possible that crossed methanol undergoes electrolytic oxidization represented by the following formula on the oxidizing electrode.

$$CH_3OH + H_2O \rightarrow CO_2 + 6H^+ + 6e^- \quad (3)$$

If the reaction represented by formula (3) occurs, $e^-$ produced as a result of the reaction is supplied to allow the reaction represented by formula (2) to occur there.

The $H^+$ (proton) produced as a result of the reaction represented by formula (3) migrates through the proton conducting solid electrolyte membrane to reach the fuel electrode to undergo there a reaction represented by the following formula to produce hydrogen.

$$6H^+ + 6e^- \rightarrow 3H_2 \quad (4)$$

In this sequence of reactions, the transfer of $H^+$ and $e^-$ produced as a result of the reaction represented by formula (1) on the fuel electrode to the oxidizing electrode and the transfer of $H^+$ and $e^-$ produced as a result of the reaction represented by formula (3) on the oxidizing electrode to the fuel electrode are likely to be apparently canceled out by each other.

Then, on the oxidizing electrode there arises reaction as represented by formula (2) based on $H^+$ and $e^-$ produced as a result of the reaction represented by formula (3), while on the fuel electrode there arises reaction as represented by formula (4) based on $H^+$ and $e^-$ produced as a result of the reaction represented by formula (1).

Assumed that reactions represented by formulas (1) and (4) occur on the fuel electrode while reactions represented by formulas (2) and (3) occur on the oxidizing electrode, the net balance of chemical reactions is likely to be expressed by the following formula (5).

$$2CH_3OH + 2H_2O + 3/2O_2 \rightarrow 2CO_2 + 3H_2O + 3H_2 \quad (5)$$

The theoretical efficiency of this reaction is 59% (calorific value of 3 mol. hydrogen/calorific value of 2 mol. methanol).

The standard electrode potential E0 of the reaction represented by formula (1) is E0=0.046 V, while the standard electrode potential E0 of the reaction represented by formula (4) is E0=0.0 V. Thus, if the two reactions are combined to form a cell, the electrode where the reaction of formula (1) will occur will serve as a positive electrode while the electrode where the reaction of formula (4) will occur will serve as a negative electrode. The reaction of formula (1) will proceed in the direction opposite to the arrow represented direction. Similarly, the reaction of formula (4) will also proceed in the direction opposite to the arrow represented direction. Thus, the cell will not generate hydrogen.

For the cell to generate hydrogen, it is necessary to make both the reactions of formulas (1) and (4) proceed in the direction represented by the arrow. For this purpose, it is absolutely necessary to make the reaction of formula (1) occur on a negative electrode and the reaction of formula (4) on a positive electrode. If it is assumed that the entire area of fuel electrode is uniformly at a constant level, it is necessary to shift the methanol oxidizing potential to a lower level or to shift the hydrogen generating potential to a higher level.

However, if the entire area of fuel electrode is not at a constant potential level, reaction on the fuel electrode where methanol and water react to produce $H^+$ according to formula (1) and reaction on the oxidizing electrode where $H^+$ and $e^-$ react to produce hydrogen according to formula (4) are likely to proceed simultaneously.

As will be described later in relation to Example, a reaction system exposed to a higher temperature is more apt to generate hydrogen, and thus endothermic reactions (1) and (3) are likely to proceed in the arrow-indicated direction, being supplied heat from outside via other exothermic reactions.

Methanol not only undergoes reactions as represented by formulas (1) and (3), but is also subject, as a result of crossover, to the subsidiary reaction where methanol permeating from the fuel electrode is oxidized by oxygen on the surface of catalyst coated on the air electrode as represented by the following formula.

$$CH_3OH + 3/2O_2 \rightarrow CO_2 + 2H_2O \quad (6)$$

Since the reaction of formula (6) is an exothermic reaction, heat generated by this reaction is most likely to be used to allow reactions represented by formulas (1) and (3) to occur.

With regard to a hydrogen generating device used in the hydrogen supply system as described in claim 3 of the invention (open-circuit condition hereinafter), as apparent in relation to Example described later, supply of oxygen (air) is decreased, and when the open-circuit voltage is 300 to 800 mV, hydrogen evolves. However, this is probably because the oxidation of methanol permeated to air electrode as represented by formula (6) is suppressed, evolution reaction of $H^+$ as represented by formula (3) becomes dominant, and the $H^+$ undergoes reaction represented by formula (4) to produce hydrogen.

With regard to a hydrogen generating device used in the hydrogen supply system as described in claim 4 of the invention (discharging condition hereinafter), hydrogen is likely to be generated depending on the same mechanism as in the open-circuit condition. However, in contrast with the open-circuit condition, it is necessary with this system for $H^+$ corresponding in volume to discharge current to migrate from the fuel electrode to the oxidizing electrode in order to establish the neutralized electrical condition of the cell. Therefore, it is likely that reaction of formula (1) rather than reaction of formula (4) will occur on the fuel electrode while reaction of formula (2) rather than reaction of formula (3) will occur on the oxidizing electrode.

If discharge current becomes large (because of a large volume of $e^-$ being supplied to the oxidizing electrode), and if discharge voltage is lower than 200 mV, hydrogen will not evolve as will be described later in relation to Example. This is probably because the voltage is not so high as to permit the aqueous solution of methanol to be electrolyzed.

If a large volume of oxygen (air) is supplied or discharge voltage is higher than 600 mV, hydrogen will not evolve either. This is probably because methanol permeated to the air electrode is oxidized there according to the reaction shown in formula (6), instead of the $H^+$ evolution reaction shown in formula (3).

On the contrary, if supply of oxygen (air) is marginal, the discharge current will be reduced, and if discharge voltage (operation voltage) becomes 200 to 600 mV, hydrogen will still evolve. However, this is probably because the oxidation of methanol permeated to the air electrode as represented by formula (6) is suppressed, evolution reaction of $H^+$ as represented by formula (3) becomes dominant, and the $H^+$ undergoes reaction represented by formula (4) to produce hydrogen.

With regard to a hydrogen generating device used in the hydrogen supply system as described in claim 5 of the invention (charging condition hereinafter), hydrogen is likely to be generated depending on the same mechanism as in the open-circuit condition. However, in contrast with the open-circuit condition, it is necessary with this system for $H^+$ corresponding in volume to electrolysis current to migrate from the oxidizing electrode to the fuel electrode in order to establish the neutralized electrical condition of the cell. Therefore, it is likely that reaction of formula (4) rather than reaction of formula (1) will occur on the fuel electrode while reaction of formula (3) rather than reaction of formula (2) will occur on the oxidizing electrode.

To put it more specifically, with regard to the charging condition where the fuel electrode serves as cathode while the oxidizing electrode serves as anode, electric energy is supplied from outside ($e^-$ is supplied from outside to the fuel electrode). Then, basically electrolysis occurs in the system. As electric energy supplied (voltage applied) is increased, more hydrogen will be produced. This is probably because as more $e^-$ is supplied from outside to the fuel electrode, oxidization of methanol represented by formula (3) and reaction represented by formula (4) ($6H^+ + 6e^- \rightarrow 3H_2$) will be more enhanced as will become apparent from the description given below in relation to Example.

However, as will be described later, if supply of oxygen (air) is marginal, the energy efficiency of the system becomes high when applied voltage (operation voltage) is at a low range of 400 to 600 mV. This is probably because the oxidation of methanol permeated to air electrode as represented by formula (6) is suppressed, evolution reaction of $H^+$ as represented by formula (3) becomes dominant, and the $H^+$ undergoes reaction represented by formula (4) to produce hydrogen in the same manner as described above even in the case of open-circuit condition or discharging condition where electric energy is not provided from outside. Evolution of hydrogen in the charging condition is likely to be generated depending on the same mechanism as in the open-circuit condition and discharging condition as well as on the electric energy supplied from outside.

The meaning of the potential of the cell will be described here. Generally, the voltage of a cell having two electrodes with an electrolyte membrane inserted therebetween is determined by the difference between the two electrodes of chemical potentials of ions which serve as conductors in electrolyte.

If polarizations at the two electrodes are ignored, the voltage in question indicates the difference between the two electrodes of chemical potentials of hydrogen, in other words, partial pressures of hydrogen, since this cell uses a proton (hydrogen ion) conducting solid electrolyte membrane.

According to the invention, as will be described later in relation to Example, if there is voltage between the fuel and oxidizing electrodes that is in a certain range, this indicates the evolution of hydrogen on the fuel electrode. Thus, if the difference of chemical potentials of hydrogen between the two electrodes falls within a certain range, reactions as represented by formulas (1) to (6) cited above will proceed which will result in the production of hydrogen.

According to the hydrogen generating device used in the hydrogen supply system of the invention, it is possible to adjust the evolution volume of hydrogen-containing gas by varying the voltage (open-circuit voltage or operation voltage) between the fuel electrode and oxidizing (air) electrode, regardless of whether electric energy is withdrawn to outside from the hydrogen generating cell of the system or whether electric energy is supplied from outside to the hydrogen generating cell.

As will be described below in relation of Example, the open-circuit condition evolves hydrogen at the open-circuit voltage of 300 to 800 mV; the discharging condition evolves hydrogen at the discharge voltage (operation voltage) of 200 to 600 mV; and the charging condition evolves hydrogen at the applied voltage (operation voltage) of 300 to 1000 mV (energy efficiency is high at 400 to 600 mV). Thus, it is possible to adjust the evolution volume of hydrogen-containing gas by varying open-circuit voltage or operation voltage in accordance with the voltage range cited above.

As will be described below in relation of Example, it is possible to adjust the open-circuit voltage or operation voltage and/or the evolution volume (rate of hydrogen evolution) of hydrogen-containing gas by varying the supply volume of an oxidizing agent (oxygen-containing gas or oxygen, or hydrogen peroxide-containing liquid), or the concentration of an oxidizing agent (oxygen concentration of oxygen-containing gas), or the supply volume of organic compound-containing fuel, or the concentration of organic compound-containing fuel.

It is also possible to adjust the operation voltage and/or the evolution volume of hydrogen-containing gas by varying, for the discharging condition, electric energy withdrawn to outside, (varying current withdrawn to outside, or varying the voltage withdrawn to outside using a constant-voltage controllable power source, for example, so-called potentiostat), or, for the charging condition, electric energy supplied to the system (or current supplied to the system, or by varying the voltage of the system using a constant-voltage power source, for example, so-called potentiostat).

Since according to the hydrogen generating device used in the hydrogen supply system of the invention, it is possible to decompose organic compound-containing fuel at 100° C. or lower, the temperature at which the system can be operated is made 100° C. or lower. The operation temperature is preferably 30 to 90° C. This is because, when the operation temperature is adjusted to be between 30 and 90° C., it will become possible to adjust the open-circuit voltage or operation voltage, and/or the evolution volume of hydrogen-containing gas as will be described later in relation to Example.

Incidentally, for a hydrogen generating cell based on conventional fuel conversion technology, the operation temperature should be kept at 100° C. or higher. At this temperature range, water will become vapor and organic compound-containing fuel become gas, and even when hydrogen evolves under this condition, it is necessary to provide means specifically adapted for separating hydrogen. The system of the present invention is also advantageous in this point.

Indeed, there will arise a problem as described above, when organic compound-containing fuel is decomposed at 100° C. or higher. But a hydrogen generating device used in the hydrogen supply system of the invention may be operated at a temperature slightly above 100° C. if there be need to do so.

As long as based on the putative principle, the organic compound-containing fuel may be liquid or gaseous fuel capable of producing proton as a result of electrochemical oxidization that can pass through a proton conductive partition membrane, and liquid fuel containing alcohol such as methanol, ethanol, ethylene glycol, 2-propanol, aldehyde such as formaldehyde, carboxyl acid such as formic acid, or ether such as diethyl ether is preferred. Since the organic compound-containing fuel is supplied with water, an aqueous solution of alcohol, particularly aqueous solution of methanol is preferred. The aqueous solution of methanol cited above as a preferred example of fuel is an aqueous solution containing at least methanol, and its concentration of methanol at a region where hydrogen-containing gas evolves may be arbitrarily determined as needed.

Suitable oxidizing agents may include gaseous or liquid oxidizing agents. Suitable gaseous oxidizing agents may include oxygen-containing gas or oxygen. The concentration of oxygen in oxygen-containing gas is preferably chosen to be 10% or higher particularly. Suitable liquid oxidizing agents may include hydrogen peroxide-containing liquid.

For a hydrogen generating device of the invention, since the fraction of fuel converted into hydrogen is rather small, it is desirable to provide fuel circulating means to improve thereby the fraction of fuel to be converted into hydrogen.

The hydrogen generating device used in the hydrogen supply system of the invention has means for collecting hydrogen-containing gas provided from the fuel electrode. The means is preferably so constructed as to be able to recover carbon dioxide as well as hydrogen. Since the system operates at a temperature as low as 100° C. or lower, it is possible to attach a carbon dioxide absorbing portion for absorbing carbon dioxide contained in hydrogen-containing gas to the system by simple means.

Also, the hydrogen-containing gas generated from the fuel electrode of the hydrogen generating device contains not only carbon dioxide but water, unreacted raw material, etc., and it is preferable to provide a hydrogen permeable film at the outlet of the hydrogen-containing gas of the hydrogen generating device to have selectively only hydrogen permeate to have a hydrogen with high purity.

The hydrogen permeable film is not limited but a hydrogen permeable metal film with the thickness of 5 to 50 μm and formed on an inorganic porous layer to have selectively hydrogen permeate may be used. The inorganic porous layer is a carrier for holding the hydrogen permeable metal film and is formed from a porous stainless-steel unwoven cloth, ceramics, glass and the like within the range of thickness form 0.1 mm to 1 mm. As the hydrogen permeable metal film, an alloy containing Pd, an alloy containing Ni or an alloy containing V can be used, but the alloy containing Pd is preferable. As the alloy containing Pd, there are Pd/Ag alloy, Pd/Y alloy, Pd/Ag/Au alloy or the like.

By the above hydrogen permeable film, a high-purity hydrogen with the purity of 99.999% or more can be obtained, and this high-purity hydrogen is useful as a fuel for a fuel cell or a treatment gas or the like when producing a semiconductor device.

If the hydrogen generated by the hydrogen generating device is to be supplied to a hydrogen cylinder used as the treatment gas for the semiconductor or the like, it is preferably supplied to the hydrogen cylinder through a compressor, a carbon dioxide absorbing portion and a hydrogen permeable film and from the hydrogen cylinder to the hydrogen treating device of the semiconductor or the like.

Next, illustrative examples (examples of hydrogen generating) of the present invention will be presented. However, the fractions of catalysts, PTFE, Nafion, etc., and the thickness of catalyst layer, gas diffusion layer and electrolyte membrane are not limited to the values cited in the examples, but may take any appropriate values.

EXAMPLE 1

Illustrative examples of generating hydrogen based on the hydrogen generating device used in the hydrogen supply system (open-circuit condition) as defined by claim 3 of the invention will be presented below.

Hydrogen Generating Example 1-1

Hydrogen generating cells described in Example 1 (generating examples 1-1 to 1-10) have the same structure as that of representative DMFCs.

Figure 2:
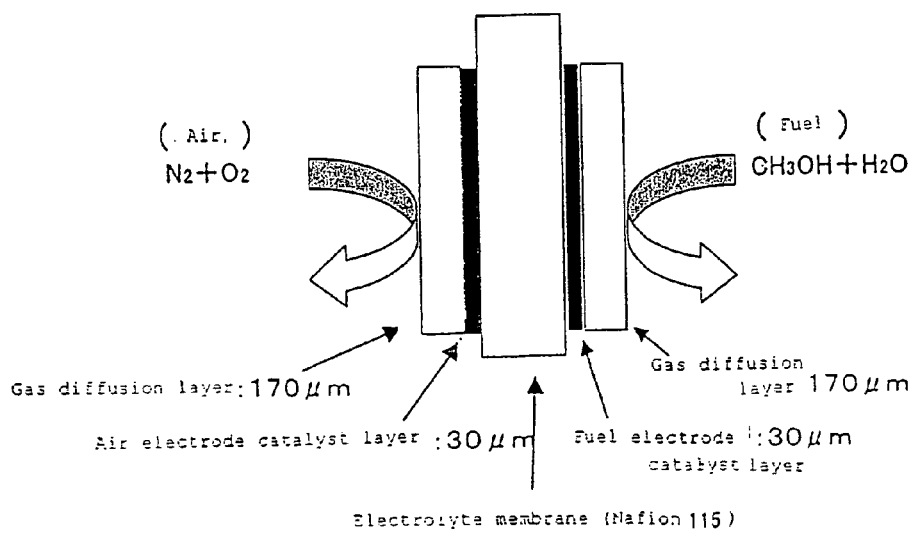
FIG. 2 is a schematic diagram of a hydrogen generating cell (requiring no supply of electric energy from outside) described in Example 1.

The structure of the hydrogen generating cell is outlined in FIG. 2.

The electrolyte membrane consists of a proton conducting electrolyte membrane provided by Dupont (Nafion 115); and the air electrode is obtained by immersing carbon paper (Toray) in a solution where polytetrafluoroethylene is dispersed at 5%, and baking the paper at 360° C. to make it water-repellent, and coating, on one surface of the paper, air electrode catalyst paste comprised of air electrode catalyst (carbon-supported platinum, Tanaka Precious Metal), fine powder of PTFE, and 5% Nafion solution (Aldrich). Thus, the air electrode exists as a gas diffusion layer with air electrode catalyst. In the preparation of the air electrode catalyst paste, the percent contents by weight of air electrode catalyst, PTFE, and Nafion were made 65%, 15% and 20%, respectively. The loading level of catalyst of the air electrode prepared as above was 1 mg/cm$^2$ in terms of the weight of platinum per unit area.

Another carbon paper was similarly treated to be made water-repellent. One surface of the paper was coated with fuel electrode catalyst paste comprised of fuel electrode catalyst (carbon-supported platinum-ruthenium, Tanaka Precious Metal), fine powder of PTFE, and 5% Nafion solution. Thus, the fuel electrode exists as a gas diffusion layer with fuel electrode catalyst. In the preparation of the fuel electrode catalyst paste, the percent contents by weight of fuel electrode catalyst, PTFE, and Nafion were made 55%, 15% and 30%, respectively. The loading level of catalyst of the fuel electrode prepared as above was 1 mg/cm$^2$ in terms of the weight of platinum-ruthenium per unit area.

The electrolyte membrane, gas diffusion layer with air electrode catalyst and gas diffusion layer with fuel electrode catalyst were laid one over another to be hot-pressed at 140° C. under a pressure of 100 kg/cm$^2$ so that they were assembled to form an MEA. The MEA prepared as above had an active electrode area of 60.8 cm$^2$. The thicknesses of air and fuel electrode catalyst layers were practically the same about 30 μm, and the thicknesses of air and fuel electrode gas diffusion layers were similarly the same about 170 μm.

The MEA was further provided on its both surfaces with flow passages through which air can flow and fuel can flow, and was enclosed from outside with an air electrode separator and a fuel electrode separator respectively both made of graphite into which phenol resin is impregnated, in order to prevent the leak of gas from the MEA. To further ensure the seal of MEA against the leak of fuel and air, MEA was surrounded with silicon-rubber made packing.

The hydrogen generating cell prepared as above was placed in an electric furnace where hot air was circulated. The temperature (operation temperature) of the cell was kept at 30 to 70° C., air was flowed at a rate of 0 to 400 ml/min to the air electrode, and 0.5 to 2M aqueous solution of methanol (fuel) was flowed at a rate of 2 to 15 ml/min to the fuel electrode. Then, the voltage difference between the fuel electrode and the air electrode (open voltage), the volume of gas evolved on the fuel electrode and the composition of the gas were monitored and analyzed.

First, the flow rate of aqueous solution of methanol (fuel) to the cell was kept 8 ml/min, and the temperature of air was kept at 30, 50, or 70° C., thereby altering the flow rate of air, and the volume of gas evolving from the fuel electrode was measured. The evolution volume of gas was determined by underwater conversion. The concentration of hydrogen in the evolved gas was determined by gas chromatography, and the rate of hydrogen evolution was determined based on the result.

Figure 3:
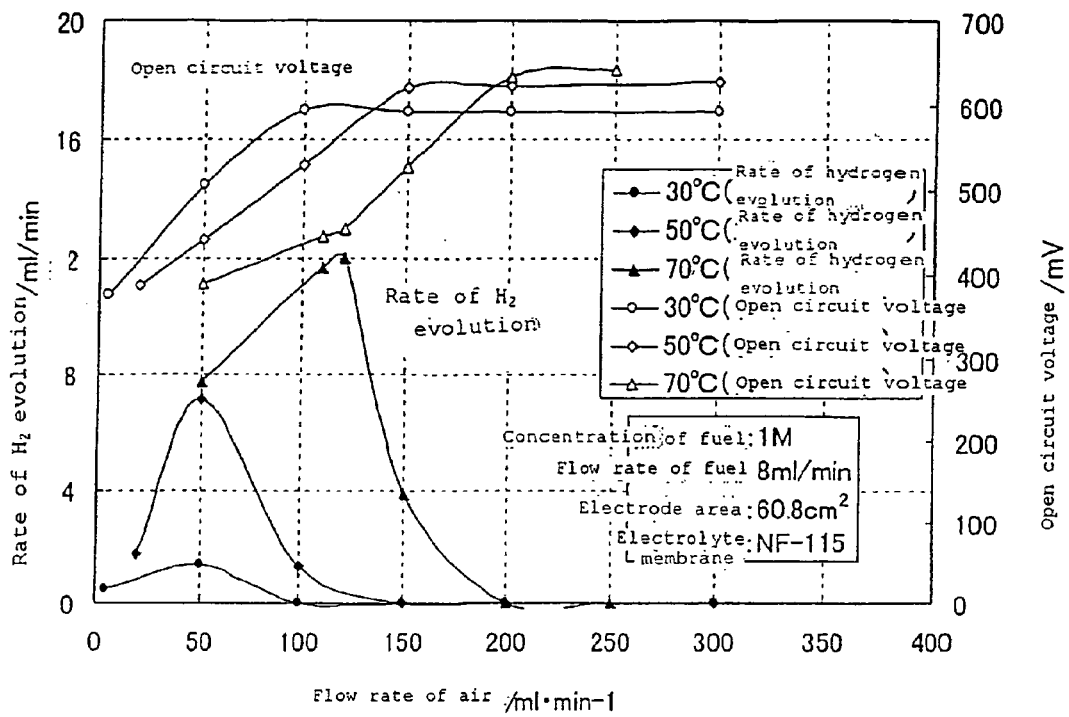
FIG. 3 shows a graph for indicating relationship between the flow rate of air and the rate of hydrogen evolution when temperature is varied (30 to 70° C.) (hydrogen generating example 1-1).

The results are shown in FIG. 3.

Evolution of hydrogen from the fuel electrode of the cell was confirmed with reduction of the flow rate of air for all the temperatures tested. The rate of hydrogen evolution becomes high as the temperature is raised. Studies of relation of the open-circuit voltage (open voltage) with the flow rate of air indicate that as the flow rate of air becomes low, the open-circuit voltage of the cell tends to decline.

Figure 4:
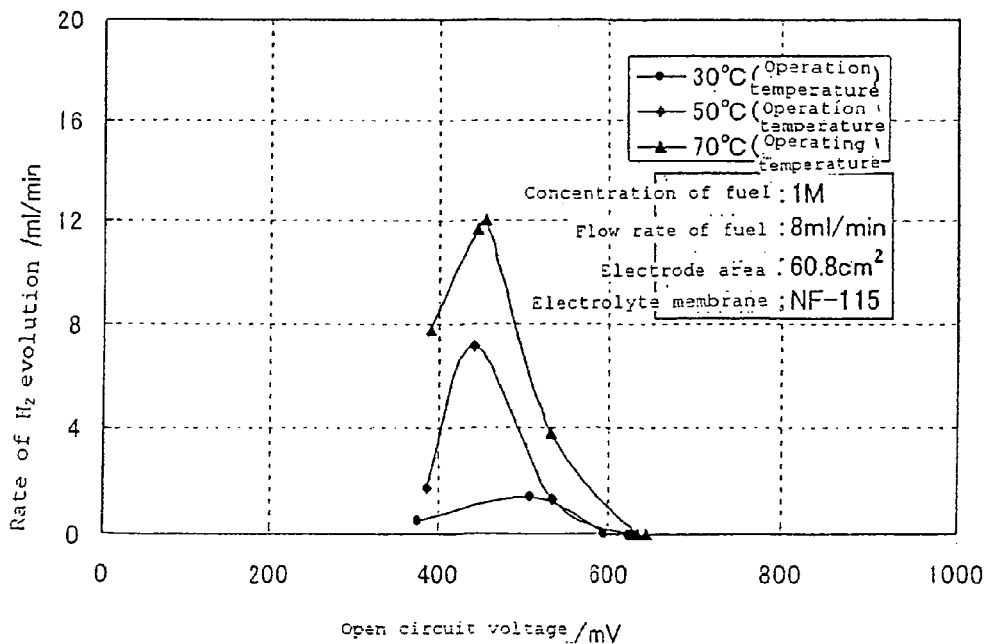
FIG. 4 shows a graph for indicating relationship between the open-circuit voltage and the rate of hydrogen evolution when temperature is varied (30 to 70° C.) (hydrogen generating example 1-1).

FIG. 4 shows a graph for indicating relationship between the open-circuit voltage and the rate of hydrogen evolution, both adapted from the results of FIG. 3.

From this, it was found that the rate of hydrogen evolution (volume of hydrogen evolution) tends to depend on the open-circuit voltage, and that hydrogen evolves when the open-circuit voltage is in the range of 400 to 600 mV. The rate of hydrogen evolution is the highest around 450 mV for all the temperatures tested.

Next, fuel was flowed at 8 ml/min and air at 120 ml/min at 70° C. to allow gas to evolve, and the concentration of hydrogen in the gas was determined by gas chromatography.

As a result, it was found that the gas contains hydrogen at about 70%, and carbon dioxide at about 15%. CO was not detected.

Hydrogen Generating Example 1-2

The same hydrogen generating cell as that of hydrogen generating example 1-1 was used. The temperature of the cell was kept at 70° C., and 1M aqueous solution of methanol (fuel) was provided at the flow rate of 2, 8, or 15 ml/min. Then, relations of the flow rate of fuel, the flow rate of air, the rate of hydrogen evolution and open-circuit voltage with the flow rate of air were shown in FIG. 5.

From the graph it was found that as the flow rate of fuel decreases, the rate of hydrogen evolution becomes larger.

Figure 5:
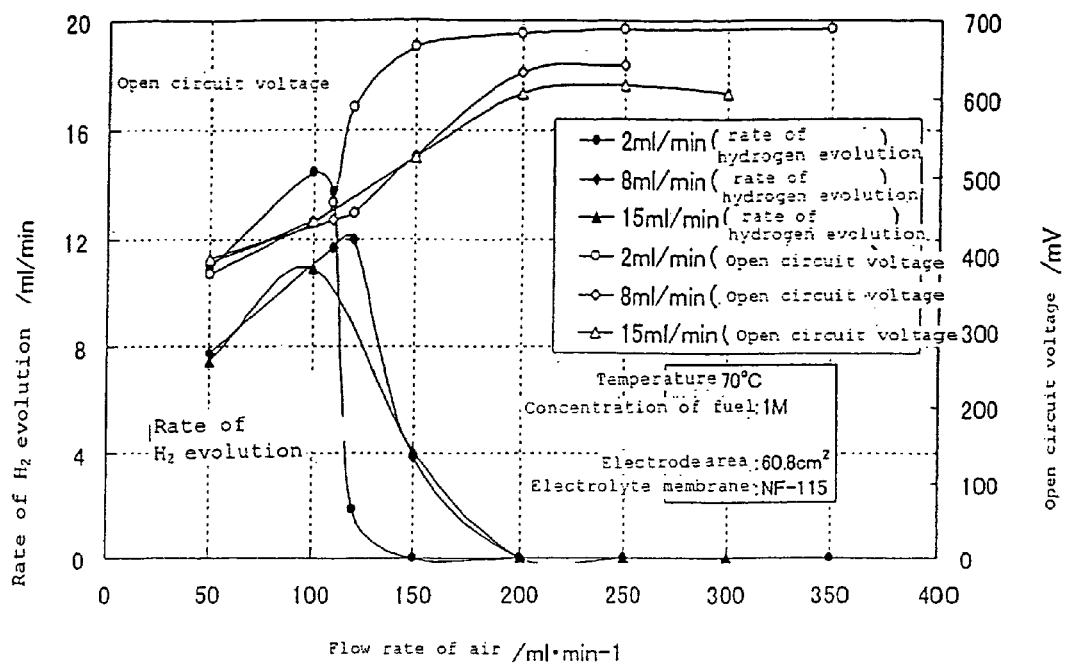
FIG. 5 shows a graph for indicating relations of the rate of hydrogen evolution and open-circuit voltage with the flow rate of air when the flow rate of fuel is varied (temperature being kept at 70° C.) (hydrogen generating example 1-2).
Figure 6:
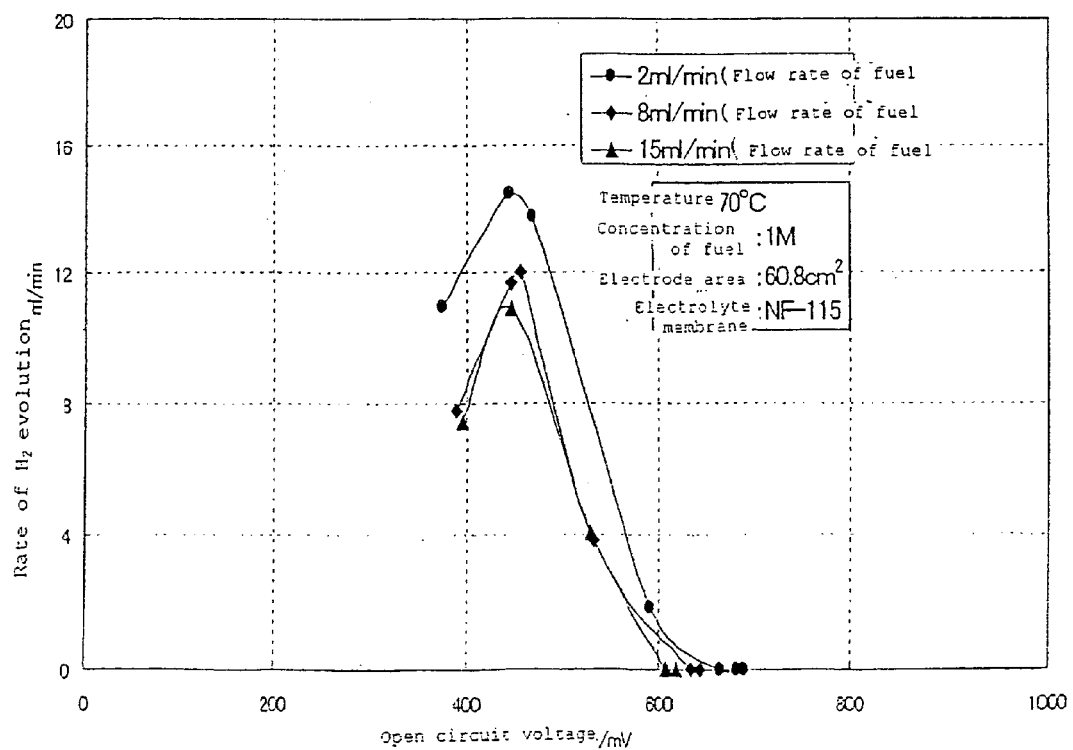
FIG. 6 shows a graph for indicating relation of the rate of hydrogen evolution with the open-circuit voltage when the flow rate of fuel is varied (temperature being kept at 70° C.) (hydrogen generating example 1-2).

FIG. 6 shows a graph for indicating relationship between the open-circuit voltage and the rate of hydrogen evolution, both adapted from the results of FIG. 5.

From this, it was found that the rate of hydrogen evolution depends on the open-circuit voltage, and is the highest around 450 mV for all the fuel flows tested as in hydrogen generating example 1-1.

In this generating example, the highest rate of hydrogen evolution 14.48 ml/min was obtained at the open-circuit voltage of 442 mV (operation temperature: 70° C.; concentration of fuel: 1M; flow rate of fuel: 2 ml/min; and flow rate of air: 100 ml/min). The concentration of hydrogen in the evolved gas was determined by gas chromatography as in example 1-1, and found to be about 70%.

Hydrogen Generating Example 1-3

The same hydrogen generating cell as that of hydrogen generating example 1-1 was used. The temperature of the cell was kept at 70° C., and aqueous solution of methanol (fuel) at a fuel concentration of 0.5, 1 or 2M was applied at a constant flow rate of 8 ml/min. Then, relations of the flow rate of fuel, the flow rate of air, the rate of hydrogen evolution and open-circuit voltage with the flow rate of air were shown in FIG. 7.

From the graph it was found that as the concentration of fuel decreases, the rate of hydrogen evolution becomes larger.

Figure 7:
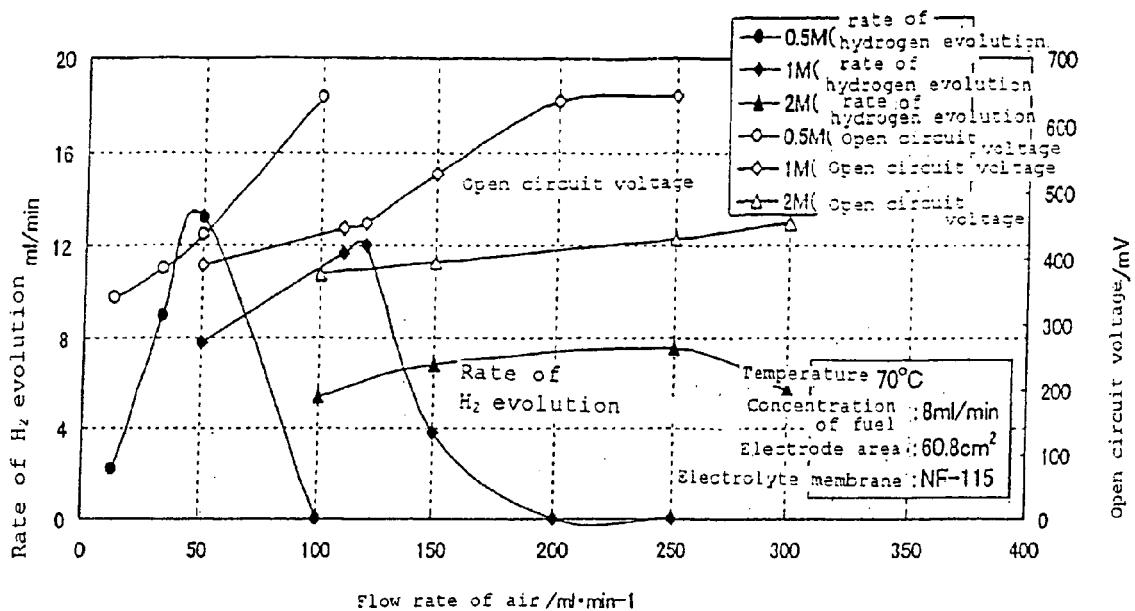
FIG. 7 shows a graph for indicating relations of the rate of hydrogen evolution and open-circuit voltage with the flow rate of air when the concentration of fuel is varied (temperature being kept at 70° C.) (hydrogen generating example 1-3).
Figure 8:
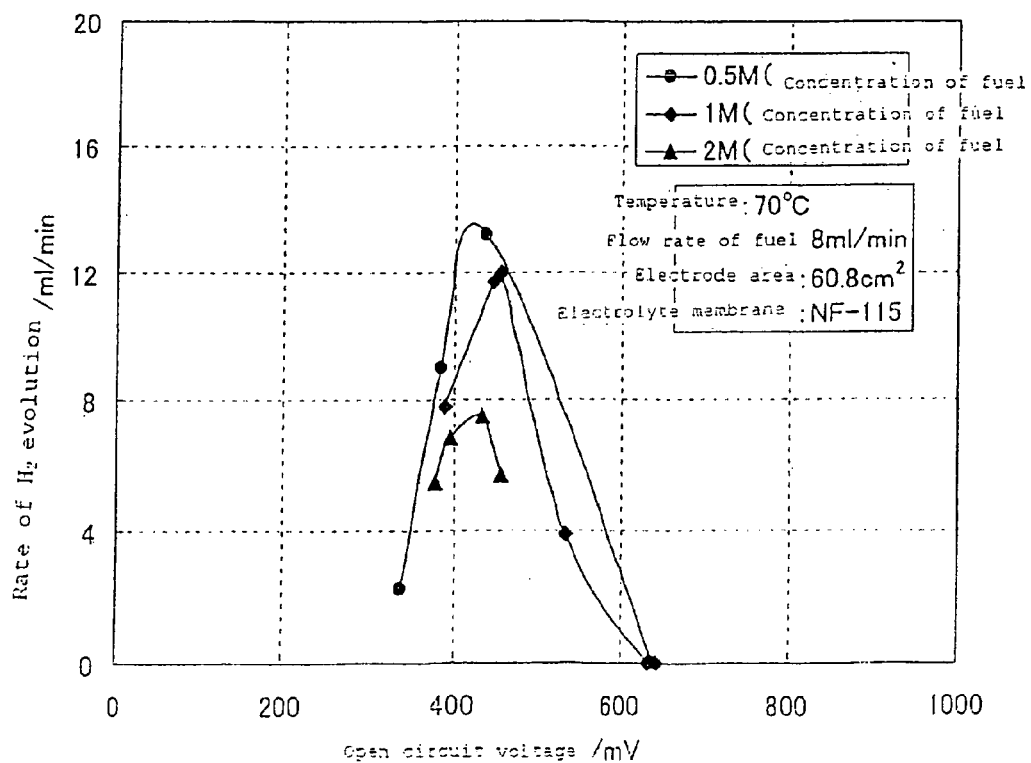
FIG. 8 shows a graph for indicating relation of the rate of hydrogen evolution with the open-circuit voltage when the concentration of fuel is varied (temperature being kept at 70° C.) (hydrogen generating example 1-3).

FIG. 8 shows a graph for indicating relationship between the open-circuit voltage and the rate of hydrogen evolution, both adapted from the results of FIG. 7.

From this, it was found that the rate of hydrogen evolution depends on the open-circuit voltage, and that hydrogen evolves when the open-circuit voltage is in the range of 300 to 600 mV. The rate of hydrogen evolution is the highest around 450 mV for all the fuel concentrations tested as in hydrogen generating example 1-1.

Hydrogen Generating Example 1-4

Next, effect of the thickness of electrolyte membrane on the evolution volume of gas was studied.

The hydrogen generating cell was constructed similarly to the above examples, using a Nafion 112 (Dupont) having a thickness of 50 μm, instead of Nafion 115 (Dupont) having a thickness of 130 μm as used in the above examples 1-1 to 1-3. The cell was operated: temperature at 70° C.; concentration of fuel at 1M; and flow rate of fuel at 8 ml/min, and relations of the flow rate of fuel, the flow rate of air and the rate of hydrogen evolution with the flow rate of air were studied.

Both Nafion 115 and 112 membranes are made of the same material as a single difference in their thickness. Thus, only the thickness of electrolyte membranes serves as a parameter to be studied in the experiment. The study results are summarized in FIG. 9.

Figure 9:
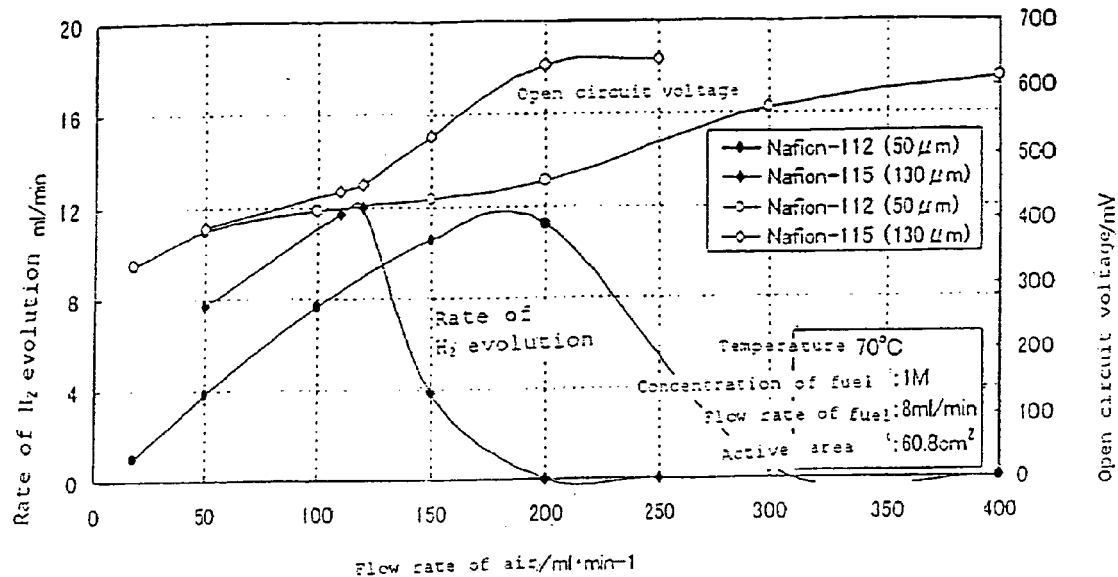
FIG. 9 shows a graph for indicating relations of the rate of hydrogen evolution and open-circuit voltage with the flow rate of air when the thickness of electrolyte membrane is varied (hydrogen generating example 1-4).
Figure 10:
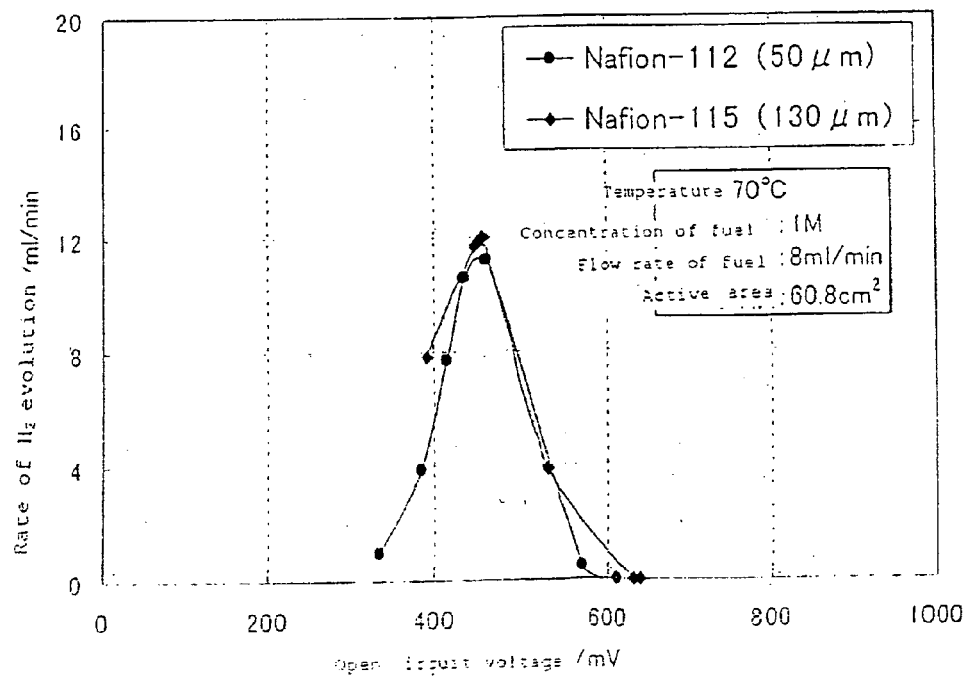
FIG. 10 shows a graph for indicating relation of the rate of hydrogen evolution with the open-circuit voltage when the thickness of electrolyte membrane is varied (hydrogen generating example 1-4).

FIG. 10 shows a graph for indicating relationship between the open-circuit voltage and the rate of hydrogen evolution, both adapted from the results of FIG. 9.

From this, it was found that the rate of hydrogen evolution was similar regardless of the thickness of electrolyte membrane. As seen from the figure, the rate of hydrogen evolution depends on the open-circuit voltage, and is the highest around 450 mV.

Hydrogen Generating Example 1-5

A hydrogen generating cell constructed as in hydrogen generating example 1-1 was placed in an electric furnace where hot air was circulated. The temperature of the cell was kept at 30, 50, 70, or 90° C., air was flowed at a rate of 0 to 250 ml/min to the air electrode, and 1M aqueous solution of methanol was flowed at a rate of 5 ml/min to the fuel electrode. Then, the open-circuit voltage, and the rate of hydrogen evolution from the fuel electrode were monitored and analyzed.

Figure 11:
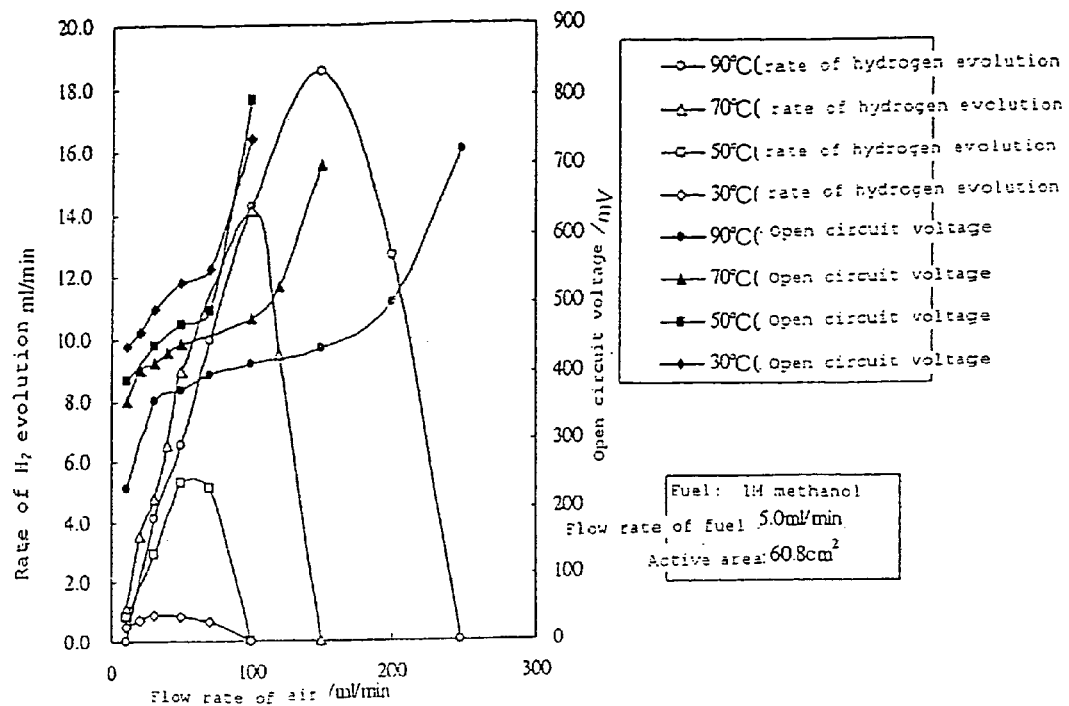
FIG. 11 shows a graph for indicating relations of the rate of hydrogen evolution and open-circuit voltage with the flow rate of air when the temperature is varied (30 to 90° C.) (hydrogen generating example 1-5).

Relation of the rate of hydrogen evolution with the flow rate of air is represented in FIG. 11.

Similarly to example 1-1, the evolution of hydrogen from the fuel electrode was confirmed with reduction of the flow rate of air for all the temperatures tested. The rate of hydrogen evolution becomes high as the temperature is raised. Studies of relation of the open-circuit voltage (open voltage) with the flow rate of air indicate that as the flow rate of air becomes low, the open-circuit voltage of the cell tends to decline.

Figure 12:
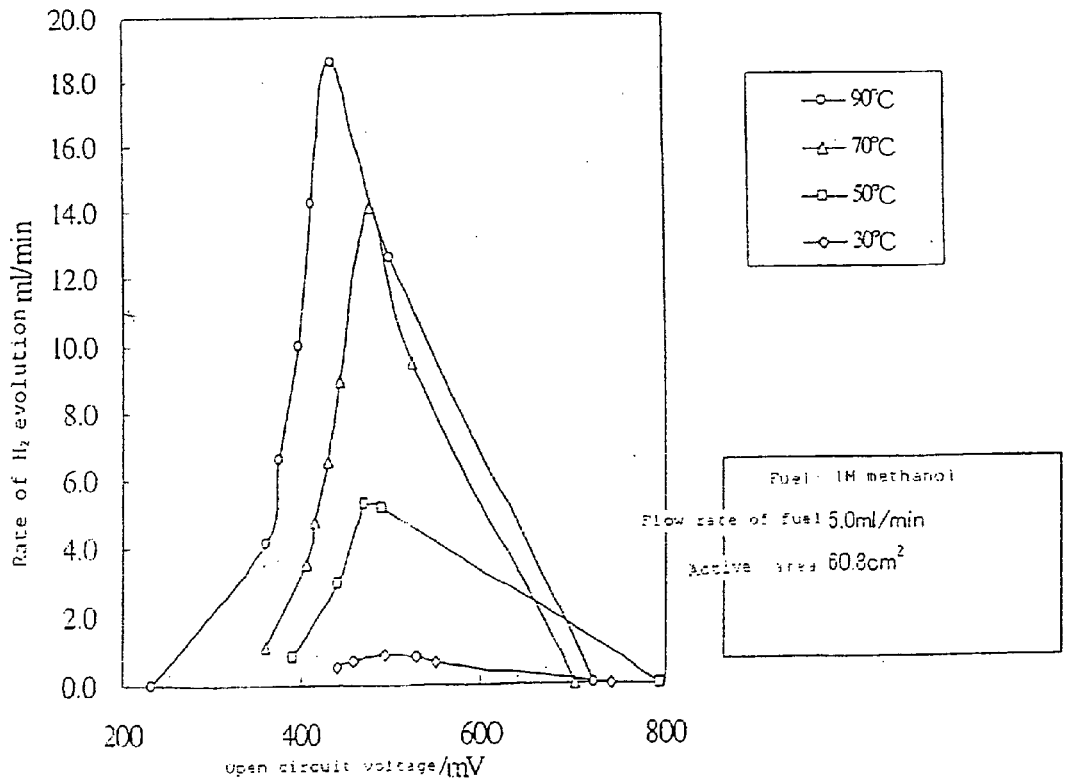
FIG. 12 shows a graph for indicating relation of the rate of hydrogen evolution with the open-circuit voltage when the temperature is varied (30 to 90° C.) (hydrogen generating example 1-5).

FIG. 12 shows a graph for indicating relationship between the open-circuit voltage and the rate of hydrogen evolution, both adapted from the results of FIG. 11.

From this, it was found that the rate of hydrogen evolution depends on the open-circuit voltage, and hydrogen evolves when the open-circuit voltage is in the range of 300 to 700 mV. The rate of hydrogen evolution is the highest around 470 to 480 mV when the temperature is kept at 30 to 70° C., while the peak is shifted to 440 mV when the temperature is raised to 90° C.

Hydrogen Generating Example 1-6

The same hydrogen generating cell as that of hydrogen generating example 1-1 was used. The temperature of cell was kept at 50° C., and fuel was applied at the flow rate of 1.5, 2.5, 5.0, 7.5, or 10.0 ml/min. Then, relations of the flow rate of fuel, the flow rate of air and the rate of hydrogen evolution, with the flow rate of air were shown in FIG. 13.

From this, it was found that in contrast with example 1-2 where the temperature was kept at 70° C. as the flow rate of fuel increases, the rate of hydrogen evolution becomes larger.

Figure 13:
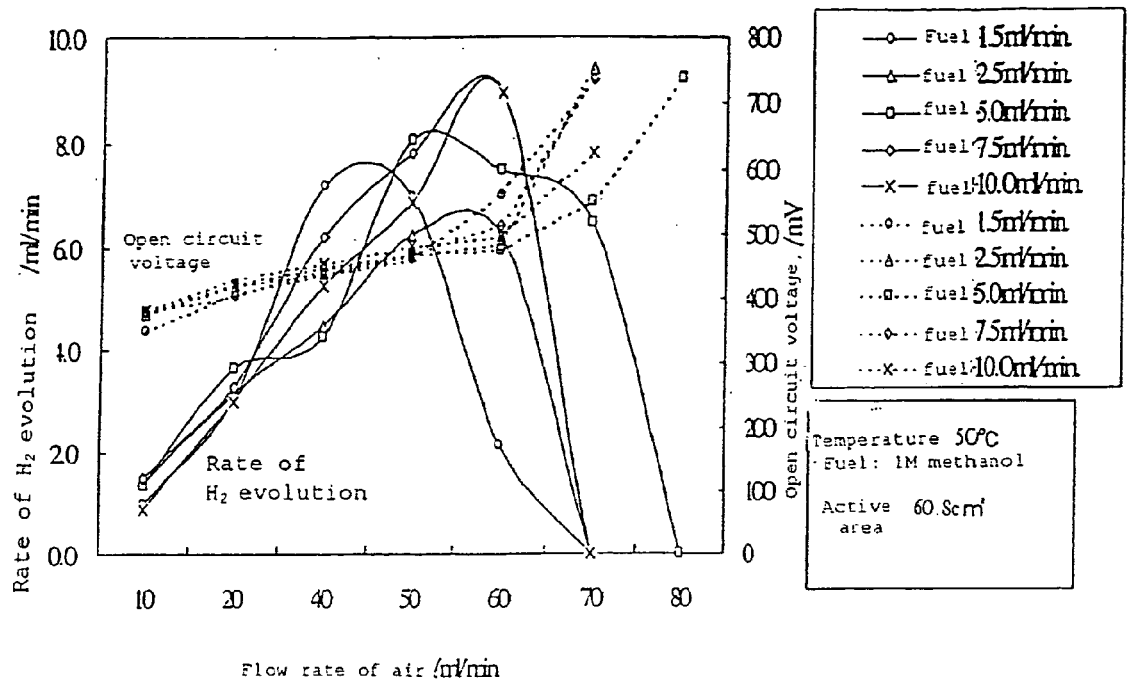
FIG. 13 shows a graph for indicating relations of the rate of hydrogen evolution and open-circuit voltage with the flow rate of air when the flow rate of fuel is varied (temperature: 50° C.) (hydrogen generating example 1-6).
Figure 14:
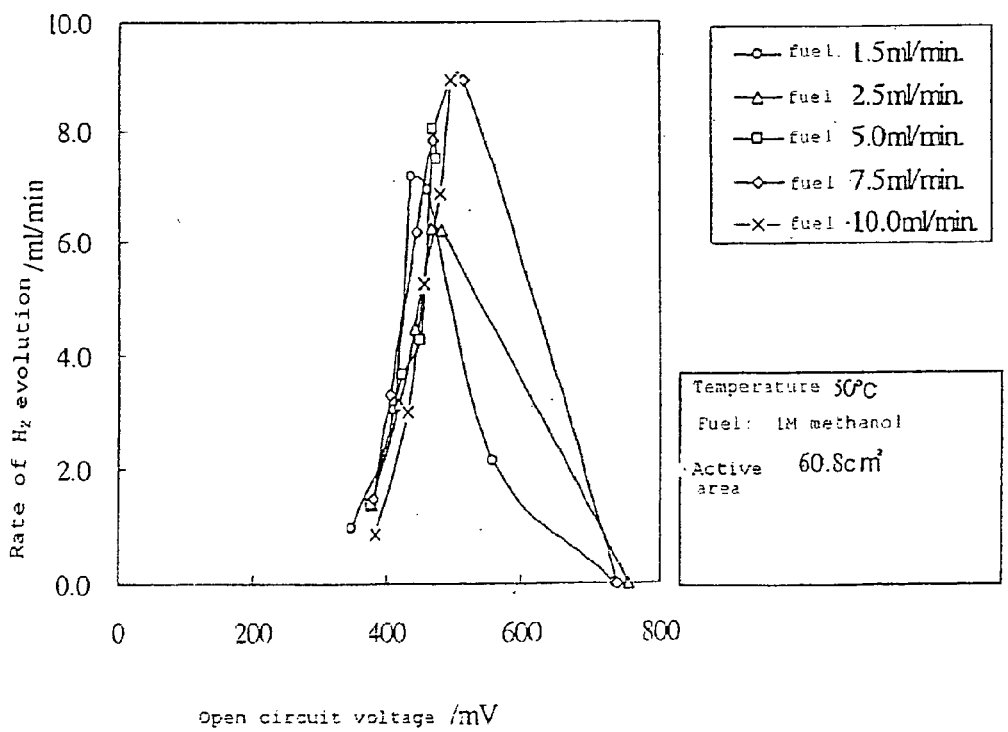
FIG. 14 shows a graph for indicating relation of the rate of hydrogen evolution with the open-circuit voltage when the flow rate of fuel is varied (temperature: 50° C.) (hydrogen generating example 1-6).

FIG. 14 shows a graph for indicating relationship between the open-circuit voltage and the rate of hydrogen evolution, both adapted from the results of FIG. 13.

From this, it was found that the rate of hydrogen evolution depends on the open-circuit voltage, and hydrogen evolves when the open-circuit voltage is in the range of 300 to 700 mV. The rate of hydrogen evolution is the highest around 450 to 500 mV.

After determining the consumption of methanol in fuel and the rate of hydrogen evolution when the flow rate of fuel is varied, the energy efficiency under open-circuit condition was determined by calculation in accordance with the equation described below (which is different from the equation used for determining the energy efficiency of a charging condition). As a result it was found that, under open-circuit condition, the energy efficiency was 17% when fuel flows at 5.0 ml/min, and 22% when fuel flows at 2.5 ml/min.

Efficiency (%) of a hydrogen generating system under open-circuit condition=(change of the standardized enthalpy of hydrogen evolved/change of enthalpy of methanol consumed)×100

Hydrogen Generating Example 1-7

The same hydrogen generating cell as that of hydrogen generating example 1-1 was used. The temperature of cell was kept at 50° C., and aqueous solution of methanol (fuel) was applied at a constant flow rate of 5 ml/min while the concentration of fuel was varied to 0.5, 1, 2, 3M. Then, relations of the flow rate of air and the rate of hydrogen evolution with the flow rate of air were shown in FIG. 15.

From this, it was found that as the concentration of fuel decreases, the peak of the rate of hydrogen evolution is observed with reduction of the flow rate of air.

Figure 15:
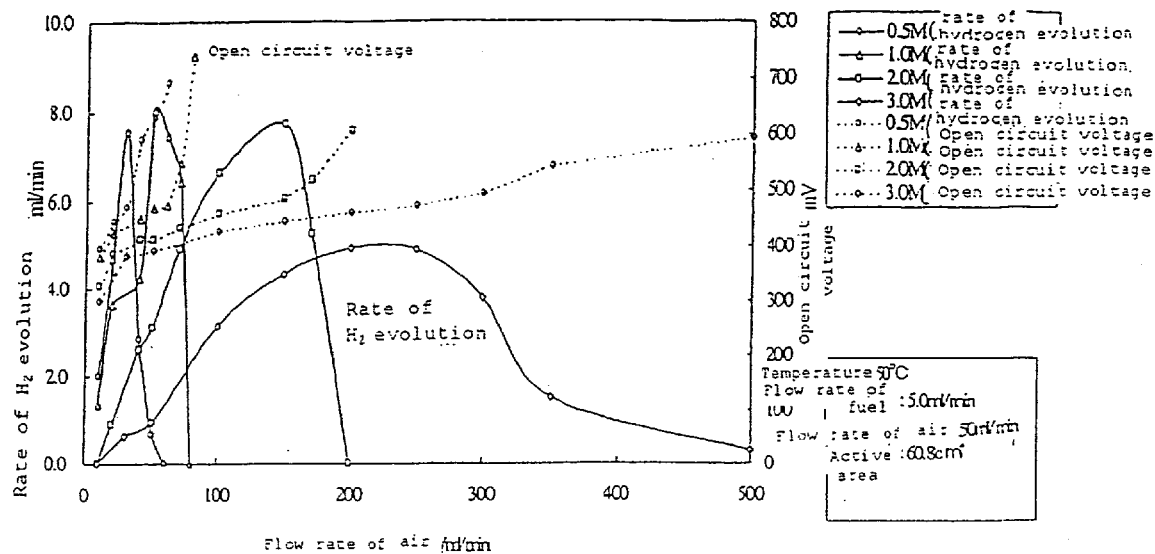
FIG. 15 shows a graph for indicating relations of the rate of hydrogen evolution and open-circuit voltage with the flow rate of air when the concentration of fuel is varied (temperature: 50° C.) (hydrogen generating example 1-7).
Figure 16:
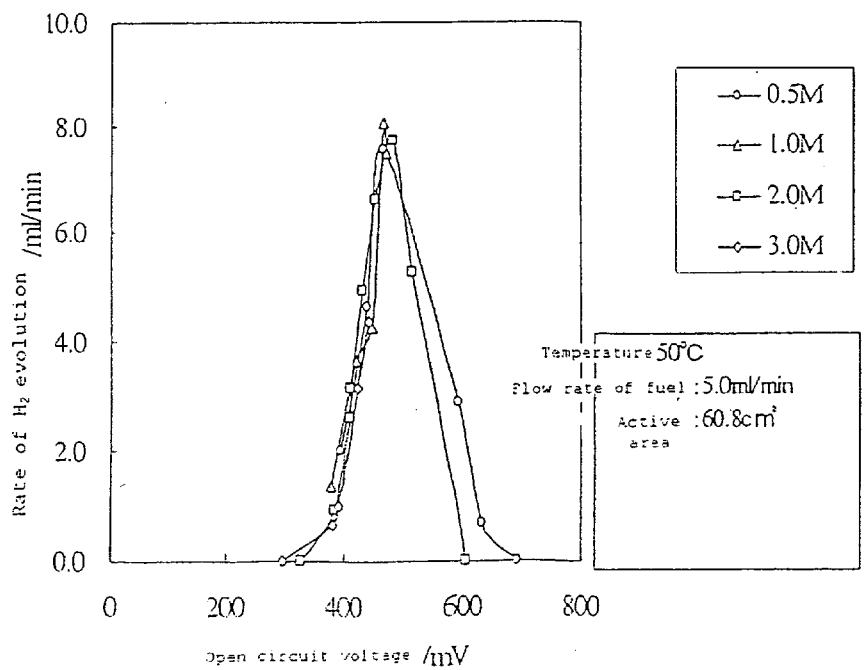
FIG. 16 shows a graph for indicating relation of the rate of hydrogen evolution with the open-circuit voltage when the concentration of fuel is varied (temperature: 50° C.) (hydrogen generating example 1-7).

FIG. 16 shows a graph for indicating relationship between the open-circuit voltage and the rate of hydrogen evolution, both adapted from the results of FIG. 15.

From this, it was found that the rate of hydrogen evolution depends on the open-circuit voltage, and hydrogen evolves when the open-circuit voltage is in the range of 300 to 700 mV. The rate of hydrogen evolution is the highest around 470 mV for all the concentrations of fuel tested.

Hydrogen Generating Example 1-8

Figure 17:
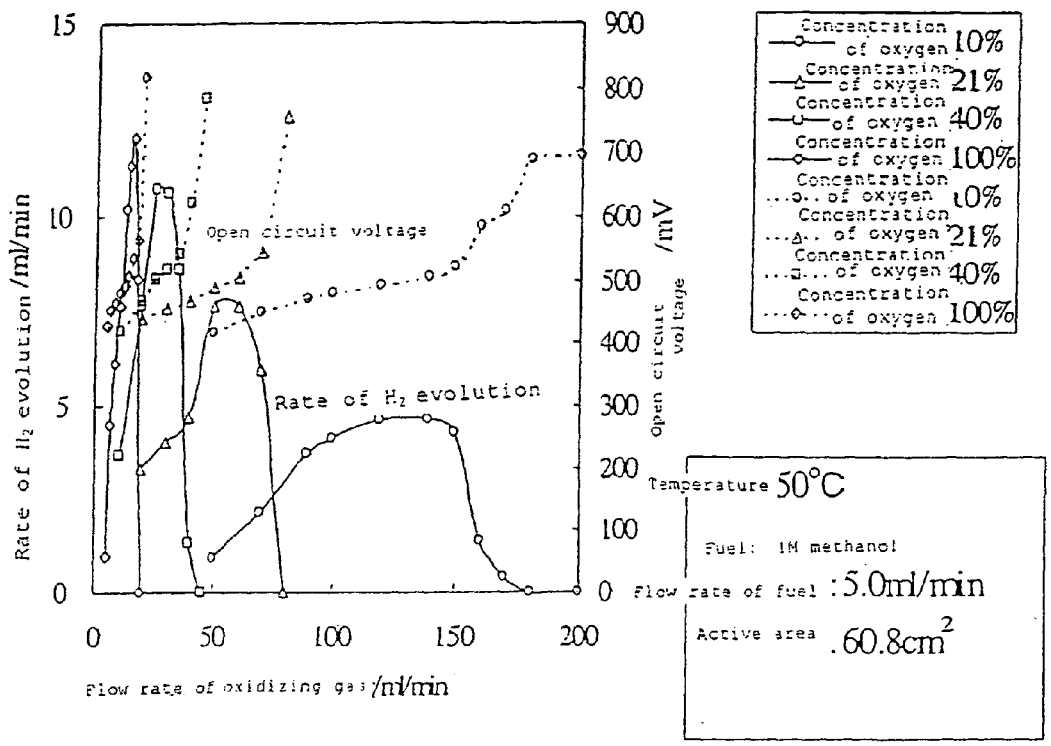
FIG. 17 shows a graph for indicating relations of the rate of hydrogen evolution and open-circuit voltage with the flow rate of oxidizing gas when the concentration of oxygen is varied (temperature: 50° C.) (hydrogen generating example 1-8).

The same hydrogen generating cell as that of hydrogen generating example 1-1 was used (except that the air electrode consisted of an oxidizing electrode to which oxidizing gas was flowed). The cell was operated: temperature at 50° C.; concentration of fuel at 1M; and flow rate of fuel at 5 ml/min, while the concentration of oxygen being varied to 10, 21, 40, or 100% and relations of the open-circuit voltage and the rate of hydrogen evolution with the flow rate of oxidizing gas were studied. The results are shown in FIG. 17. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen) to air.

From this, it was found that as the concentration of oxygen increases, the flow rate of oxidizing gas becomes smaller.

Figure 18:
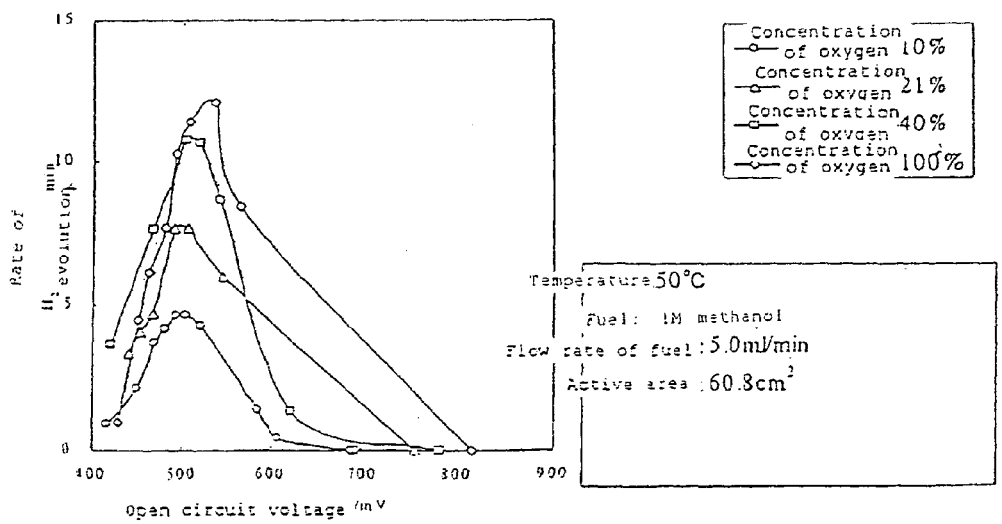
FIG. 18 shows a graph for indicating relation of the rate of hydrogen evolution with the open-circuit voltage when the concentration of oxygen is varied (temperature: 50° C.) (hydrogen generating example 1-8).

FIG. 18 shows a graph for indicating relationship between the open-circuit voltage and the rate of hydrogen evolution, both adapted from the results of FIG. 17.

From this, it was found that the rate of hydrogen evolution depends on the open-circuit voltage, and hydrogen evolves when the open-circuit voltage is in the range of 400 to 800 mV. The rate of hydrogen evolution is the highest at 490 to 530 mV.

Hydrogen Generating Example 1-9

The same hydrogen generating cell as that of hydrogen generating example 1-1 was used. The cell was operated at 50° C. with the flow of air to the air electrode kept at 60 ml/min and the flow of aqueous solution of methanol (fuel) to the fuel electrode kept at 2.6 ml/min to cause gas to evolve. A 200 cc of sample was collected from the gas, and the concentration of CO of the gas was determined by gas chromatography. No CO was detected in the gas (1 ppm or lower). Under the measurement condition the open-circuit voltage of the cell was 477 mV and the rate of hydrogen evolution was 10 ml/min.

Hydrogen Generating Example 1-10

The same hydrogen generating cell with that of Example 1-1 was used (except that the air electrode consisted of an oxidizing electrode to which liquid hydrogen peroxide was flowed). The cell was placed in an electric furnace where hot air was circulated. The cell was operated while the temperature being kept at 30, 50, 70, or 90° C. with the flow of 1M $H_2O_2$ (hydrogen peroxide) to the oxidizing electrode kept at 1-8 ml/min and the flow of 1M aqueous solution of methanol (fuel) to the fuel electrode kept at 5 ml/min. Relations of the open-circuit voltage and the rate of hydrogen evolution with the flow rate of hydrogen peroxide were studied.

Figure 19:
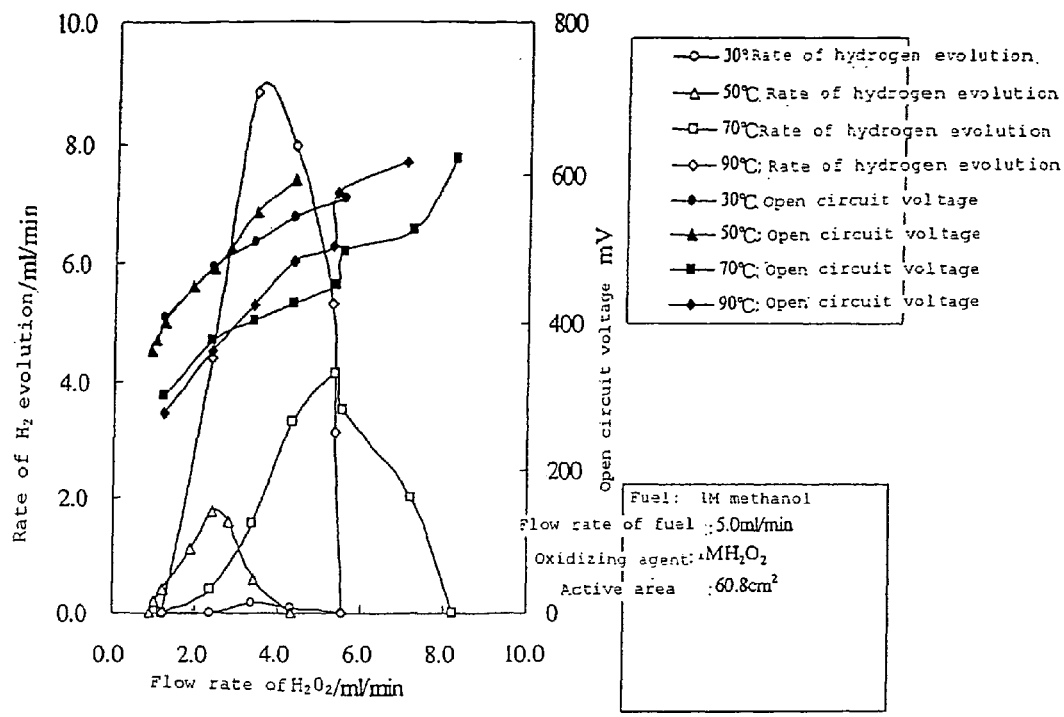
FIG. 19 shows a graph for indicating relations of the rate of hydrogen evolution and open-circuit voltage with the flow rate of $H_2O_2$ when the temperature is varied (30 to 90° C.) (hydrogen generating example 1-10).

Relation of the rate of hydrogen evolution with the flow rate of $H_2O_2$ is represented in FIG. 19.

Similarly to hydrogen generating example 1-1, the evolution of hydrogen from the fuel electrode of the cell was confirmed with reduction of the flow rate of $H_2O_2$ for all the temperatures tested. The rate of hydrogen evolution becomes high as the temperature is raised. Studies of relation of the open-circuit voltage with the flow rate of $H_2O_2$ indicate that as the flow rate of $H_2O_2$ becomes low, the open-circuit voltage of the cell tends to decline.

Figure 20:
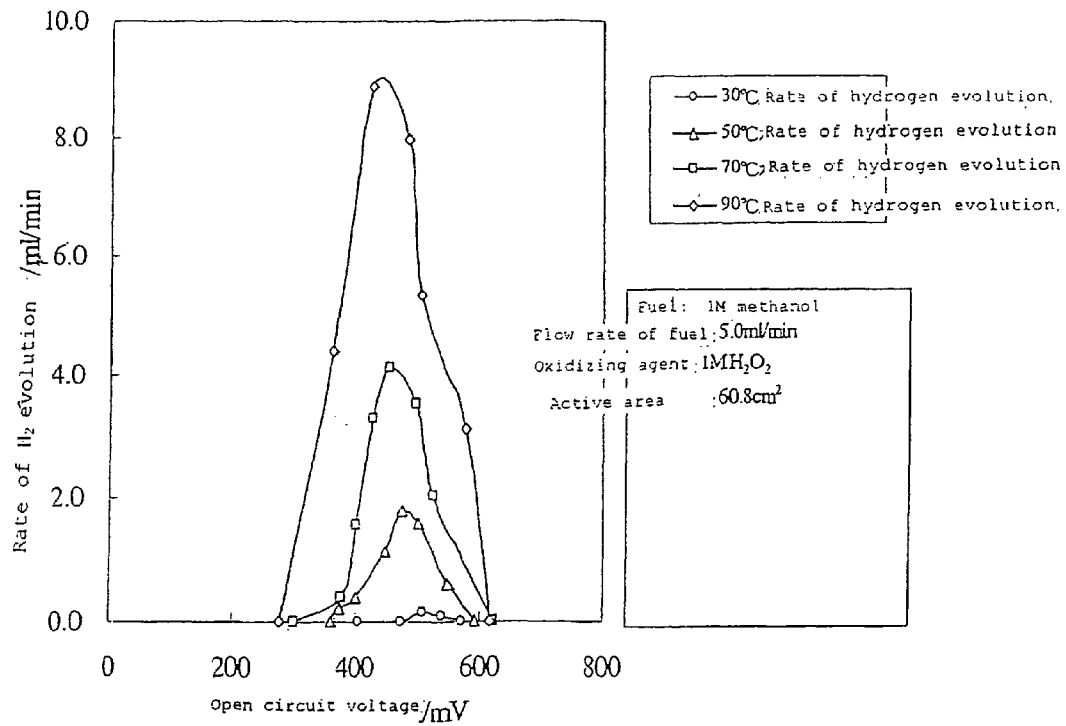
FIG. 20 shows a graph for indicating relation of the rate of hydrogen evolution (oxidizing agent: $H_2O_2$) with the open-circuit voltage when the temperature is varied (30 to 90° C.)(hydrogen generating example 1-10).

FIG. 20 shows a graph for indicating relationship between the open-circuit voltage and the rate of hydrogen evolution, both adapted from the results of FIG. 19.

From this, it was found that the rate of hydrogen evolution depends on the open-circuit voltage, and hydrogen evolves when the open-circuit voltage is in the range of 300 to 600 mV. The rate of hydrogen evolution is the highest around 500 mV when the temperature is kept at 30 to 50° C., while the peak is shifted to 450 mV when the temperature is raised to 70 to 90° C.

What is important here is that no current or voltage was provided from outside to the hydrogen generating cells of Example 1. The cell was only connected to an electrometer for monitoring the open-circuit voltage which has an internal impedance of 1 GΩ or higher, while the cell was supplied with fuel and oxidizing agent.

In other words, the hydrogen generating cell of Example 1 converted part of fuel into hydrogen receiving no external energy except for fuel and oxidizing agent.

In addition, conversion of fuel into hydrogen occurred at a surprisingly low temperature of 30 to 90° C. In view of these facts, the hydrogen generating device of the invention is likely to be novel and the effect to use this hydrogen generating device in the hydrogen supply system is profound.

EXAMPLE 2

Illustrative examples of the hydrogen generating device used in the hydrogen supply system as defined by claim 4 of the invention (discharging condition) will be presented below.

Hydrogen Generating Example 2-1

Figure 21:
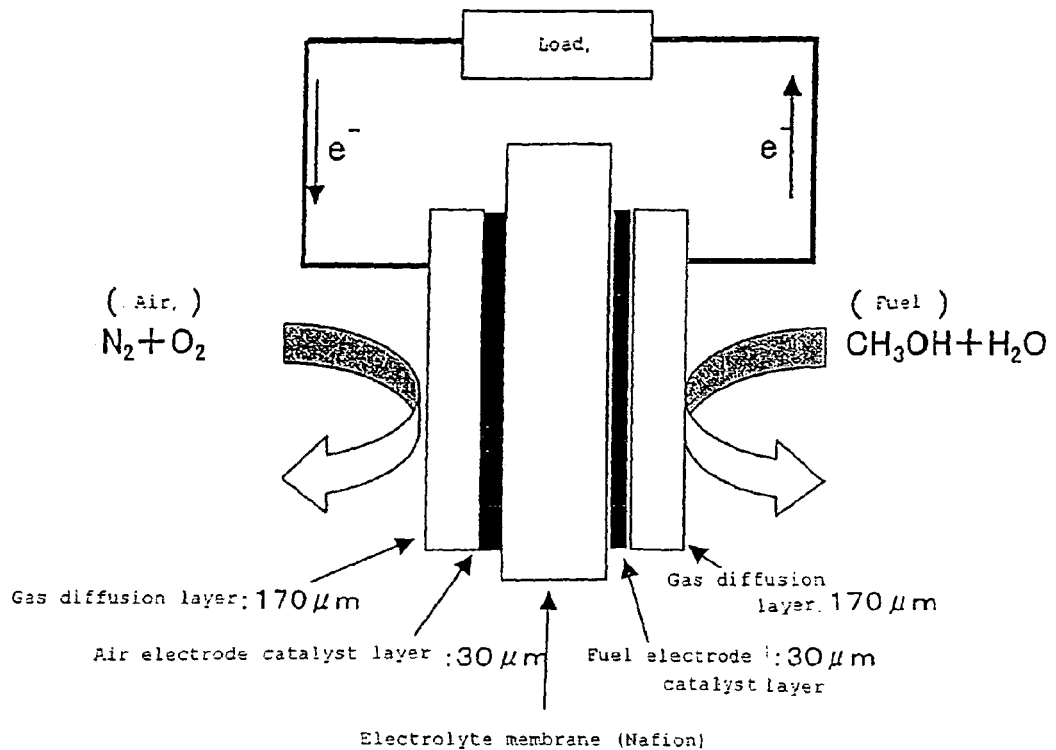
FIG. 21 is a schematic diagram of a hydrogen generating cell (with means for withdrawing electric energy) described in Example 2.

The structure of hydrogen generating cells described in Example 2 (illustrative examples 2-1 to 2-8) with means for withdrawing electric energy is outlined in FIG. 21.

The hydrogen generating cells of Example 2 are the same in structure as those of hydrogen generating example 1-1 except that the cell comprises a fuel electrode as a negative electrode and an air electrode as a positive electrode with means for withdrawing electric energy.

The hydrogen generating cell was placed in an electric furnace where hot air was circulated. The cell was operated while the temperature (operation temperature) being kept at 50° C. with the flow rate of air to the air electrode kept at 10 to 100 ml/min and the flow of 1M aqueous solution of methanol (fuel) to the fuel electrode kept at 5 ml/min to cause gas to evolve. Then, while the external current flowing between the air electrode and the fuel electrode being varied, the operation voltage between the fuel electrode and the air electrode, the volume of gas evolved from the fuel electrode and gas composition were monitored and analyzed. The concentration of hydrogen in the generated gas was determined by gas chromatography.

Figure 22:
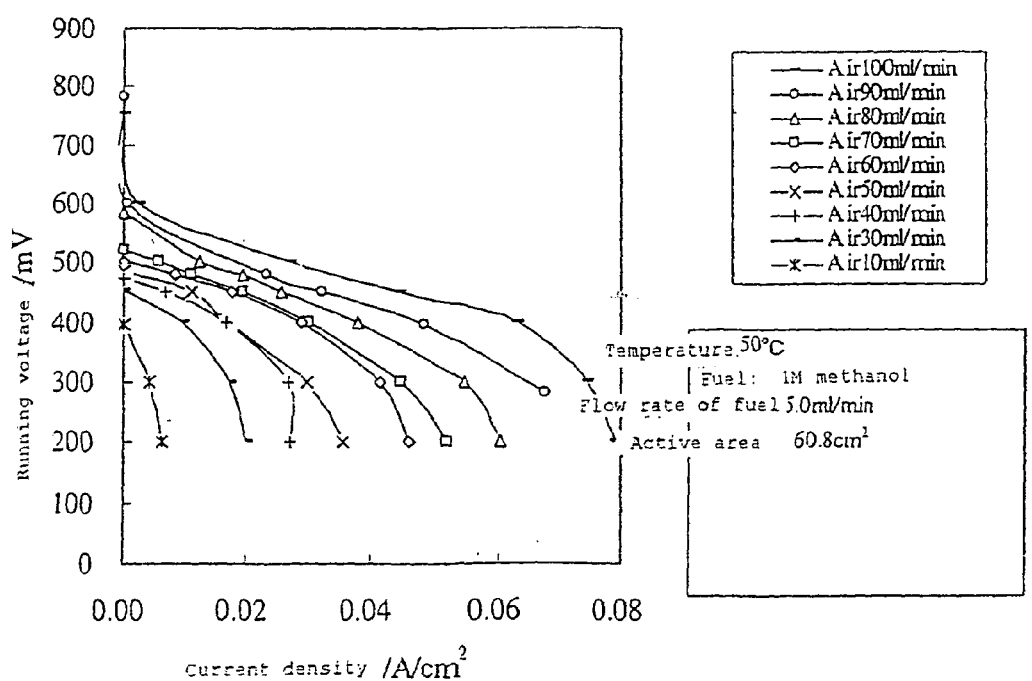
FIG. 22 shows a graph for indicating relation of the operation voltage (discharging: temperature at 50° C.) with the current density withdrawn when the flow rate of air is varied (hydrogen generating example 2-1).

Relation of the operation voltage with the current density withdrawn revealed in the test is shown in FIG. 22.

It was found that as the flow rate of air is reduced, the dischargeable limit current density becomes smaller with the reduction of the operation voltage.

Figure 23:
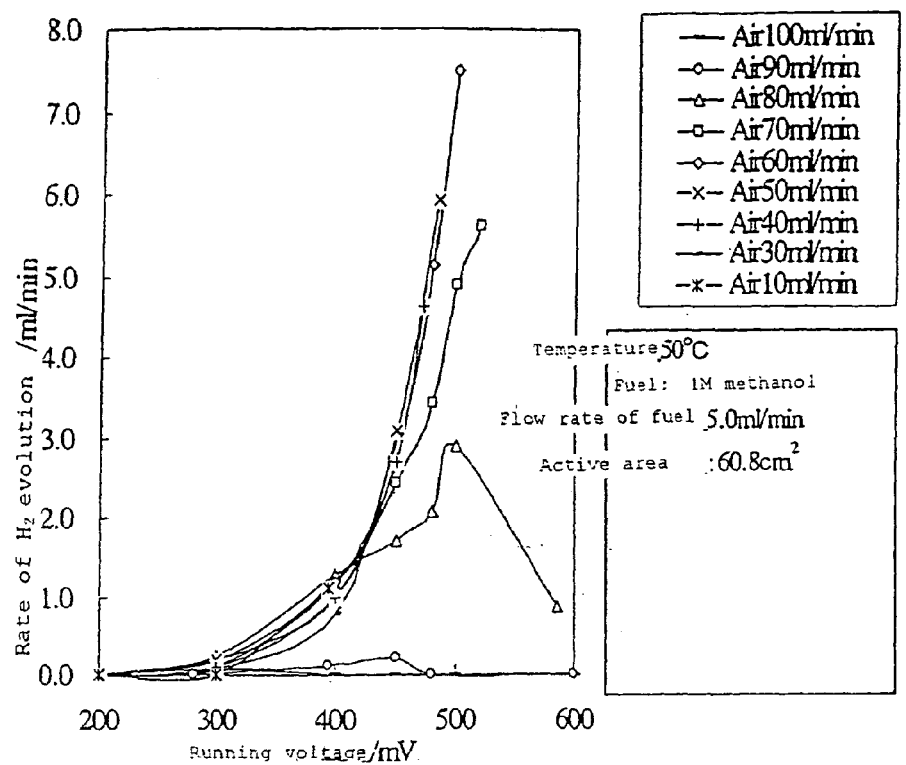
FIG. 23 shows a graph for indicating relation of the rate of hydrogen evolution (discharging: temperature at 50° C.) with the operation voltage when the flow rate of air is varied (hydrogen generating example 2-1).

FIG. 23 shows a graph for indicating relationship between the rate of hydrogen evolution and the operation voltage, both adapted from the results of FIG. 22.

From this, it was found that the rate of hydrogen evolution (volume of hydrogen evolution) depends on the operation voltage, and gas evolves when the operation voltage is in the range of 300 to 600 mV. Moreover, when the flow rate of air is in the range of 50 to 60 ml/min, hydrogen evolves most readily: when the flow rate of air is excessively large as 100 ml/min, no evolution of hydrogen is detected.

Next, the cell was operated: temperature at 50° C.; flow rate of fuel at 5 ml/min; flow rate of air at 60 ml/min; and current density at 8.4 mA/cm$^2$ to cause gas to evolve. The concentration of hydrogen in the gas was determined by gas chromatography.

As a result, it was found that the gas contained hydrogen at about 74%, and hydrogen evolved at a rate of 5.1 ml/min. No CO was detected.

Hydrogen Generating Example 2-2

The same hydrogen generating cell as that of hydrogen generating example 2-1 was used. The cell was operated while the temperature being kept at 30° C. with the flow rate of air to the air electrode kept at 30-100 ml/min and the flow of 1M aqueous solution of methanol (fuel) to the fuel electrode kept at 5 ml/min. Then, while the current flowing between the air electrode and the fuel electrode being varied, the operation voltage between the fuel electrode and the air electrode, and the rate of hydrogen evolution occurring from the fuel electrode were monitored and analyzed.

Figure 24:
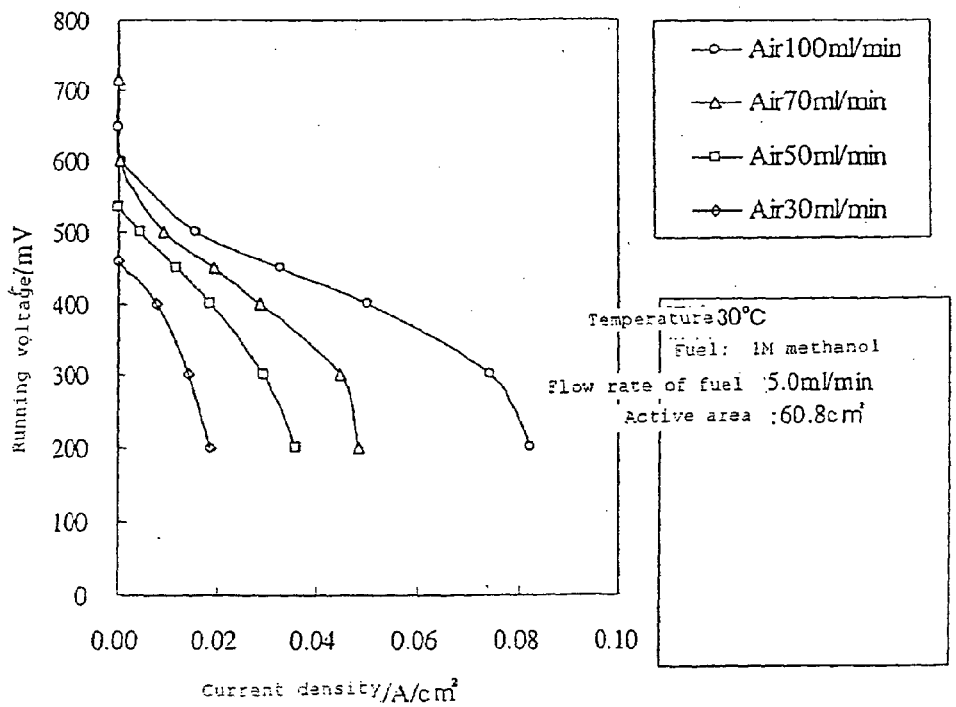
FIG. 24 shows a graph for indicating relation of the operation voltage (discharging: temperature at 30° C.) with the current density withdrawn when the flow rate of air is varied (hydrogen generating example 2-2).

Relation of the operation voltage with the current density withdrawn revealed in the test is shown in FIG. 24.

It was found that as the flow rate of air is reduced, the dischargeable limit current density becomes smaller with the reduction of operation voltage.

Figure 25:
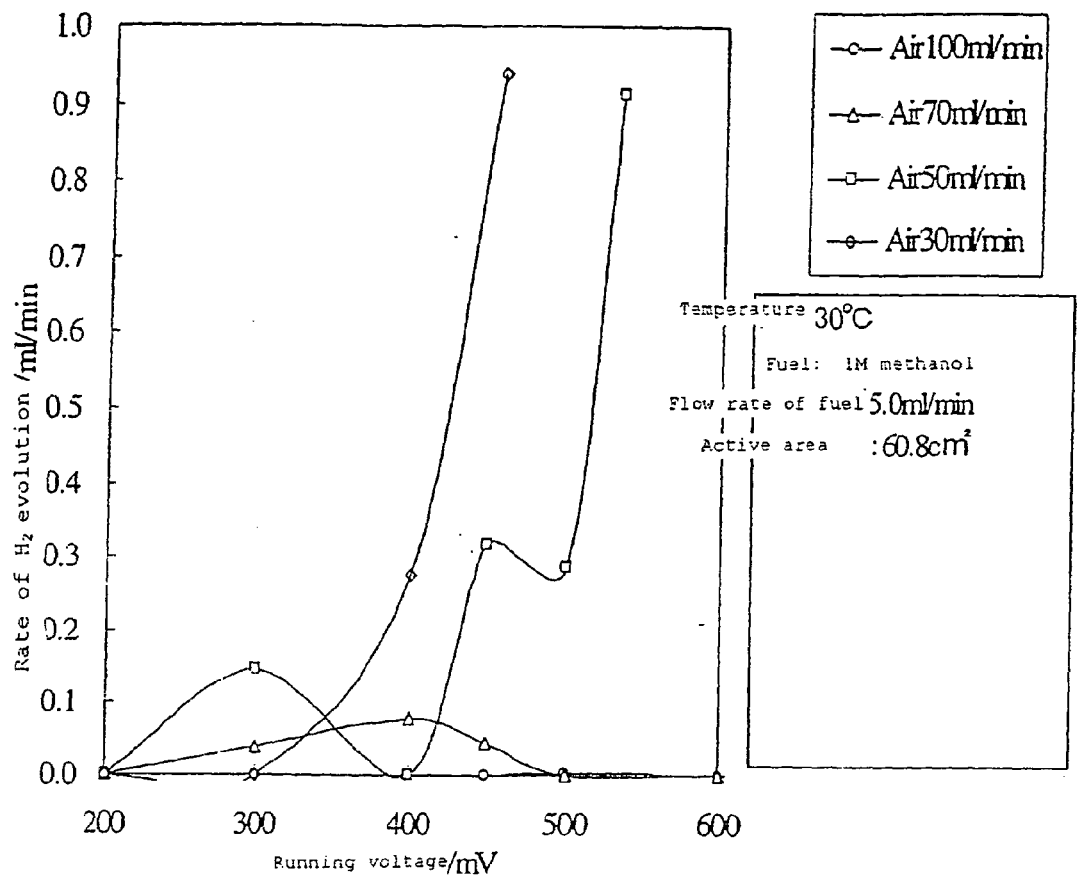
FIG. 25 shows a graph for indicating relation of the rate of hydrogen evolution (discharging: temperature at 30° C.) with the operation voltage when the flow rate of air is varied (hydrogen generating example 2-2).

FIG. 25 shows a graph for indicating relationship between the rate of hydrogen evolution and the operation voltage, both adapted from the results of FIG. 24.

From this, it was found that the rate of hydrogen evolution depends on the operation voltage, and hydrogen evolves when the operation voltage is in the range of 200 to 540 mV. Hydrogen evolves when the flow rate of air is in the range of 30 to 70 ml/min. When the flow rate of air is 100 ml/min, scarcely any evolution of hydrogen is detected.

Hydrogen Generating Example 2-3

The same hydrogen generating cell as that of hydrogen generating example 2-1 was used. The cell was operated while the temperature being kept at 70° C. with the flow rate of air to the air electrode kept at 50-200 ml/min and the flow of 1M aqueous solution of methanol (fuel) to the fuel electrode kept at 5 ml/min. Then, while the current flowing between the air electrode and the fuel electrode being varied, the operation voltage between the fuel electrode and the air electrode, and the rate of hydrogen evolution occurring from the fuel electrode were monitored and analyzed.

Figure 26:
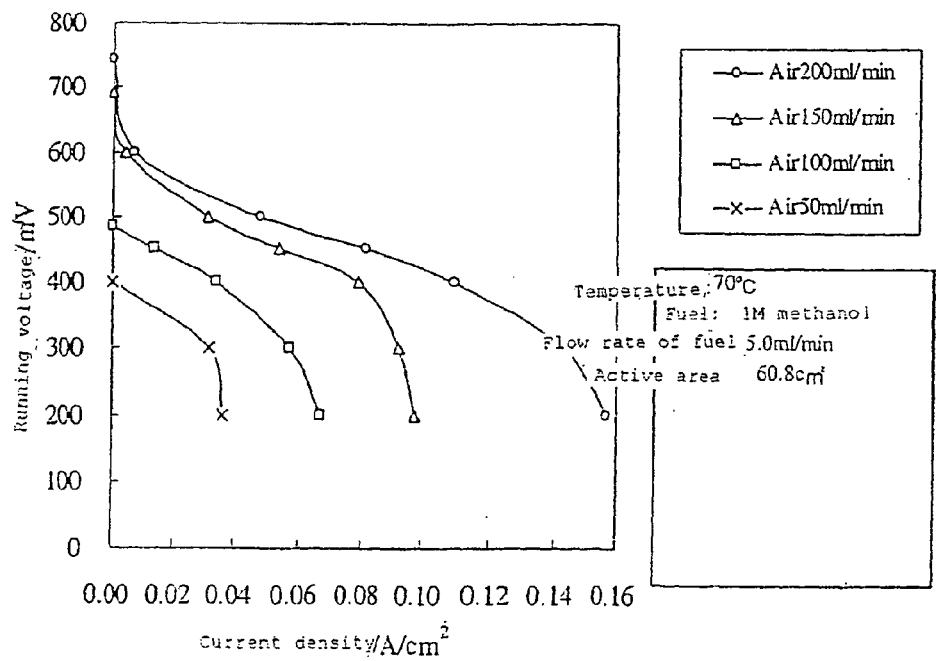
FIG. 26 shows a graph for indicating relation of the operation voltage (discharging: temperature at 70° C.) with the current density withdrawn when the flow rate of air is varied (hydrogen generating example 2-3).

Relation of the operation voltage with the current density withdrawn revealed in the test is shown in FIG. 26.

It was found that as the flow rate of air is reduced, the dischargeable limit current density becomes smaller with the reduction of the operation voltage.

Figure 27:
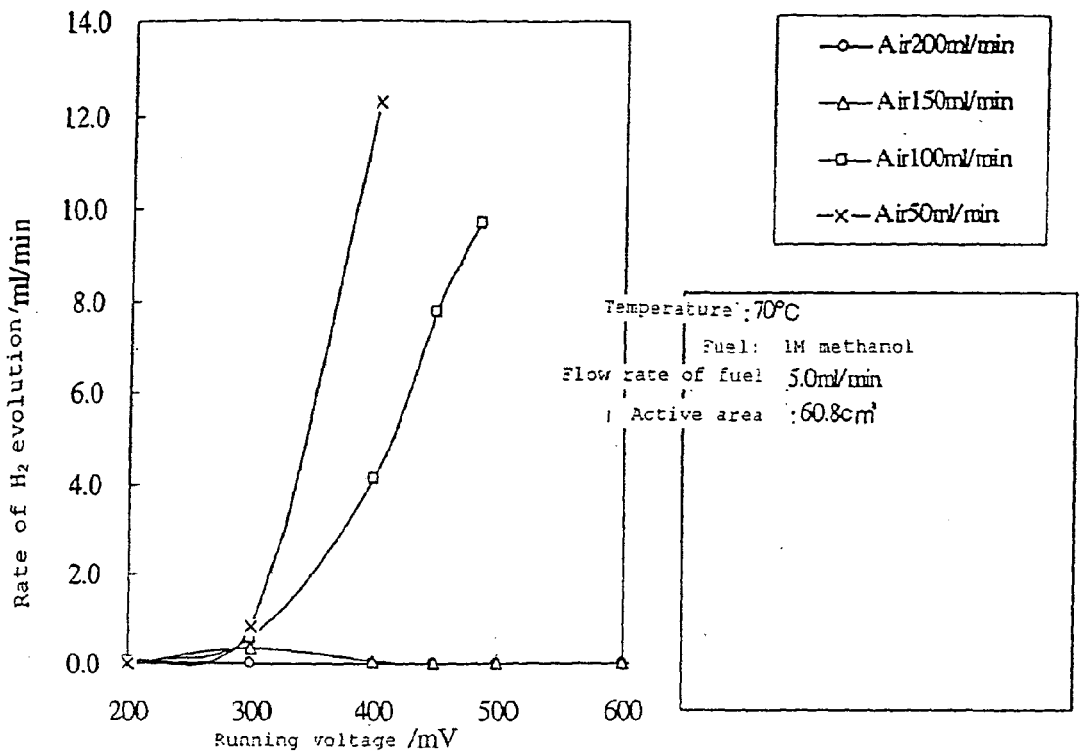
FIG. 27 shows a graph for indicating relation of the rate of hydrogen evolution (discharging: temperature at 70° C.) with the operation voltage when the flow rate of air is varied (hydrogen generating example 2-3).

FIG. 27 shows a graph for indicating relationship between the rate of hydrogen evolution and the operation voltage, both adapted from the results of FIG. 26.

From this, it was found that the rate of hydrogen evolution depends on the operation voltage, and hydrogen evolves when the operation voltage is in the range of 200 to 500 mV. Hydrogen is ready to evolve when the flow rate of air is in the range of 50 to 100 ml/min. When the flow rate of air is excessively large as 150 to 200 ml/min, scarcely any evolution of hydrogen is detected.

Hydrogen Generating Example 2-4

The same hydrogen generating cell as that of hydrogen generating example 2-1 was used. The cell was operated while the temperature being kept at 90° C. with the flow of air to the air electrode kept at 50-250 ml/min and the flow of 1M aqueous solution of methanol (fuel) to the fuel electrode kept at 5 ml/min. Then, while the current flowing between the air electrode and the fuel electrode being varied, the operation voltage between the fuel electrode and the air electrode, and the rate of hydrogen evolution occurring from the fuel electrode were monitored and analyzed.

Figure 28:
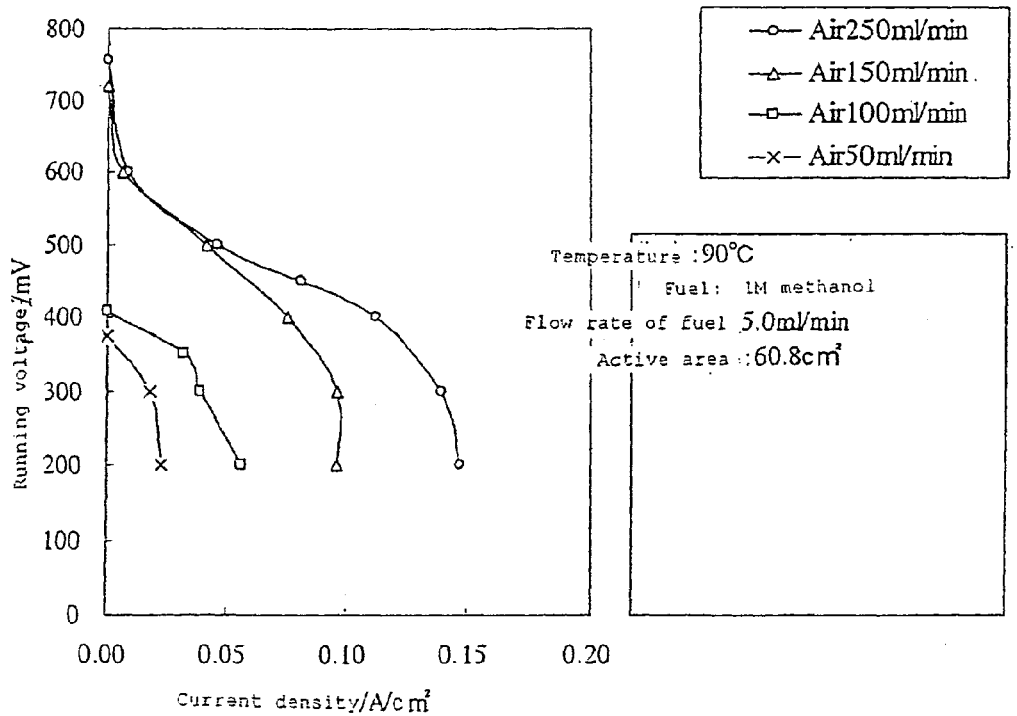
FIG. 28 shows a graph for indicating relation of the operation voltage (discharging: temperature at 90° C.) with the current density withdrawn when the flow rate of air is varied (hydrogen generating example 2-4).

Relation of the operation voltage with the current density withdrawn revealed in the test is shown in FIG. 28.

It was found that as the flow rate of air is reduced, the dischargeable limit current density becomes smaller with the reduction of the operation voltage.

Figure 29:
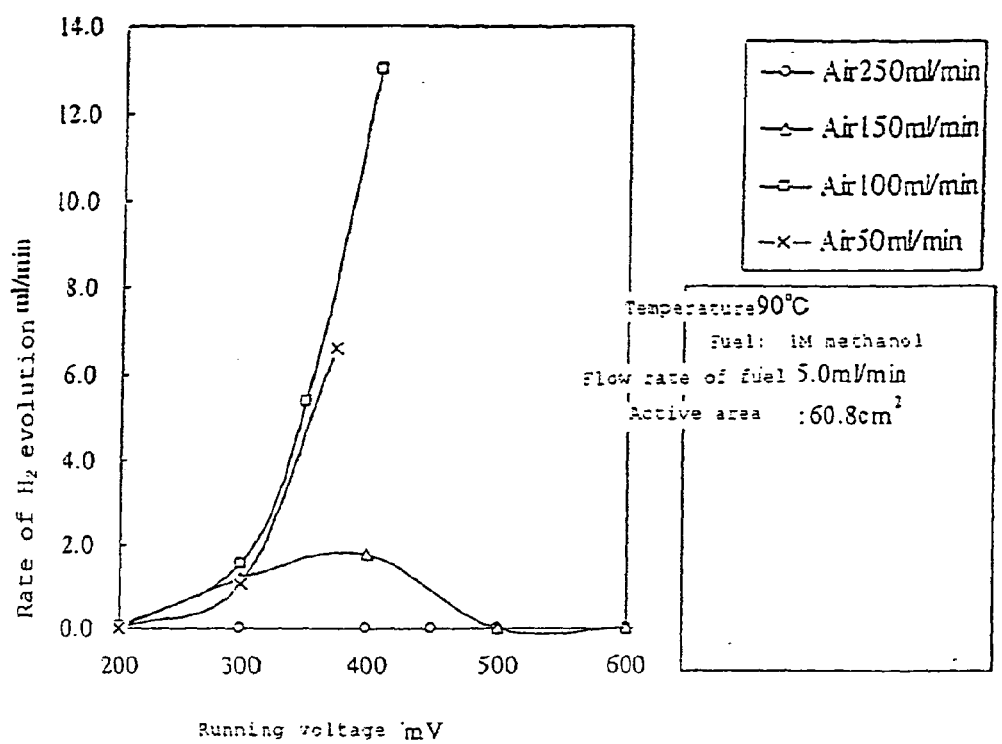
FIG. 29 shows a graph for indicating relation of the rate of hydrogen evolution (discharging: temperature at 90° C.) with the operation voltage when the flow rate of air is varied (hydrogen generating example 2-4).

FIG. 29 shows a graph for indicating relationship between the rate of hydrogen evolution and the operation voltage, both adapted from the results of FIG. 28.

From this, it was found that the rate of hydrogen evolution tends to depend on the operation voltage, and hydrogen evolves when the operation voltage is in the range of 200 to 500 mV. Hydrogen is ready to evolve when the flow rate of air is in the range of 50 to 100 ml/min. When the flow rate of air is at 250 ml/min, scarcely any evolution of hydrogen is detected.

Figure 30:
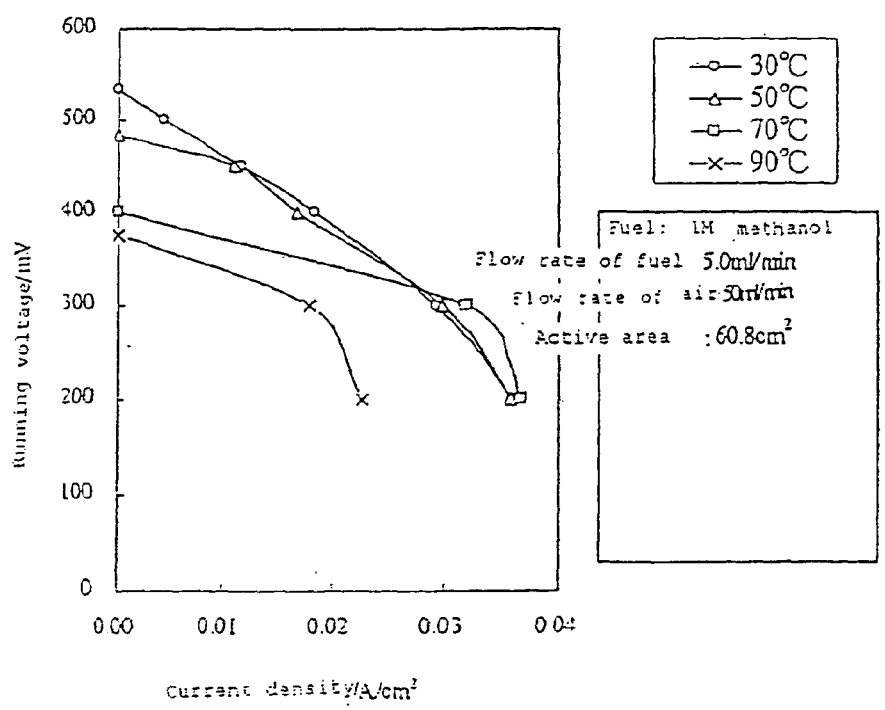
FIG. 30 shows a graph for indicating relation of the operation voltage (discharging: flow rate of air at 50 ml/min) with the current density withdrawn when the temperature is varied.
Figure 31:
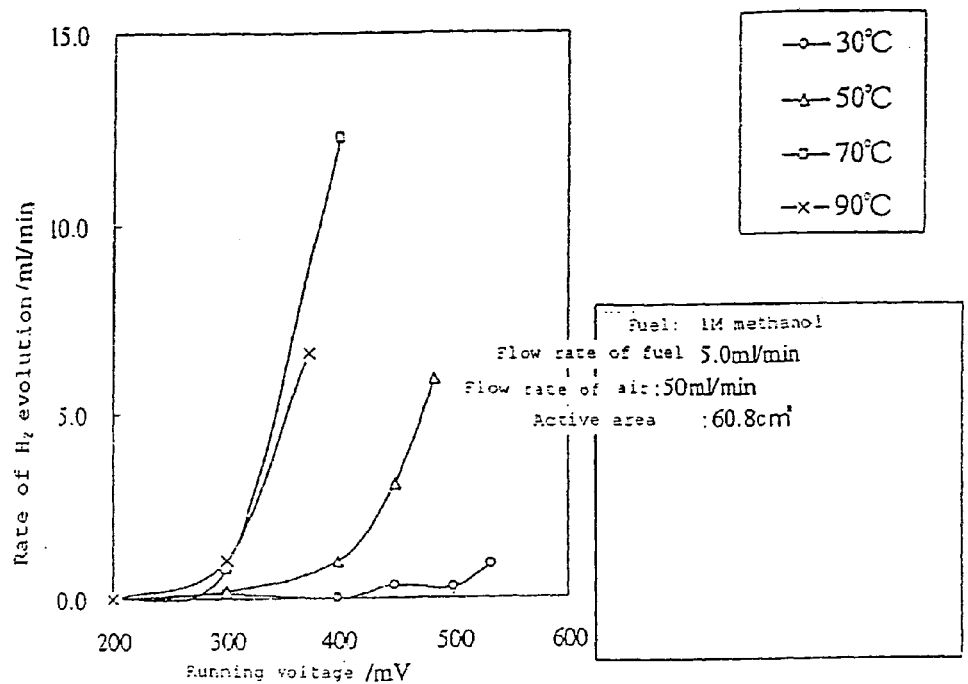
FIG. 31 shows a graph for indicating relation of the rate of hydrogen evolution (discharging: flow rate of air at 50 ml/min) with the operation voltage when the temperature is varied.

Next, when the cell is operated with the flow of air being kept at 50 ml/min while respective temperatures are varied as in hydrogen generating examples 2-1 to 2-4, FIG. 30 shows relation of the current density withdrawn with the operation voltage while FIG. 31 shows relation of the rate of hydrogen evolution with the operation voltage.

From this, it was found that the rate of hydrogen evolution tends to depend on the operation voltage, and as the temperature becomes higher, hydrogen evolves at a lower operation voltage and the evolution volume becomes larger.

Figure 32:
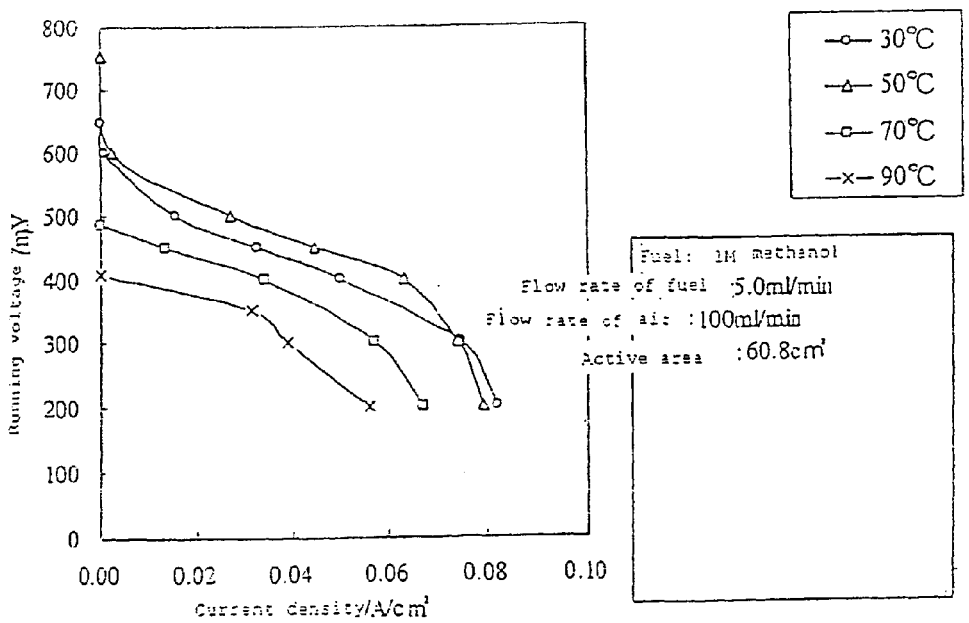
FIG. 32 shows a graph for indicating relation of the operation voltage (discharging: flow rate of air at 100 ml/min) with the current density withdrawn when the temperature is varied.
Figure 33:
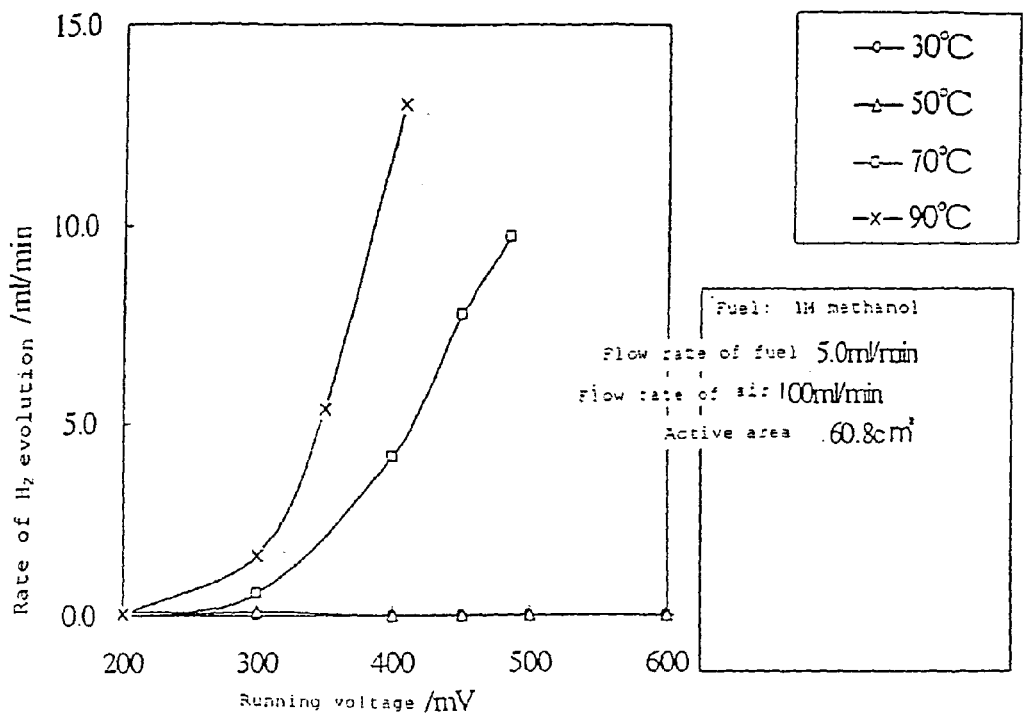
FIG. 33 shows a graph for indicating relation of the rate of hydrogen evolution (discharging: flow rate of air at 100 ml/min) with the operation voltage when the temperature is varied.

Further, when the cell is operated with the flow of air being kept at 100 ml/min while respective temperatures are varied as in hydrogen generating examples 2-1 to 2-4, FIG. 32 shows relation of the current density withdrawn with the operation voltage while FIG. 33 shows relation of the rate of hydrogen evolution with the operation voltage.

From this, it was found that the rate of hydrogen evolution tends to depend on the operation voltage, and as the temperature becomes higher, hydrogen evolves at a lower operation voltage and the evolution volume becomes larger. It was also found that when the flow rate of air is excessively large as 100 ml/min, scarcely any evolution of hydrogen is detected when the temperature is kept as low as 30 or 50° C.

Hydrogen Generating Example 2-5

The same hydrogen generating cell as that of hydrogen generating example 2-1 was used. The cell was operated while the temperature being kept at 50° C. with the flow of air to the air electrode kept at 50 ml/min and the flow rate of fuel to the fuel electrode varied to 1.5, 2.5, 5.0, 7.5, or 10.0 ml/min. Then, while the current flowing between the air electrode and the fuel electrode being varied, the operation voltage between the fuel electrode and the air electrode, and the rate of hydrogen evolution occurring from the fuel electrode were monitored and analyzed.

Figure 34:
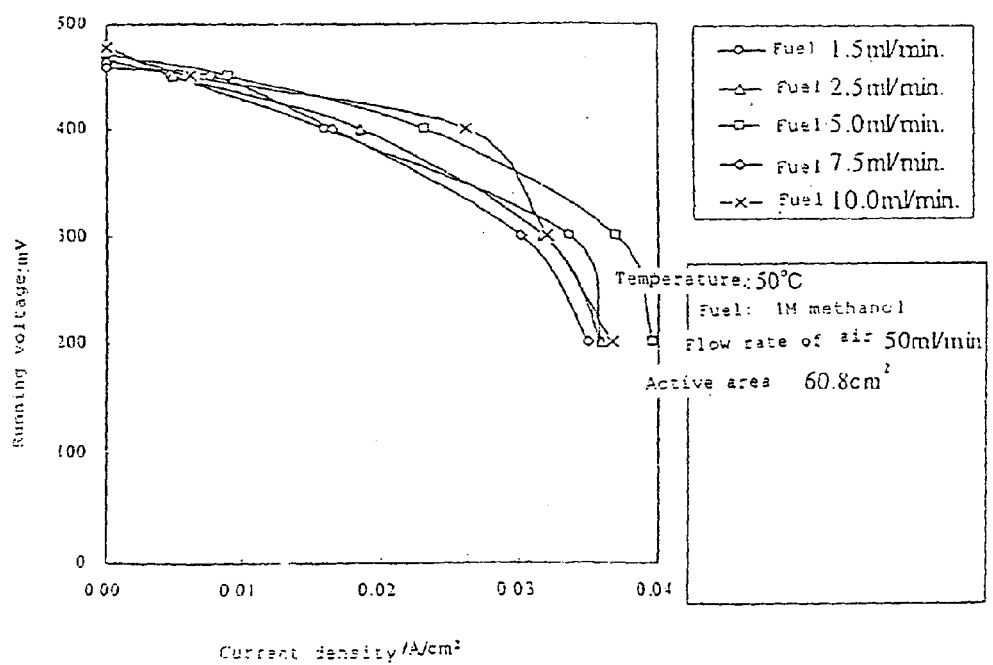
FIG. 34 shows a graph for indicating relation of the operation voltage (discharging: temperature at 50° C.) with the current density withdrawn when the flow rate of fuel is varied (hydrogen generating example 2-5).

Relation of the operation voltage with the current density withdrawn revealed in the test is shown in FIG. 34.

It was found that the dischargeable limit current density hardly changes even when the flow of fuel is varied.

Figure 35:
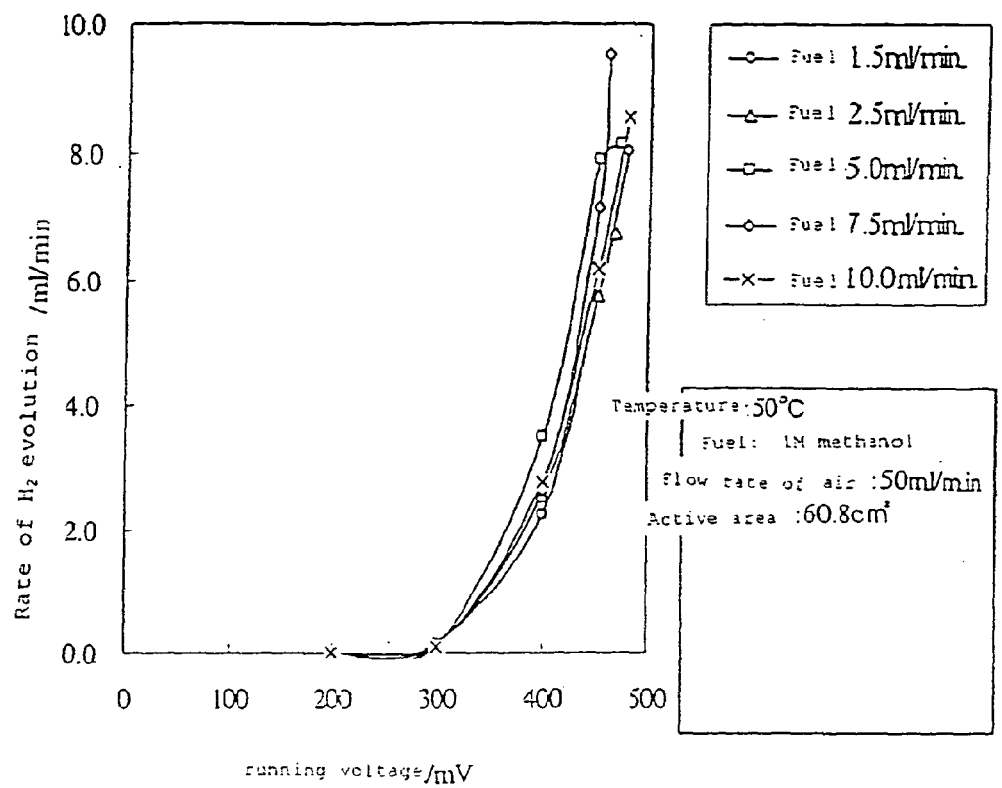
FIG. 35 shows a graph for indicating relation of the rate of hydrogen evolution (discharging: temperature at 50° C.) with the operation voltage when the flow rate of fuel is varied (hydrogen generating example 2-5).

FIG. 35 shows a graph for indicating relationship between the rate of hydrogen evolution and the operation voltage, both adapted from the results of FIG. 34.

From this, it was found that the rate of hydrogen evolution depends on the operation voltage, and hydrogen evolves when the operation voltage is in the range of 300 to 500 mV. The rate of hydrogen evolution is high when the operation voltage is in the range of 450 to 500 ml/min.

It was found that the rate of hydrogen evolution is hardly affected by the flow rate of fuel.

Hydrogen Generating Example 2-6

The same hydrogen generating cell as that of hydrogen generating example 2-1 was used. The cell was operated while the temperature being kept at 50° C. with the flow of air to the air electrode kept at 50 ml/min and the constant flow of fuel to the fuel electrode kept at 5 ml/min while fuel concentration being varied to 0.5, 1, 2, or 3M. Then, while the current flowing between the air electrode and the fuel electrode being varied, the operation voltage between the fuel electrode and the air electrode, and the rate of hydrogen evolution occurring from the fuel electrode were monitored and analyzed.

Figure 36:
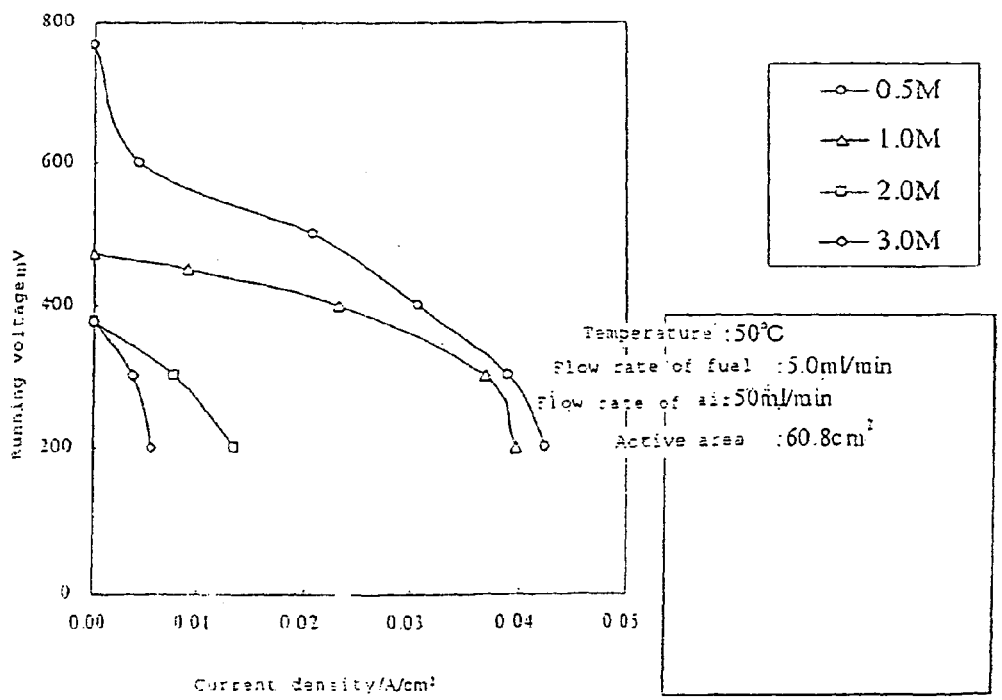
FIG. 36 shows a graph for indicating relation of the operation voltage (discharging: temperature at 50° C.) with the current density withdrawn when the concentration of fuel is varied (hydrogen generating example 2-6).

Relation of the voltage with the current density withdrawn revealed in the test is shown in FIG. 36.

It was found that the dischargeable limit current density declines as the concentration of fuel becomes higher with the reduction of operation voltage.

Figure 37:
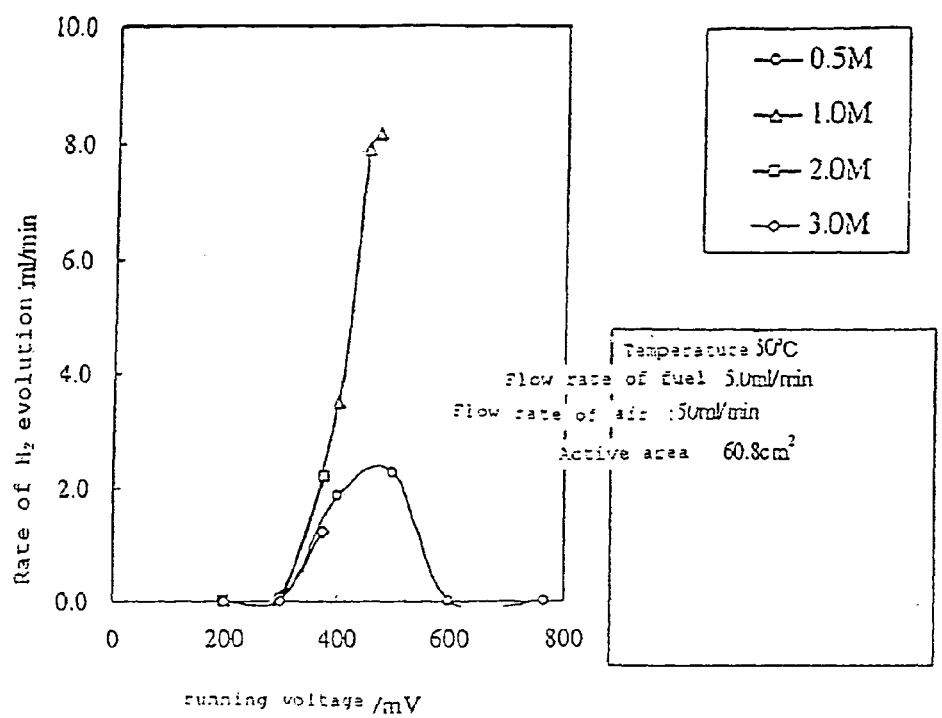
FIG. 37 shows a graph for indicating relation of the rate of hydrogen evolution (discharging: temperature at 50° C.) with the operation voltage when the concentration of fuel is varied (hydrogen generating example 2-6).

FIG. 37 shows a graph for indicating relationship between the rate of hydrogen evolution and the operation voltage, both adapted from the results of FIG. 36.

From this, it was found that the rate of hydrogen evolution depends on the voltage, and hydrogen evolves when the operation voltage is in the range of 300 to 600 mV.

Hydrogen evolves most vigorously when the concentration of fuel is 1M.

Hydrogen Generating Example 2-7

The same hydrogen generating cell as that of hydrogen generating example 2-1 was used (except that the air electrode consisted of an oxidizing electrode to which oxygen was flowed). The cell was operated while the temperature being kept at 50° C. with the flow of oxidizing gas to the oxidizing electrode kept at 14.0 ml/min and the constant flow of 1M fuel concentration to the fuel electrode kept at 5 ml/min, while the concentration of oxygen being varied to 10, 21, 40, or 100%. Then, while the current flowing between the oxidizing electrode and the fuel electrode being varied, the operation voltage between the fuel electrode and the oxidizing electrode, and the rate of hydrogen evolution occurring from the fuel electrode were monitored and analyzed. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen concentration) to air.

Figure 38:
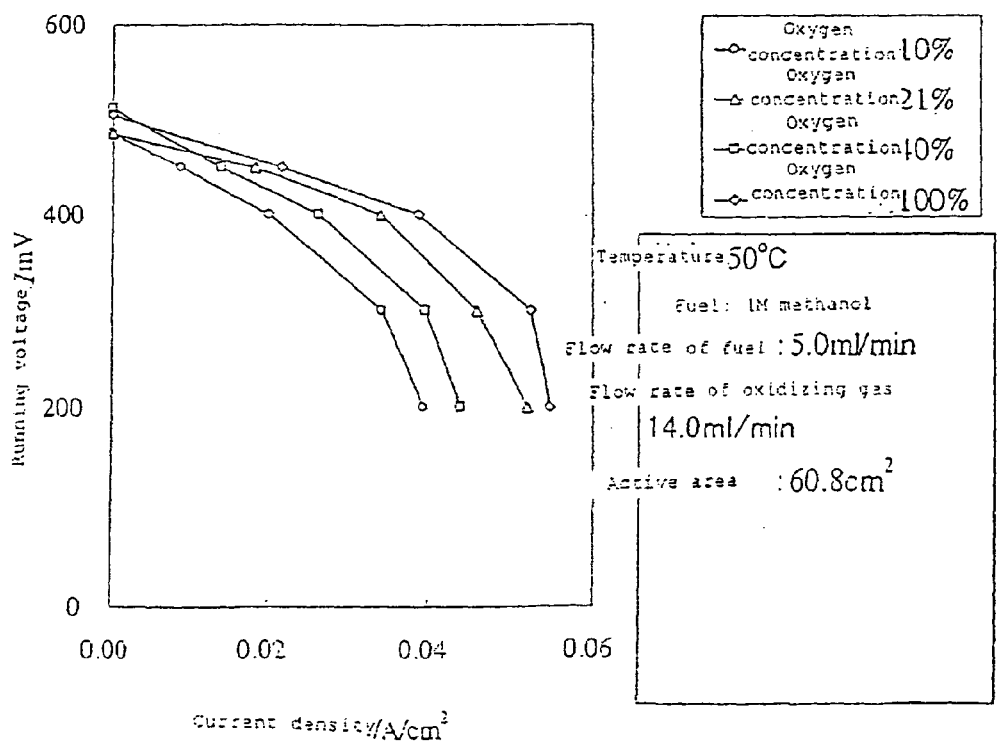
FIG. 38 shows a graph for indicating relation of the operation voltage (discharging: temperature at 50° C.) with the current density withdrawn when the concentration of oxygen is varied (hydrogen generating example 2-7).

Relation of the operation voltage with the current density withdrawn revealed in the test is shown in FIG. 38.

It was found that the operation voltage declines as the concentration of oxygen becomes smaller with the reduction of dischargeable limit current density.

Figure 39:
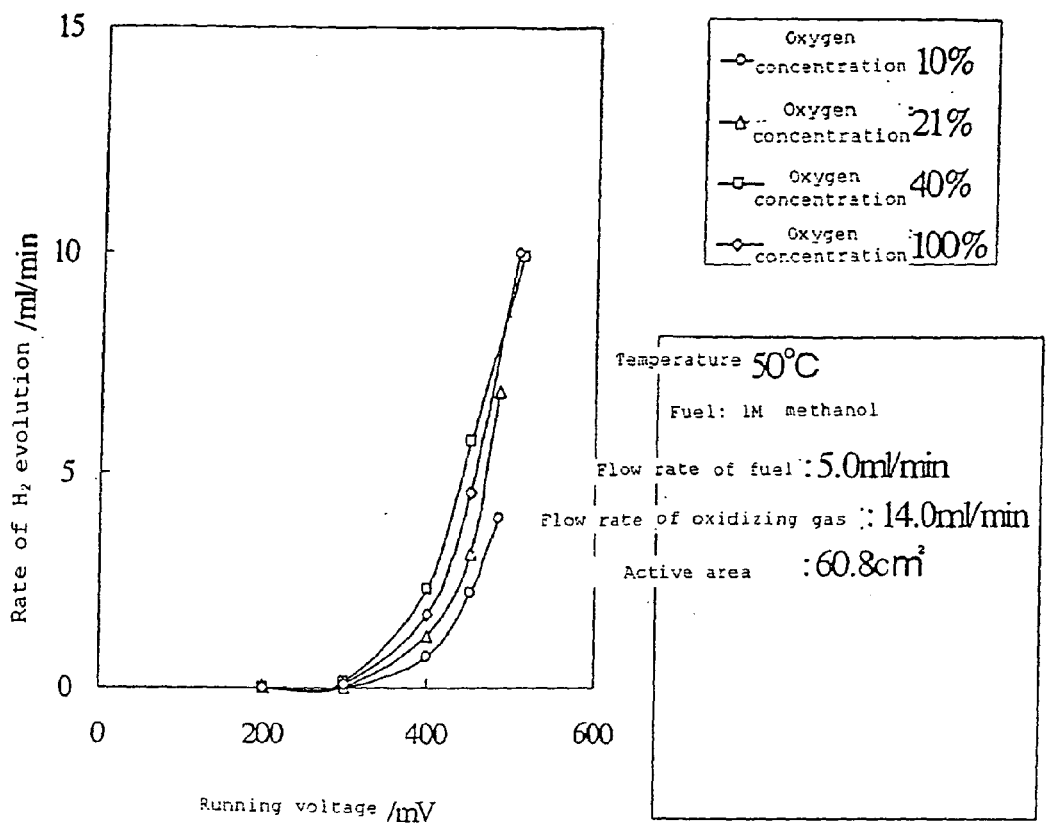
FIG. 39 shows a graph for indicating relation of the rate of hydrogen evolution (discharging: temperature at 50° C.) with the operation voltage when the concentration of oxygen is varied (hydrogen generating example 2-7).

FIG. 39 shows a graph for indicating relationship between the rate of hydrogen evolution and the operation voltage, both adapted from the results of FIG. 38.

From this, it was found that the rate of hydrogen evolution depends on the operation voltage, and hydrogen evolves when the operation voltage is in the range of 300 to 600 mV.

The rate of hydrogen evolution tends to be high as the concentration of oxygen becomes higher.

Hydrogen Generating Example 2-8

The same hydrogen generating cell as that of hydrogen generating example 2-1 was used (except that the air electrode consisted of an oxidizing electrode to which liquid hydrogen peroxide was flowed). The hydrogen generating cell was placed in an electric furnace where hot air was circulated. The cell was operated while the temperature being varied to 30, 50, 70, or 90° C. with the flow of 1M aqueous solution of $H_2O_2$ (hydrogen peroxide) to the oxidizing electrode varied from 2.6 to 5.5 ml/min, and the flow of 1M aqueous solution of methanol (fuel) to the fuel electrode kept at 5 ml/min. Then, while the current flowing between the oxidizing electrode and the fuel electrode being varied, the operation voltage between the fuel electrode and the oxidizing electrode, and the rate of hydrogen evolution occurring from the fuel electrode were monitored and analyzed. The flow rate of hydrogen peroxide was adjusted such that the open-circuit voltage was approximately equal to 500 mV for all the temperatures tested.

Figure 40:
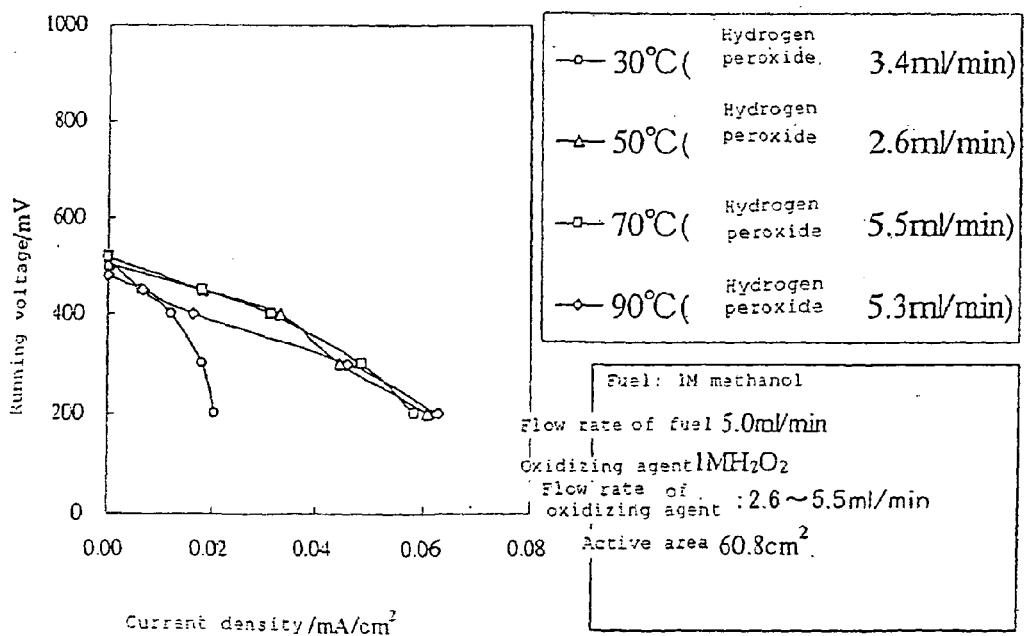
FIG. 40 shows a graph for indicating relation of the operation voltage (discharging: oxidizing agent of $H_2O_2$) with the current density withdrawn when the temperature is varied (hydrogen generating example 2-8).

Relation of the operation voltage with the current density withdrawn revealed in the test is shown in FIG. 40.

It was found that the decline of operation voltage with the increase of current density takes a similar course when the temperature is kept at 70 to 90° C., while operation voltage undergoes a sharp fall when the temperature is decreased to 30° C. with the reduction of dischargeable limit current density.

Figure 41:
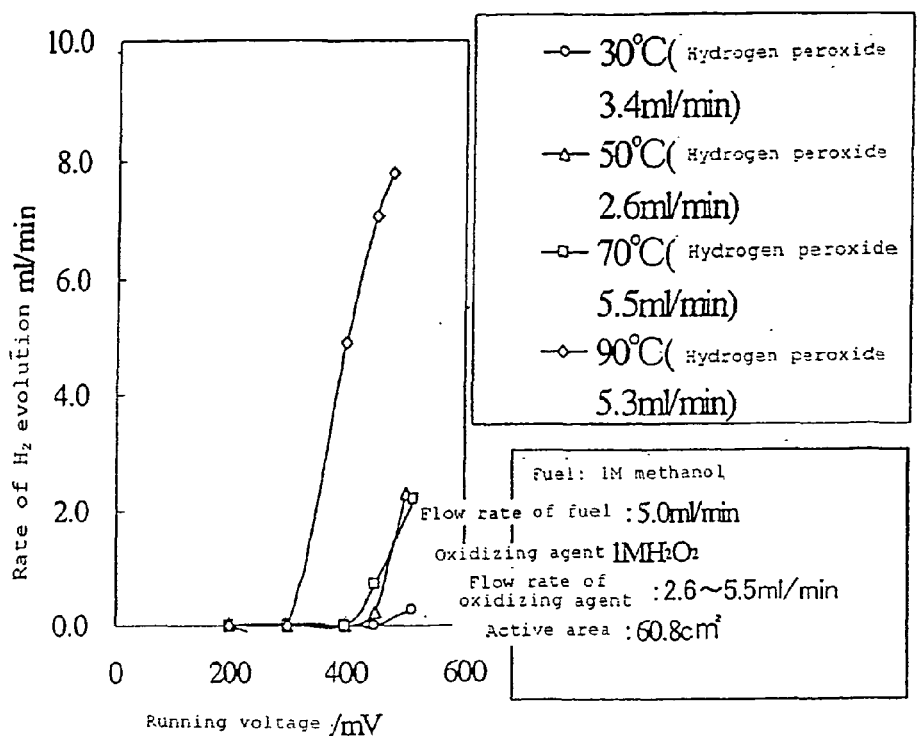
FIG. 41 shows a graph for indicating relation of the rate of hydrogen evolution (discharging: oxidizing agent of $H_2O_2$) with the operation voltage when the temperature is varied (hydrogen generating example 2-8).

FIG. 41 shows a graph for indicating relationship between the rate of hydrogen evolution and the operation voltage, both adapted from the results of FIG. 40.

From this, it was found that the rate of hydrogen evolution tends to depend on the operation voltage, and hydrogen evolves when the operation voltage is in the range of 300 to 500 mV. Hydrogen is most ready to evolve when the temperature is 90° C. Hydrogen does not evolve unless the operation voltage is raised sufficiently high, when the temperature is at the low level tested.

What is important here is that current was withdrawn outside from the hydrogen generating cells of Example 2. In other words, the hydrogen generating cell of Example 2 converted part of fuel into hydrogen while withdrawing electric energy to outside. In addition, conversion of fuel into hydrogen occurred at a surprisingly low temperature of 30 to 90° C. In view of these facts, the hydrogen generating device of the invention is likely to be novel and the effect to use this hydrogen generating device in the hydrogen supply system is profound.

EXAMPLE 3

Illustrative examples of the hydrogen generating device used in the hydrogen supply system as defined by claim 5 of the invention (charging condition) will be presented below.

Hydrogen Generating Example 3-1

Figure 42:
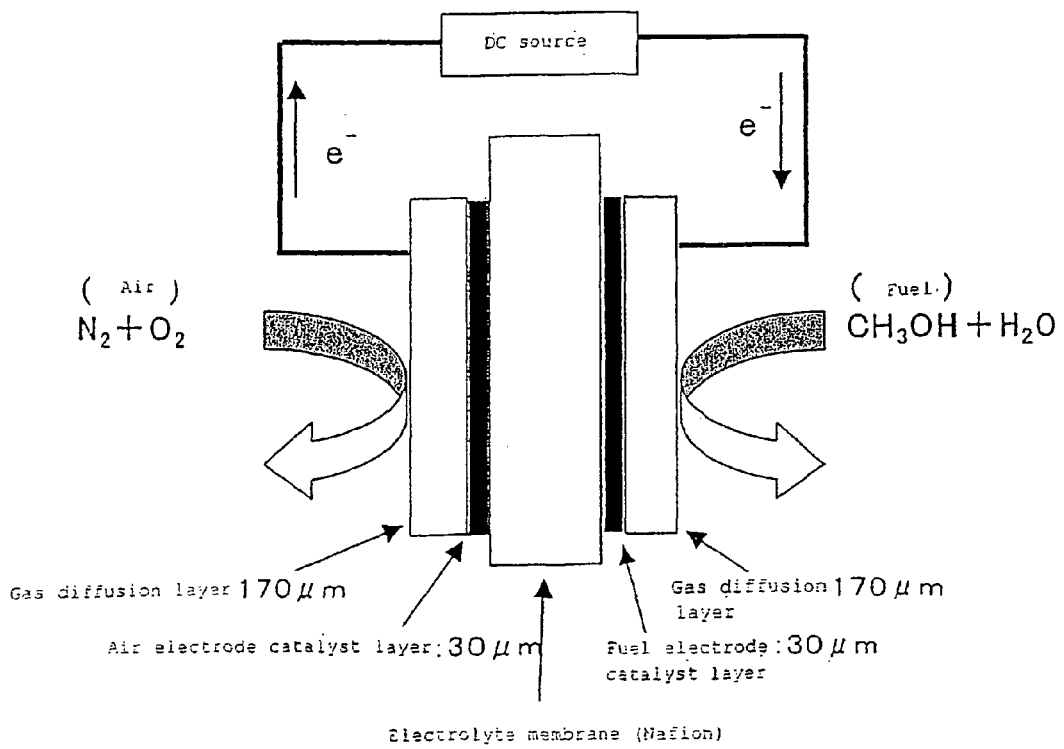
FIG. 42 is a schematic diagram of a hydrogen generating cell (with means for providing external electric energy) described in Example 3.

The structure of hydrogen generating cells described in Example 3 (hydrogen generating examples 3-1 to 3-8) with means for providing electric energy from outside is outlined in FIG. 42.

The hydrogen generating cells are the same in structure as those of hydrogen generating example 1-1 except that the cell comprises a fuel electrode as cathode and an oxidizing electrode as anode with means for providing electric energy from outside.

The hydrogen generating cell was placed in an electric furnace where hot air was circulated. The cell was operated while the temperature (operation temperature) being kept at 50° C. with the flow of air to the air electrode kept at 10 to 80 ml/min and the flow of 1M aqueous solution of methanol (fuel) to the fuel electrode kept at 5 ml/min. Then, while the current flowing between the air electrode and the fuel electrode being varied by means of a DC power source from outside, the operation voltage between the fuel electrode and the air electrode, the volume of gas evolved from the fuel electrode and gas composition were monitored and analyzed. The energy efficiency of charging condition was defined as a ratio of the chemical-energy of hydrogen evolved to the electric energy supplied from outside. The concentration of hydrogen in the generated gas was determined by gas chromatography, and rate of hydrogen evolution also determined.

The energy efficiency of a charging condition was calculated based on the following equation:

Energy efficiency (%)=(combustion heat of $H_2$/electric energy provided)×100

Combustion heat (kJ) of $H_2$ per minute=(rate of $H_2$ evolution ml/min/24.47/1000)×286 kJ/mol [HHV]

Electric energy (kJ) per minute=(voltage mV/1000× current A×60 sec)Wsec/1000

To avoid undue misunderstanding, a few comments are added here. The object of this invention lies in obtaining hydrogen gas having a higher energy content than the electric energy supplied from outside, and the invention does not aim to gain more energy than the sum of paid energy without taking any heed to the law of conservation of energy taught by thermodynamics. When the energy balance of the entire system is taken into view, since part of organic compound-based fuel is oxidized, the energy expenditure includes, in addition to the electric energy supplied from outside, the chemical energy consumed for the oxidization of the fuel, which will amount to a value equal to or less than 100%. To distinguish more clearly the inventive method from conventional methods for obtaining hydrogen via the electrolysis of water, the energy efficiency of a system defined by the ratio of the chemical energy of evolved hydrogen to the electric energy supplied from outside will be used here.

Figure 43:
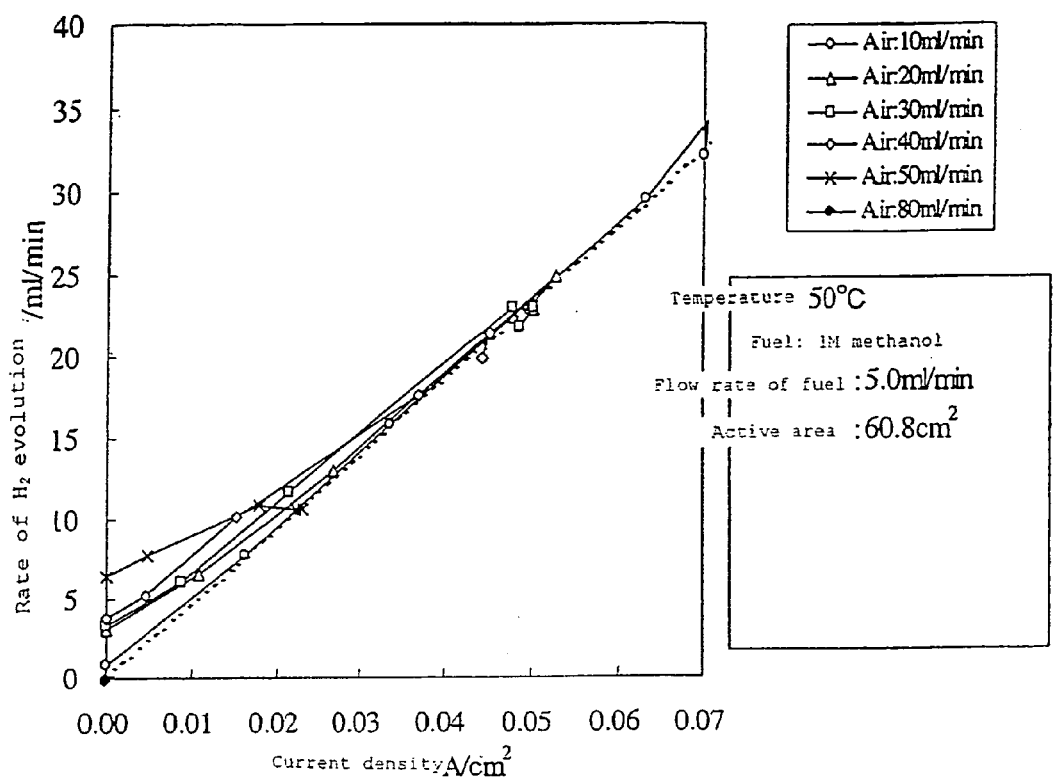
FIG. 43 shows a graph for indicating relation of the rate of hydrogen evolution (charging: temperature at 50° C.) with the current density applied when the flow rate of air is varied (hydrogen generating example 3-1).

Relation of the rate of hydrogen evolution with the current density applied in the test is shown in FIG. 43.

It was found that the efficiency of hydrogen evolution (efficiency of hydrogen evolution relative to electric energy supplied) becomes equal to or more than 100% (100% efficiency of hydrogen evolution is represented by the dashed line in FIG. 43) in certain areas when the current density is kept not more than 40 mA/cm$^2$. This suggests that it is possible to obtain hydrogen whose energy content is larger than the electric energy supplied from outside by operating the cell in those areas.

Figure 44:
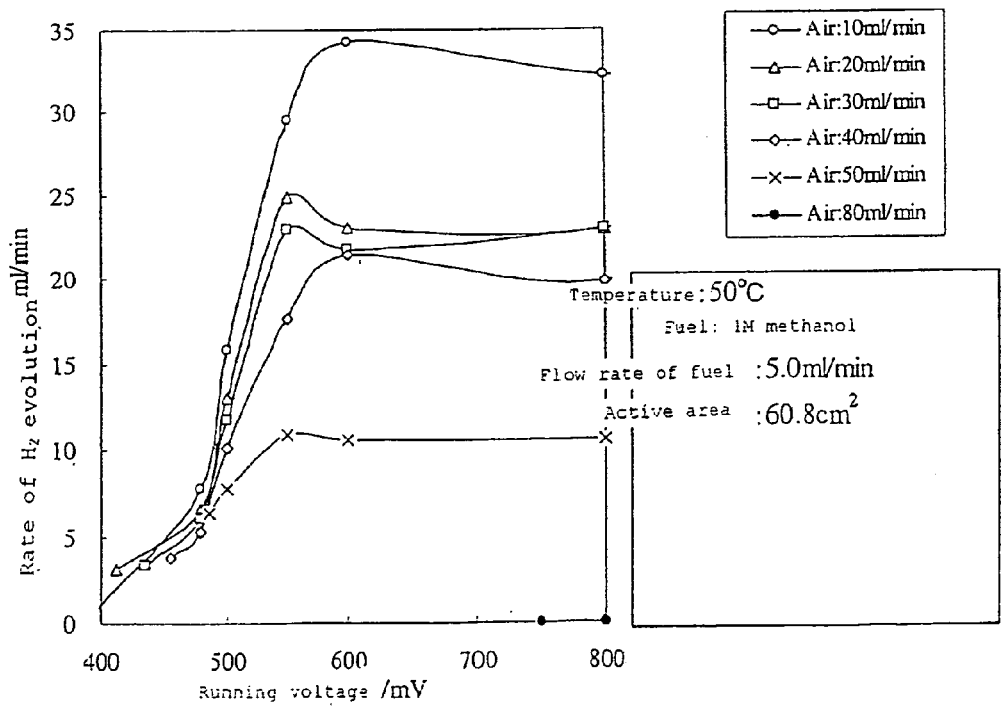
FIG. 44 shows a graph for indicating relation of the rate of hydrogen evolution (charging: temperature at 50° C.) with the operation voltage when the flow rate of air is varied (hydrogen generating example 3-1).

FIG. 44 shows a graph for indicating relationship between the rate of hydrogen evolution and the operation voltage, both adapted from the results of FIG. 43.

From this, it was found that the rate of hydrogen evolution (volume of hydrogen evolution) tends to depend on the operation voltage, and hydrogen evolves when the operation voltage is equal to or larger than 400 mV, and the rate of hydrogen evolution becomes virtually constant when the operation voltage becomes equal to or larger than 600 mV, and the rate of hydrogen evolution becomes larger (hydrogen is readier to evolve) with reduction of the flow rate of air.

Figure 45:
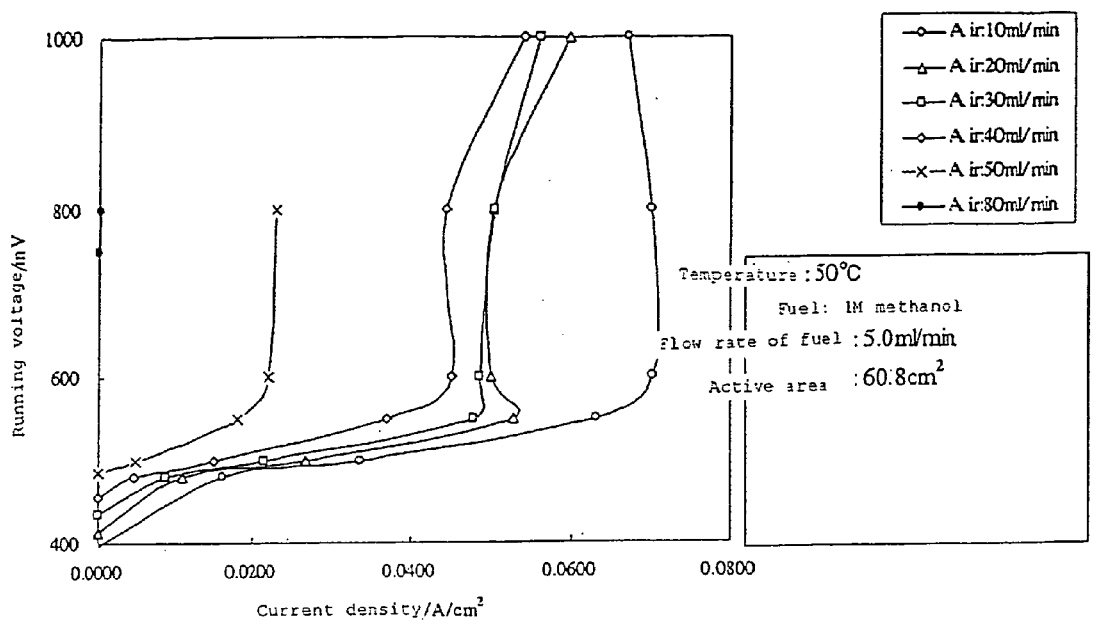
FIG. 45 shows a graph for indicating relation of the operation voltage (charging: temperature at 50° C.) with the current density applied when the flow rate of air is varied (hydrogen generating example 3-1).

Relation of the operation voltage with the current density applied is shown in FIG. 45.

The areas in FIG. 43 where the efficiency of hydrogen evolution is 100% or more fall below the line defined by the operation voltage being equal to or lower than 600 mV in FIG. 45.

Figure 46:
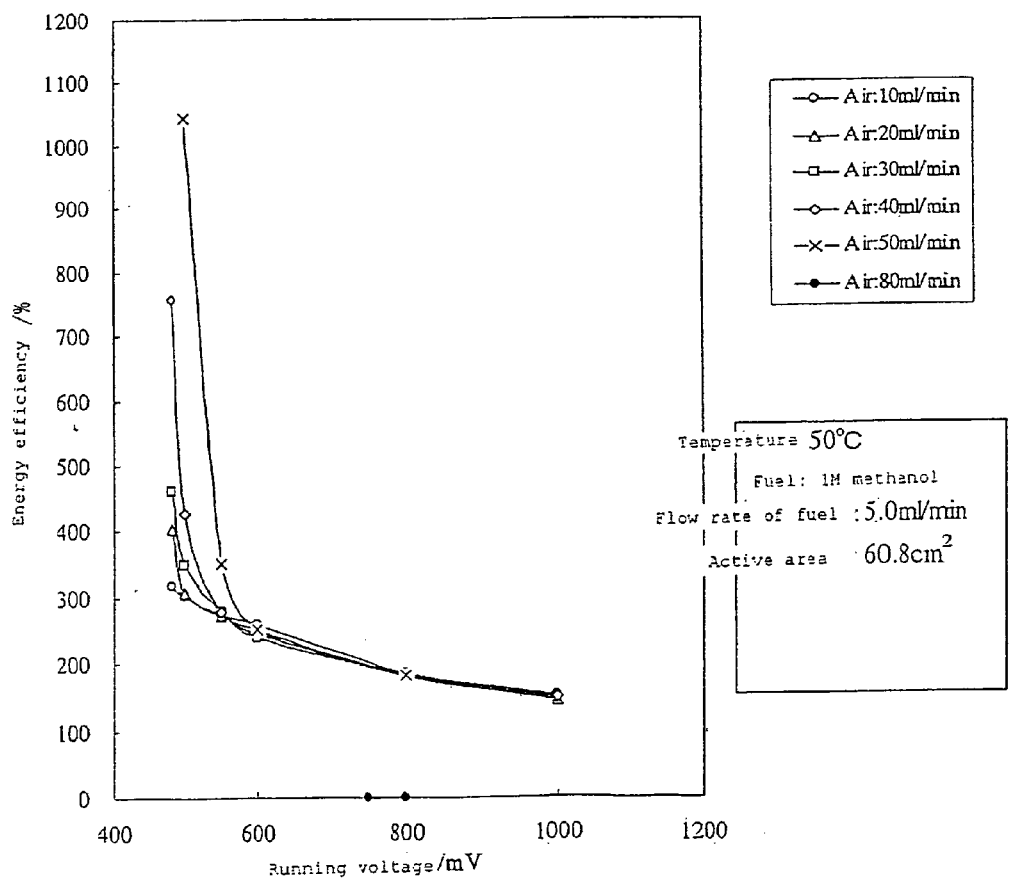
FIG. 46 shows a graph for indicating relation of the energy efficiency (charging: temperature at 50° C.) with the operation voltage when the flow rate of air is varied (hydrogen generating example 3-1).

Relation of the energy efficiency with the operation voltage is shown in FIG. 46.

From this, it was found that the energy efficiency is equal to or larger than 100% even when the operation voltage is around 1000 mV, and the energy efficiency is particularly high when the operation voltage is kept equal to or smaller than 600 mV, and the flow of air is kept at 30 to 50 ml/min.

Next, the cell was operated under a condition of high energy efficiency (1050%): temperature at 50° C.; flow rate of fuel at 5 ml/min; flow rate of air at 50 ml/min; and current density at 4.8 mA/cm$^2$ to cause gas to evolve. The concentration of hydrogen in the gas was determined by gas chromatography. As a result it was found that the gas contained hydrogen at about 86%, and hydrogen evolved at a rate of 7.8 ml/min. No CO was detected.

Hydrogen Generating Example 3-2

The same hydrogen generating cell as that of hydrogen generating example 3-1 was used. The cell was operated while the temperature being kept at 30° C. with the flow of air to the air electrode varied from 10 to 70 ml/min and the flow of 1M aqueous solution of methanol (fuel) to the fuel electrode kept at 5 ml/min. Then, while the current flowing between the air electrode and the fuel electrode being varied by means of a DC power source from outside, the operation voltage between the fuel electrode and the air electrode, the rate of hydrogen evolution occurring from the fuel electrode, and the energy efficiency were monitored and analyzed.

Figure 47:
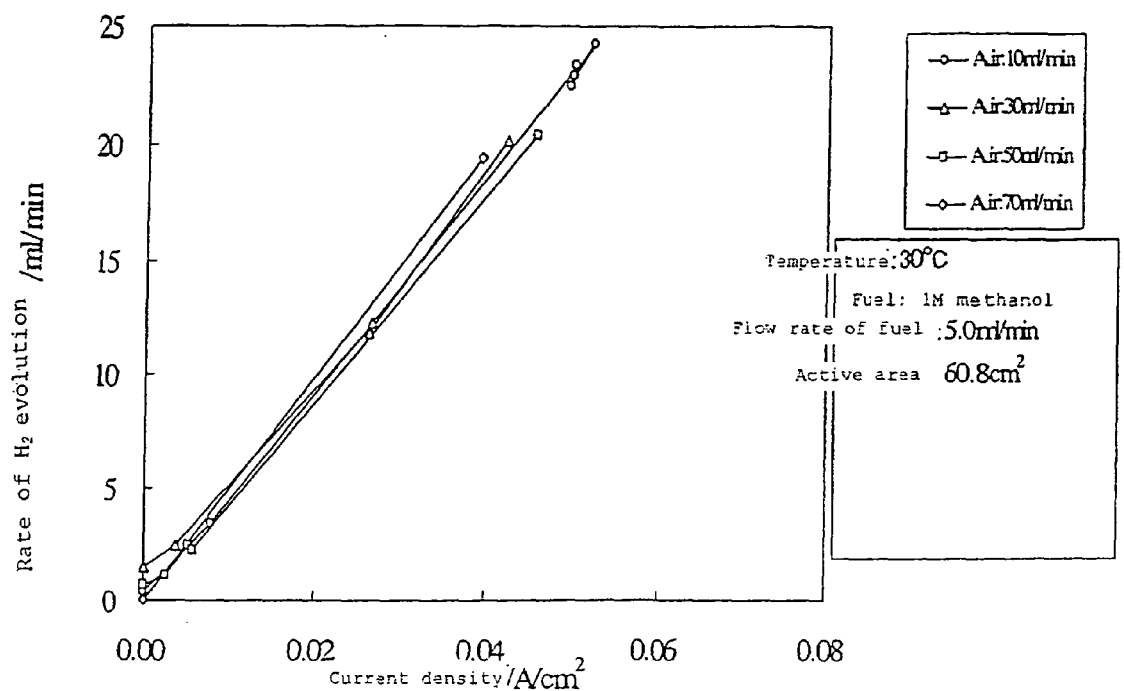
FIG. 47 shows a graph for indicating relation of the rate of hydrogen evolution (charging: temperature at 30° C.) with the current density applied when the flow rate of air is varied (hydrogen generating example 3-2).
Figure 48:
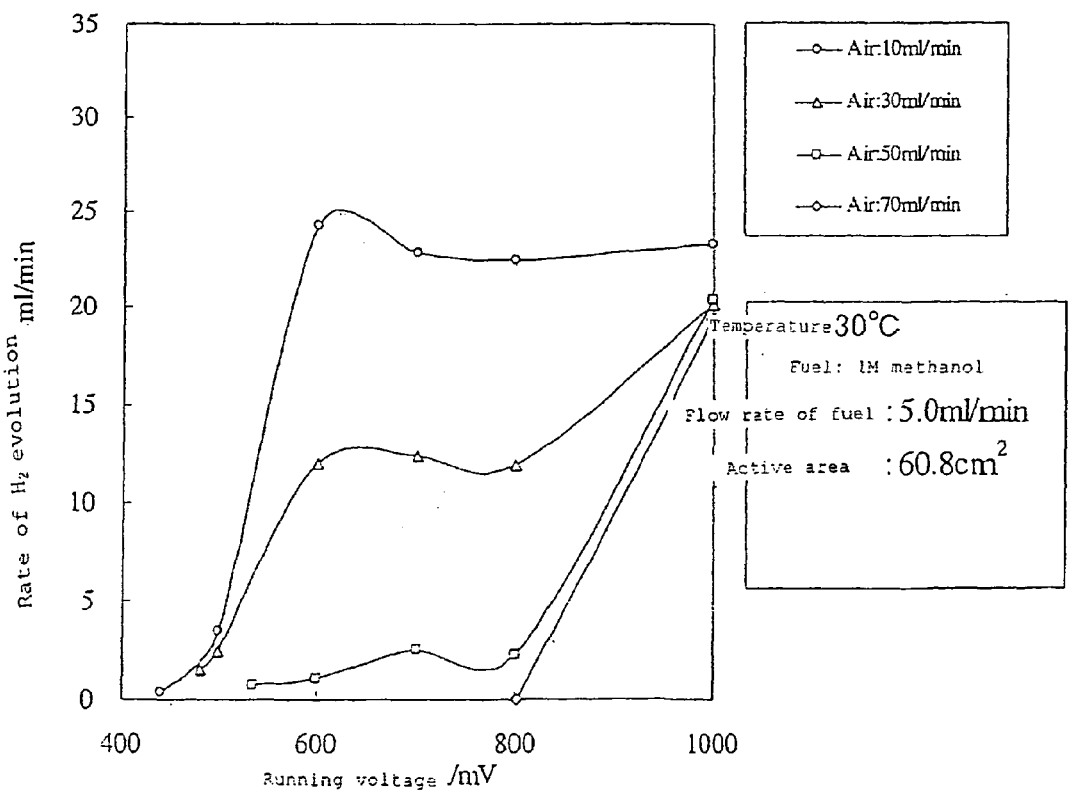
FIG. 48 shows a graph for indicating relation of the rate of hydrogen evolution (charging: temperature at 30° C.) with the operation voltage when the flow rate of air is varied (hydrogen generating example 3-2).

In this test, relation of the rate of hydrogen evolution with the current density applied is shown in FIG. 47, and relation of the rate of hydrogen evolution with the operation voltage is shown in FIG. 48.

From this, it was found that the rate of hydrogen evolution tends to depend on the operation voltage, and hydrogen evolves when the operation voltage is equal to or larger than 400 mV; hydrogen is readier to evolve with reduction of the flow rate of air; and the rate of hydrogen evolution becomes virtually constant with the air flow of 10 ml/min, when the operation voltage becomes equal to or larger than 600 mV, while the rate of hydrogen evolution tends to grow with the air flow of 30 ml/min, when the operation voltage becomes equal to or larger than 800 mV, and thus no hydrogen will evolve when air flows at a higher rate unless the operation voltage is raised sufficiently high.

Figure 49:
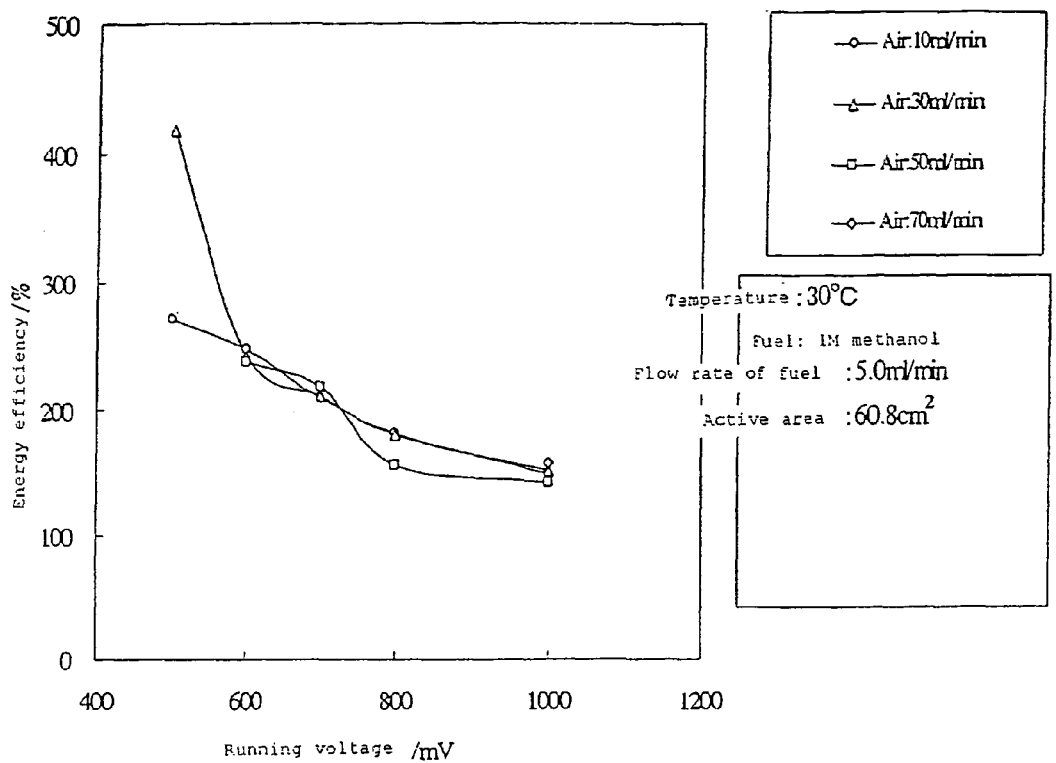
FIG. 49 shows a graph for indicating relation of the energy efficiency (charging: temperature at 30° C.) with the operation voltage when the flow rate of air is varied (hydrogen generating example 3-2).

Relation of the energy efficiency with the operation voltage is shown in FIG. 49.

From this, it was found that the energy efficiency is equal to or larger than 100% even when the operation voltage is around 1000 mV, and the energy efficiency is particularly high with the air flow of 30 ml/min when the operation voltage is kept equal to or smaller than 600 mV.

Hydrogen Generating Example 3-3

The test was performed under the same condition as in hydrogen generating example 3-2 except that the temperature of the cell was kept at 70° C. The operation voltage between the fuel electrode and the air electrode, and rate of hydrogen evolution on the fuel electrode and energy efficiency were monitored and analyzed.

Figure 50:
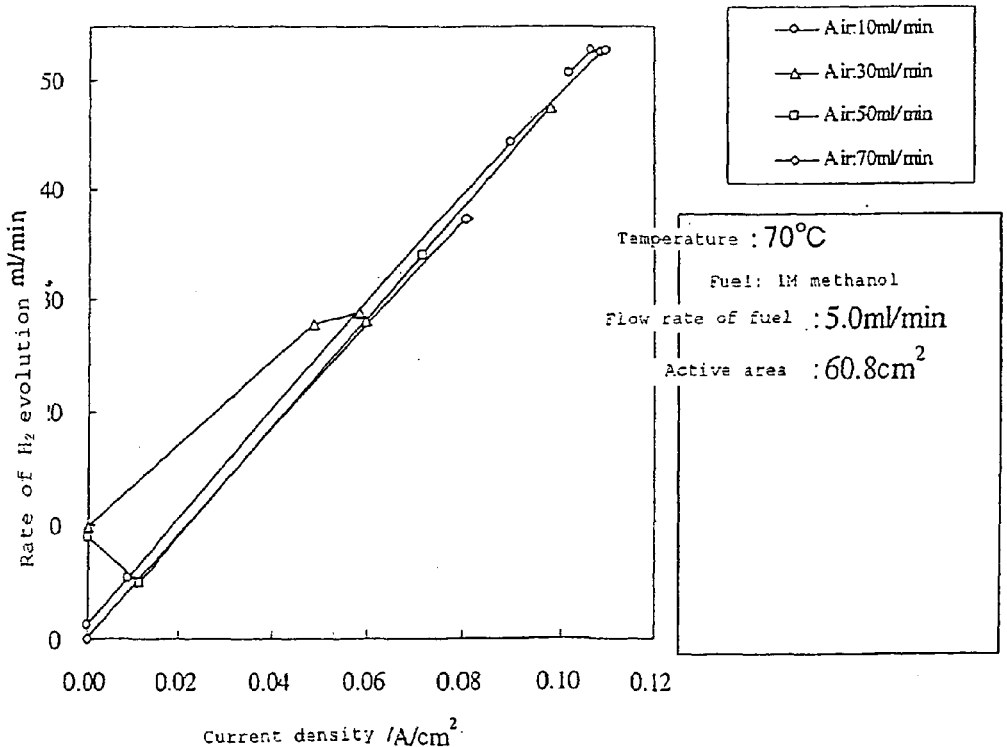
FIG. 50 shows a graph for indicating relation of the rate of hydrogen evolution (charging: temperature at 70° C.) with the current density applied when the flow rate of air is varied (hydrogen generating example 3-3).
Figure 51:
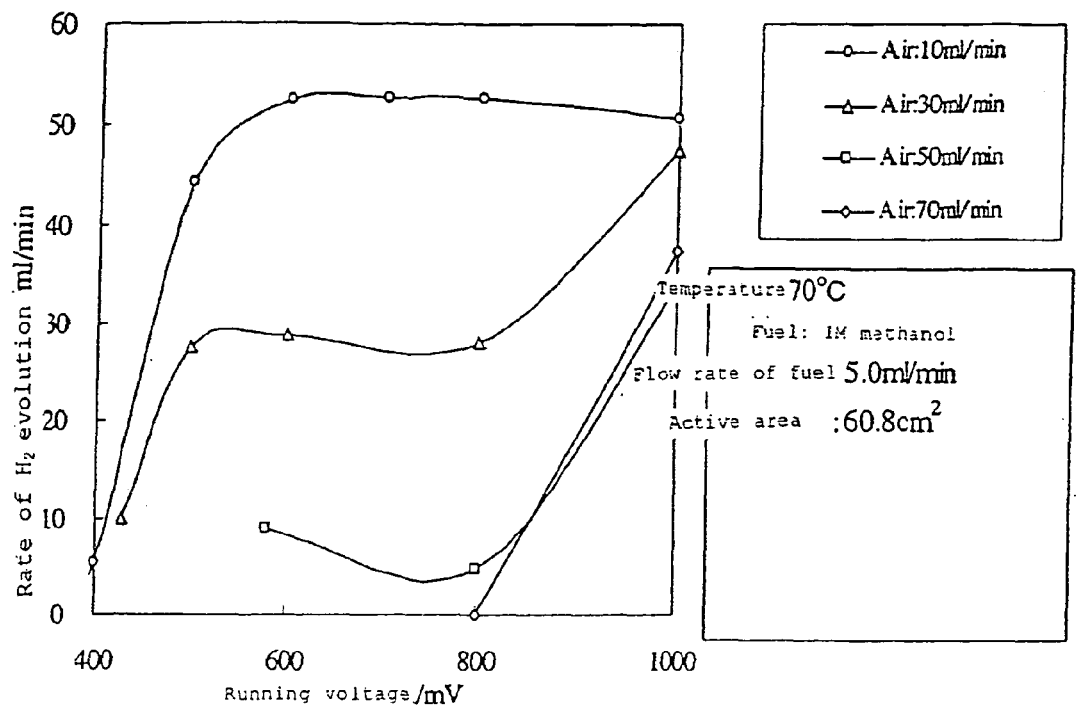
FIG. 51 shows a graph for indicating relation of the rate of hydrogen evolution (charging: temperature at 70° C.) with the operation voltage when the flow rate of air is varied (hydrogen generating example 3-3).

Relation of the rate of hydrogen evolution with the current density applied during the test is shown in FIG. 50, and relation of the rate of hydrogen evolution with the operation voltage is shown in FIG. 51.

From this, it was found that the rate of hydrogen evolution tends to depend on the operation voltage, and hydrogen evolves when the operation voltage is equal to or larger than 400 mV; hydrogen is readier to evolve with reduction of the flow rate of air; and the rate of hydrogen evolution becomes virtually constant with the air flow of 10 ml/min, when the operation voltage becomes equal to or larger than 600 mV, while the rate of hydrogen evolution tends to grow with the air flow of 30 ml/min, when the operation voltage becomes equal to or larger than 800 mV, and thus no hydrogen will evolve when air flows at a higher rate unless the operation voltage is raised sufficiently high.

Figure 52:
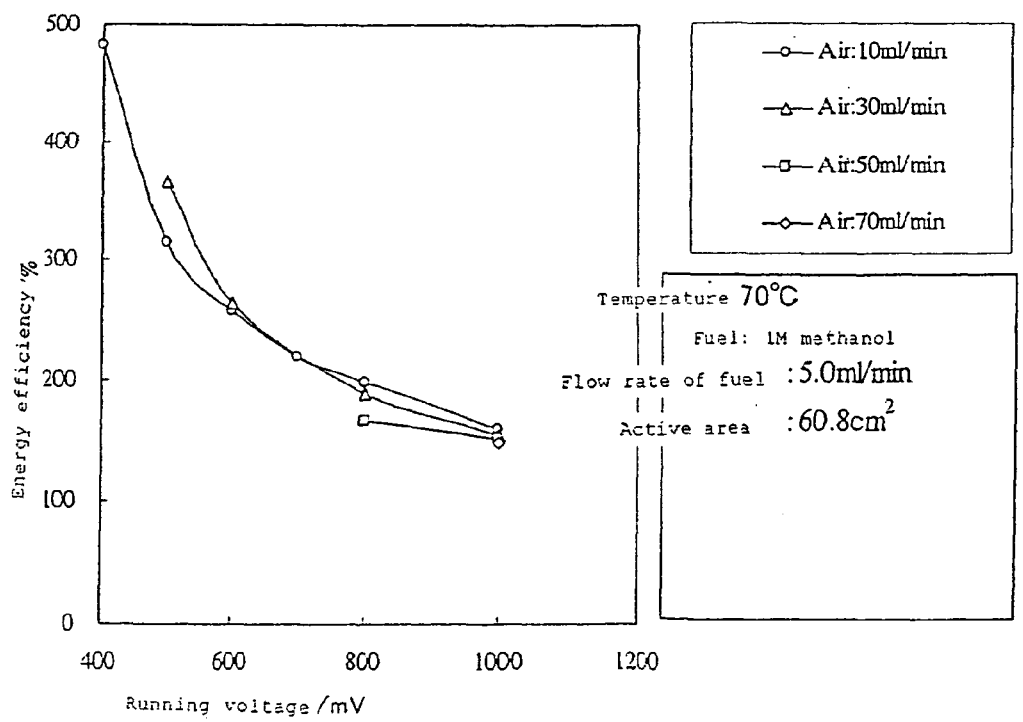
FIG. 52 shows a graph for indicating relation of the energy efficiency (charging: temperature at 70° C.) with the operation voltage when the flow rate of air is varied (hydrogen generating example 3-3).

Relation of the energy efficiency with the operation voltage is shown in FIG. 52.

It was found that the energy efficiency is equal to or larger than 100% even when the operation voltage is around 1000 mV, and the energy efficiency is particularly high with the flow rate of air of 10 to 30 ml/min when the operation voltage is kept equal to or smaller than 600 mV.

Hydrogen Generating Example 3-4

The same hydrogen generating cell as that of hydrogen generating example 3-1 was used. The cell was operated while the temperature being kept at 90° C. with the flow rate of air to the air electrode varied from 10 to 200 ml/min and the flow of 1M aqueous solution of methanol (fuel) to the fuel electrode kept at 5 ml/min. Then, while the current flowing between the air electrode and the fuel electrode being varied by means of a DC power source from outside, the operation voltage between the fuel electrode and the air electrode, the rate of hydrogen evolution occurring from the fuel electrode, and the energy efficiency were monitored and analyzed.

Figure 53:
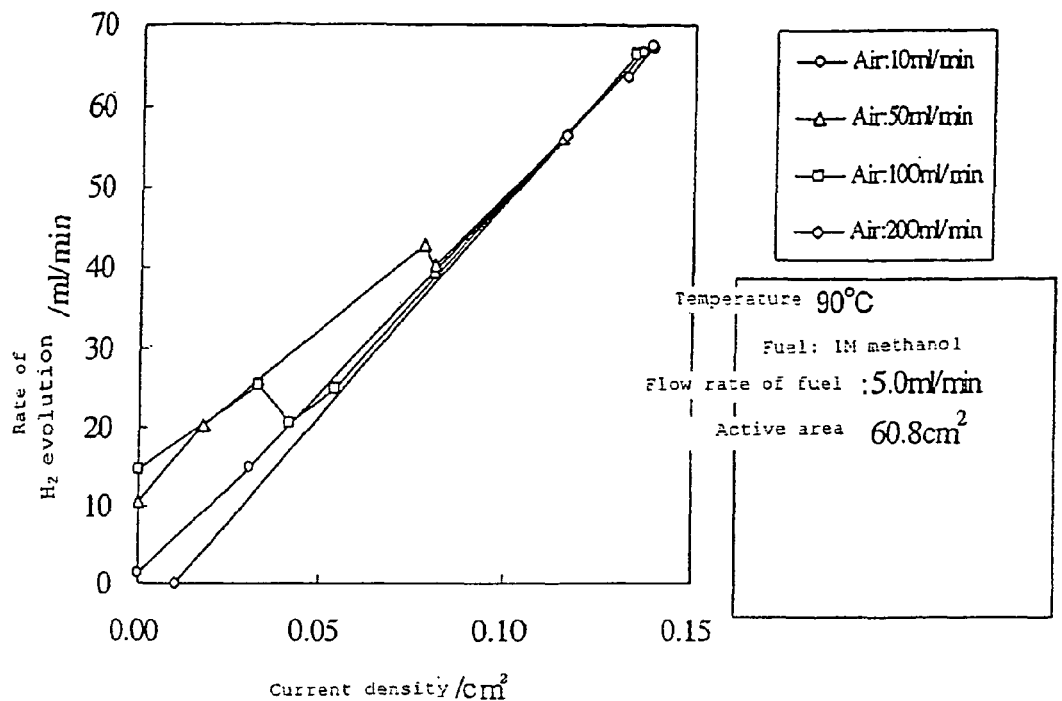
FIG. 53 shows a graph for indicating relation of the rate of hydrogen evolution (charging: temperature at 90° C.) with the current density applied when the flow rate of air is varied (hydrogen generating example 3-4).
Figure 54:
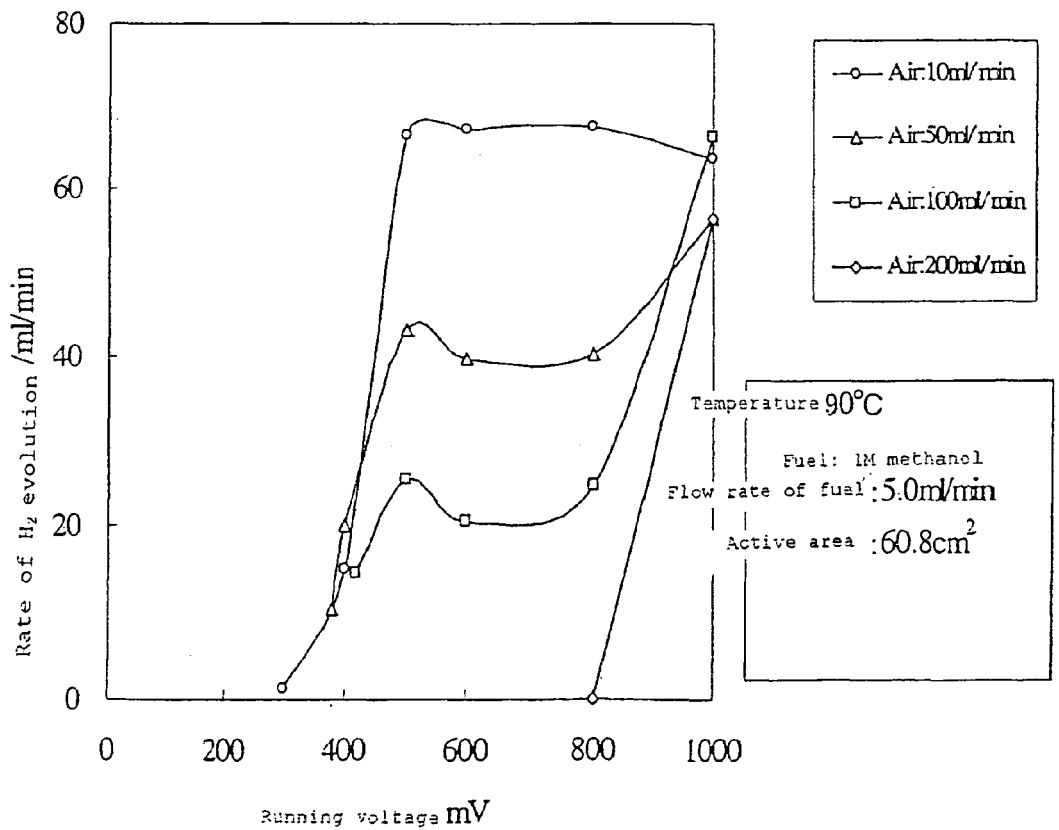
FIG. 54 shows a graph for indicating relation of the rate of hydrogen evolution (charging: temperature at 90° C.) with the operation voltage when the flow rate of air is varied (hydrogen generating example 3-4).

Relation of the rate of hydrogen evolution with the current density applied is shown in FIG. 53, and relation of the rate of hydrogen evolution with the operation voltage is shown in FIG. 54.

From this, it was found that the rate of hydrogen evolution tends to depend on the operation voltage, and hydrogen evolves when the operation voltage is equal to or larger than 300 mV; hydrogen is readier to evolve with reduction of the flow rate of air; and the rate of hydrogen evolution becomes virtually constant with the air flow of 10 ml/min, when the operation voltage becomes equal to or larger than 500 mV, while the rate of hydrogen evolution tends to grow with the air flow of 50 to 100 ml/min, when the operation voltage becomes equal to or larger than 800 mV, and thus no hydrogen will evolve when air flows at 200 ml/min unless the operation voltage is raised higher than 800 mV.

Figure 55:
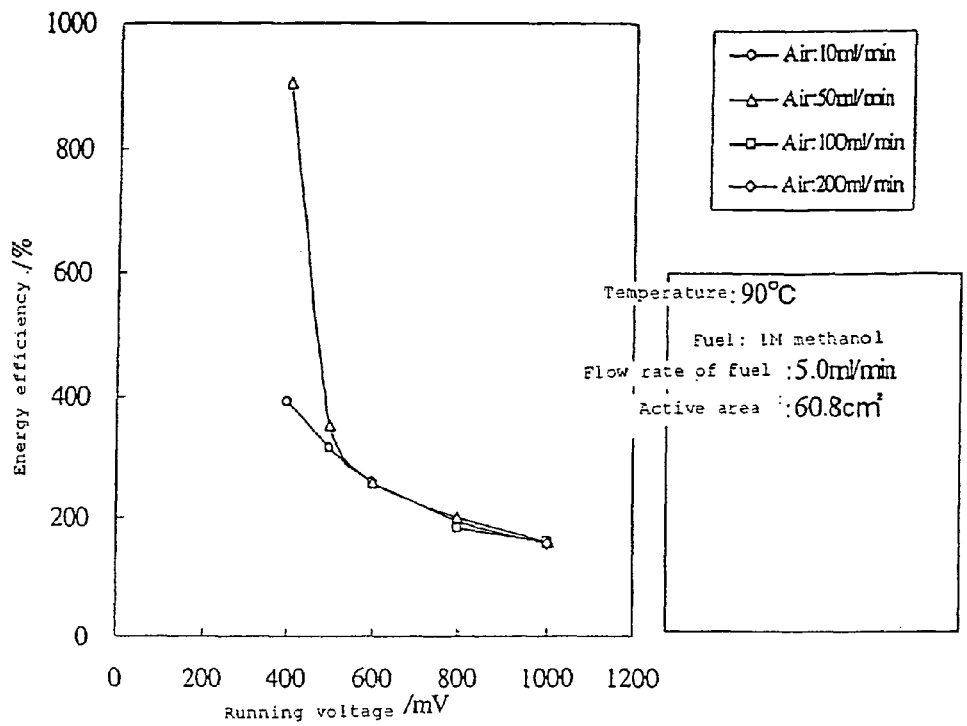
FIG. 55 shows a graph for indicating relation of the energy efficiency (charging: temperature at 90° C.) with the operation voltage when the flow rate of air is varied (hydrogen generating example 3-4).

Relation of the energy efficiency with the operation voltage is shown in FIG. 55.

From this, it was found that the energy efficiency is equal to or larger than 100% even when the operation voltage is around 1000 mV, and the energy efficiency is particularly high with the flow of air of 50 ml/min when the operation voltage is kept equal to or smaller than 500 mV.

Figure 56:
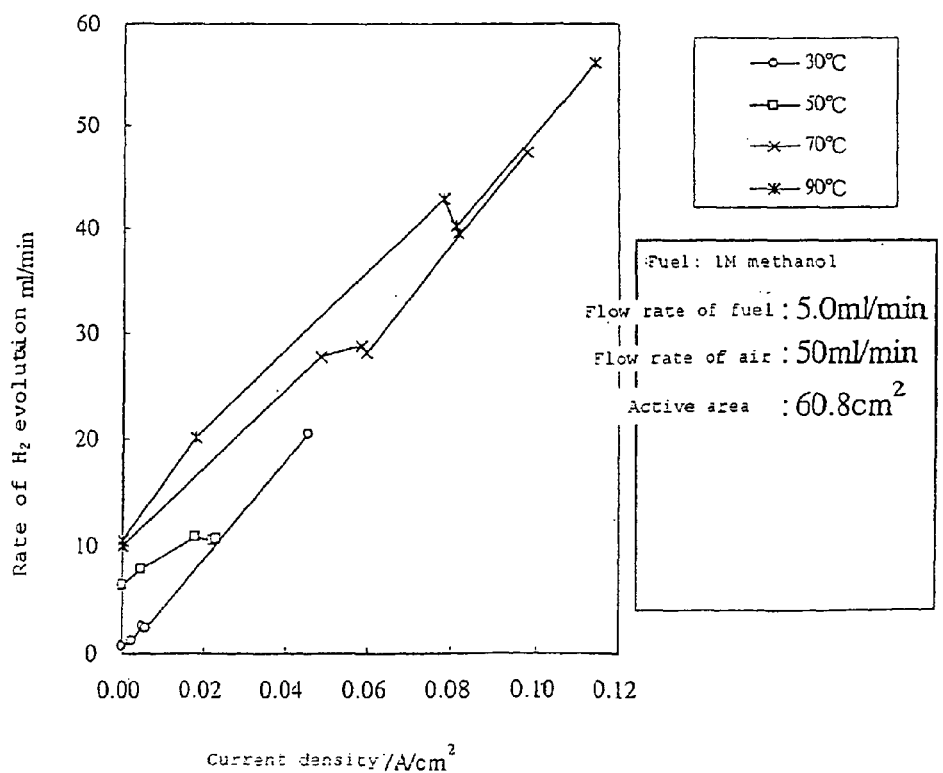
FIG. 56 shows a graph for indicating relation of the rate of hydrogen evolution (charging: flow rate of air at 50 ml/min) with the current density applied when the temperature is varied.
Figure 57:
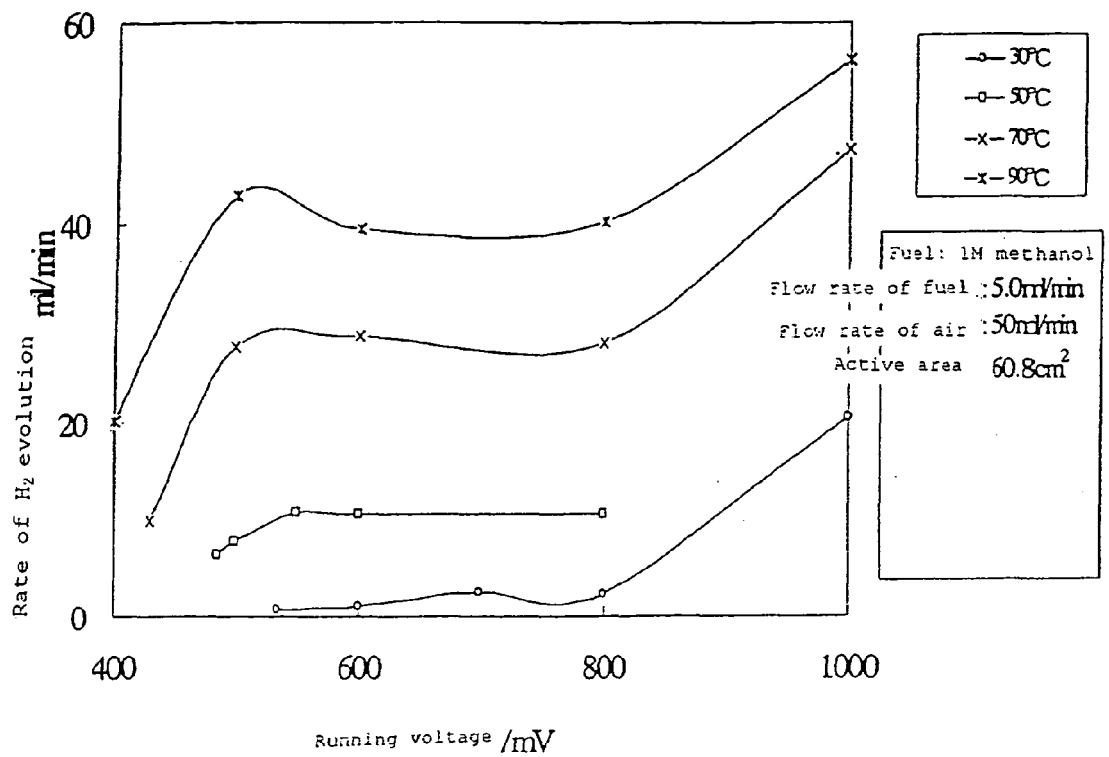
FIG. 57 shows a graph for indicating relation of the rate of hydrogen evolution (charging: flow rate of air at 50 ml/min) with the operation voltage when the temperature is varied.

Next, for hydrogen generating examples 3-1 to 3-4 where operation temperature was varied with the flow of air kept at 50 ml/min, relation of the rate of hydrogen evolution with the current density applied is shown in FIG. 56, while relation of the rate of hydrogen evolution with the operation voltage is shown in FIG. 57.

From this, it was found that the rate of hydrogen evolution tends to depend on the temperature: hydrogen evolves at a low operation voltage and the rate of hydrogen evolution becomes higher as the temperature is raised.

Figure 58:
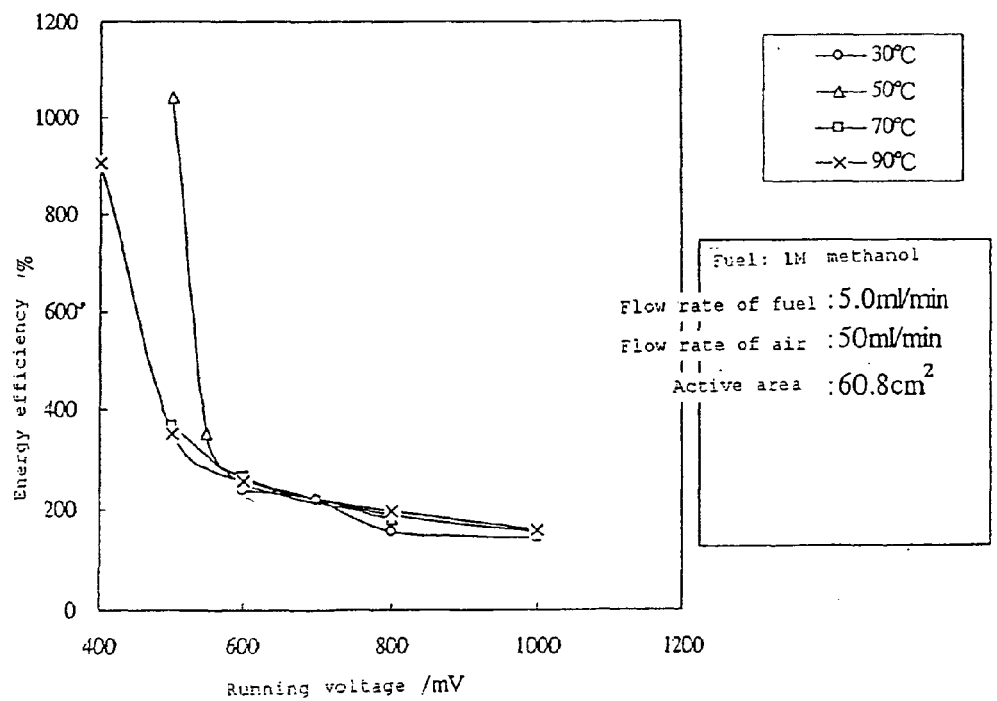
FIG. 58 shows a graph for indicating relation of the energy efficiency (charging: flow rate of air at 50 ml/min) with the operation voltage when the temperature is varied.

Relation of the energy efficiency with the operation voltage is shown in FIG. 58.

It was found that the energy efficiency is equal to or larger than 100% even when the operation voltage is around 1000 mV, and the energy efficiency is particularly high when the operation voltage is kept equal to or smaller than 600 mV.

Hydrogen Generating Example 3-5

The same hydrogen generating cell with that of hydrogen generating example 3-1 was used. The cell was operated while the temperature being kept at 50° C. with the flow of air to the air electrode kept at 50 ml/min and the flow of fuel to the fuel electrode varied to 1.5, 2.5, 5.0, 7.5, or 10.0 ml/min. Then, while the current flowing between the air electrode and the fuel electrode being varied by means of a DC power source from outside, the operation voltage between the fuel electrode and the air electrode, the rate of hydrogen evolution occurring from the fuel electrode, and the energy efficiency were monitored and analyzed.

Figure 59:
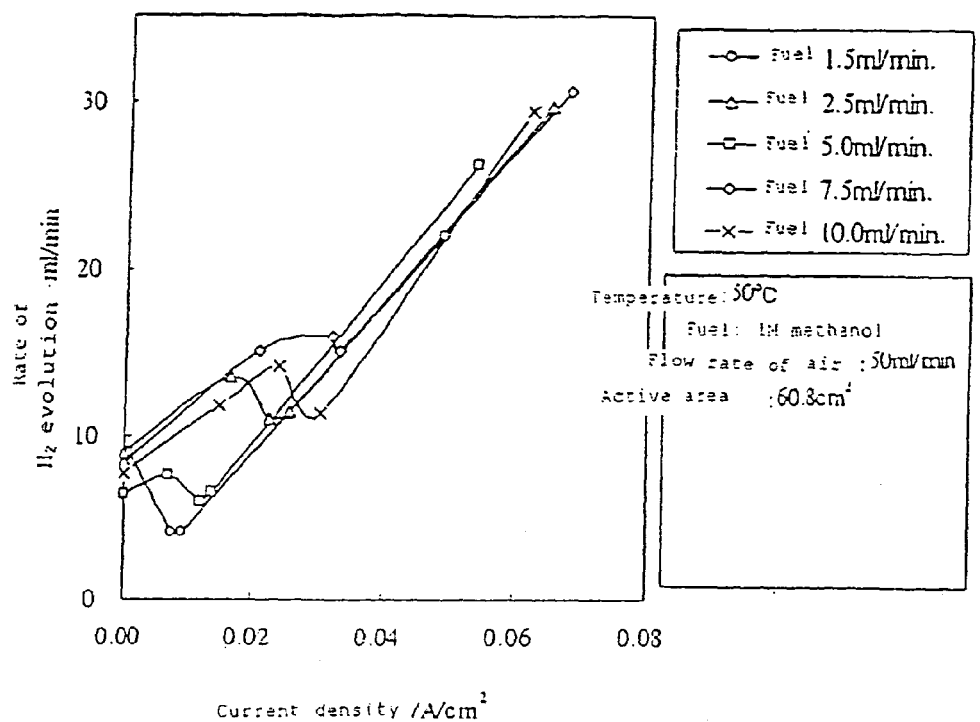
FIG. 59 shows a graph for indicating relation of the rate of hydrogen evolution (charging: temperature at 50° C.) with the current density applied when the flow rate of fuel is varied (hydrogen generating example 3-5).
Figure 60:
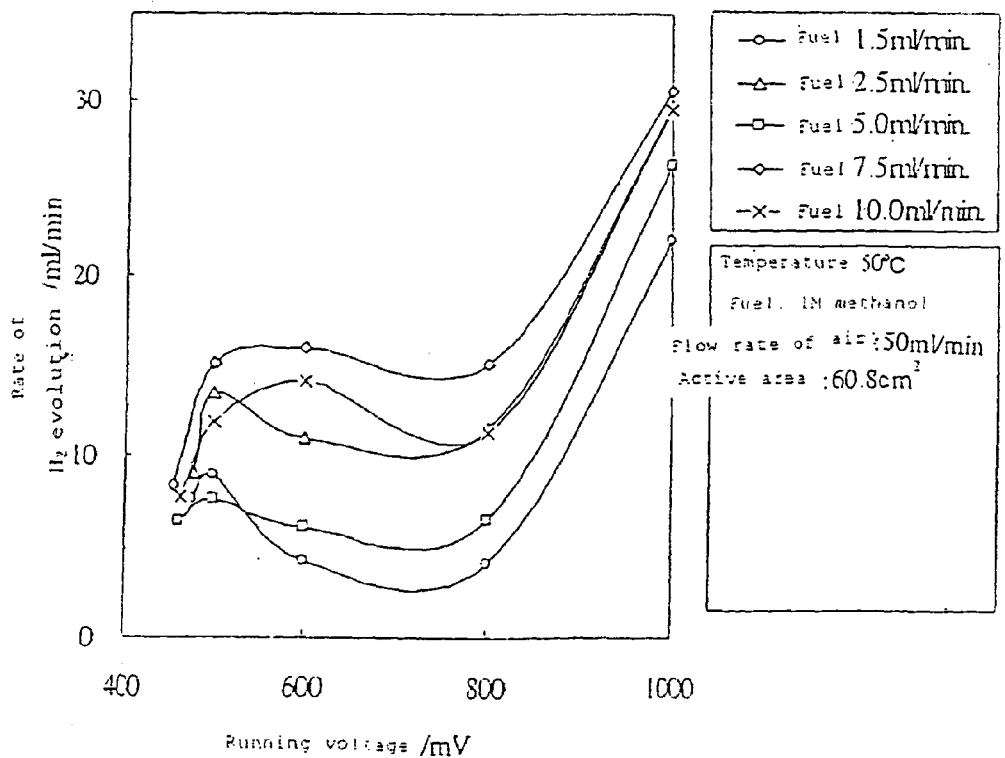
FIG. 60 shows a graph for indicating relation of the rate of hydrogen evolution (charging: temperature at 50° C.) with the operation voltage when the flow rate of fuel is varied (hydrogen generating example 3-5).

Relation of the rate of hydrogen evolution with the current density applied is shown in FIG. 59, and relation of the rate of hydrogen evolution with the operation voltage is shown in FIG. 60.

It was found that the rate of hydrogen evolution tends to depend on the operation voltage, and hydrogen evolves when the operation voltage is equal to or larger than 400 mV; hydrogen is readier to evolve with increase of the flow rate of fuel; and the rate of hydrogen evolution tends to grow when the operation voltage is equal to or larger than 800 mV for all the flow rates of fuel tested.

Figure 61:
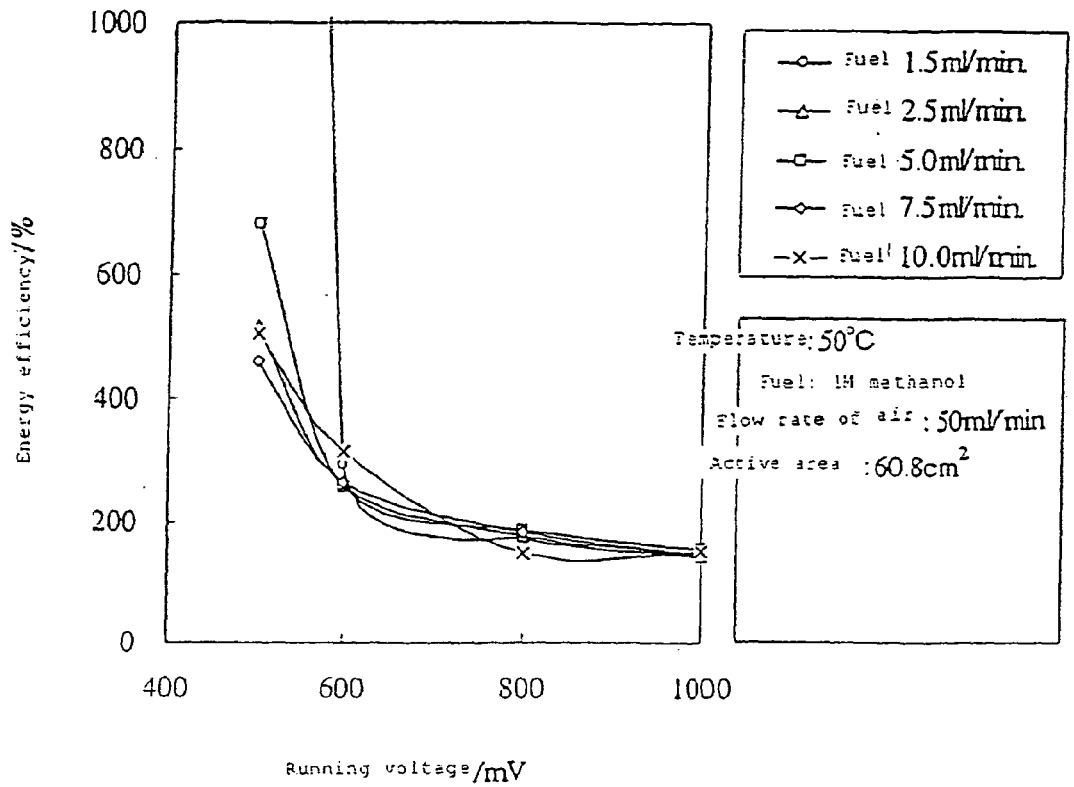
FIG. 61 shows a graph for indicating relation of the energy efficiency (charging: temperature at 50° C.) with the operation voltage when the flow rate of fuel is varied (hydrogen generating example 3-5).

Relation of the energy efficiency with the operation voltage is shown in FIG. 61.

It was found that the energy efficiency is equal to or larger than 100% even when the operation voltage is around 1000 mV, and the energy efficiency is particularly high when the operation voltage is kept equal to or smaller than 600 mV.

Hydrogen Generating Example 3-6

The same hydrogen generating cell as that of hydrogen generating example 3-1 was used. The cell was operated while the temperature being kept at 50° C. with the flow of air to the air electrode kept at 50 ml/min and the constant flow of fuel to the fuel electrode kept at 5 ml/min while fuel concentration being varied to 0.5, 1, 2, or 3M. Then, while the external current flowing between the air electrode and the fuel electrode being varied by means of a DC power source from outside, the operation voltage between the fuel electrode and the air electrode, the rate of hydrogen evolution occurring from the fuel electrode, and the energy efficiency were monitored and analyzed.

Figure 62:
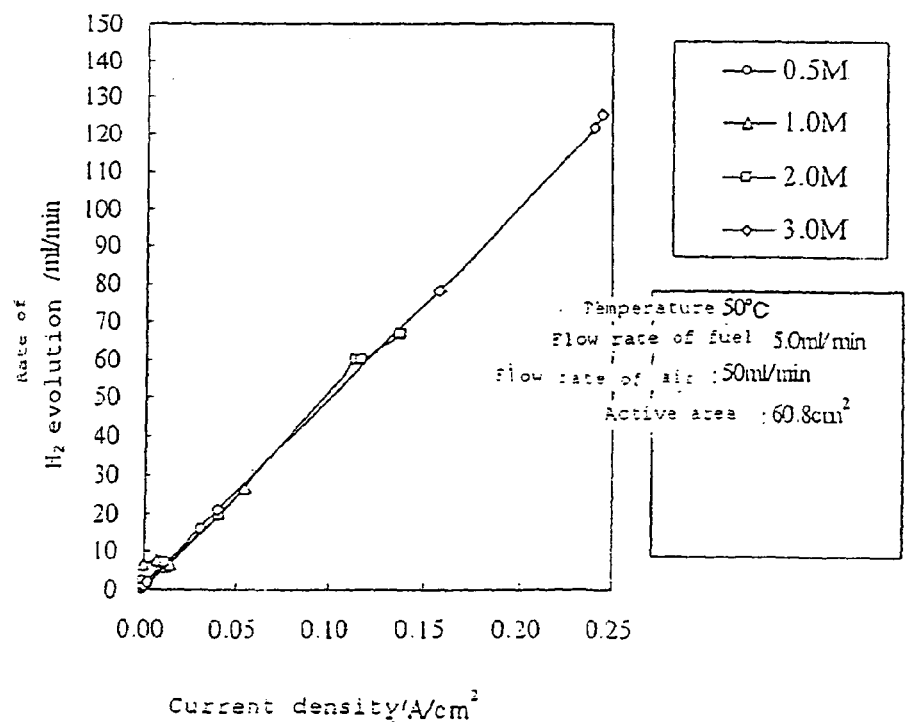
FIG. 62 shows a graph for indicating relation of the rate of hydrogen evolution (charging: temperature at 50° C.) with the current density applied when the concentration of fuel is varied (hydrogen generating example 3-6).
Figure 63:
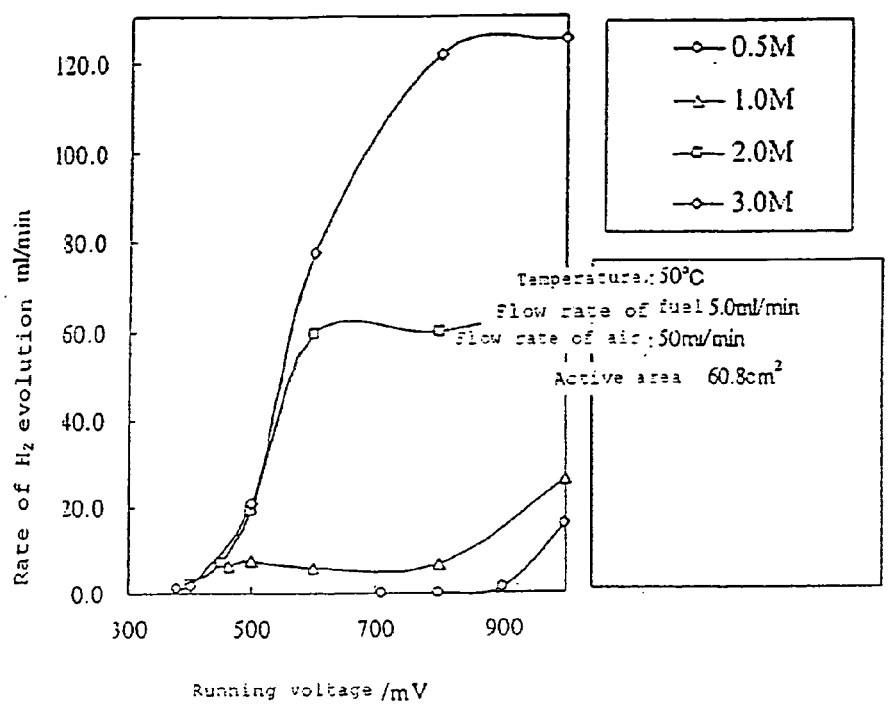
FIG. 63 shows a graph for indicating relation of the rate of hydrogen evolution (charging: temperature at 50° C.) with the operation voltage when the concentration of fuel is varied (hydrogen generating example 3-6).

Relation of the rate of hydrogen evolution with the current density applied is shown in FIG. 62, and relation of the rate of hydrogen evolution with the operation voltage is shown in FIG. 63.

From this, it was found that the rate of hydrogen evolution grows almost linearly with the increase of current density provided that the current density is equal to or higher than 0.02 A/cm$^2$.

It was also found that the rate of hydrogen evolution tends to depend on the operation voltage, and hydrogen evolves when the operation voltage is equal to or larger than 400 mV; hydrogen is readier to evolve with increase of the concentration of fuel, and the rate of hydrogen evolution grows sharply under the fuel concentration of 2M or 3M, when the operation voltage approaches 400 to 500 mV; and the rate of hydrogen evolution becomes virtually constant under the fuel concentration of 1M when the operation voltage is in the range of 400 to 800 mV, while the rate of hydrogen evolution tends to grow when the operation voltage becomes equal to or larger than 800 mV, and no hydrogen will evolve when the fuel concentration is lower than this level (1M) unless the operation voltage is raised sufficiently high.

Figure 64:
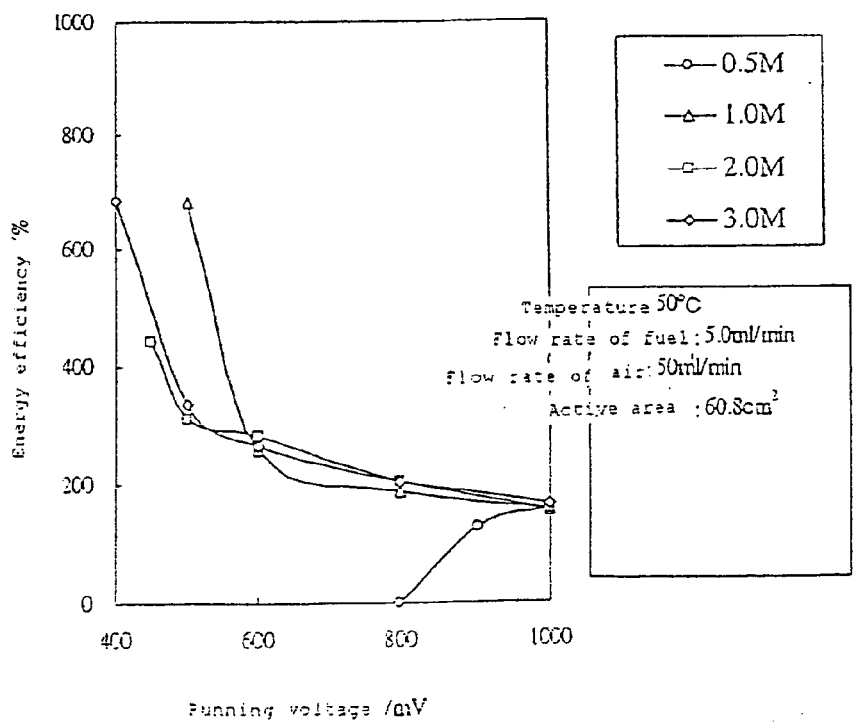
FIG. 64 shows a graph for indicating relation of the energy efficiency (charging: temperature at 50° C.) with the operation voltage when the concentration of fuel is varied (hydrogen generating example 3-6).

Relation of the energy efficiency with the operation voltage is shown in FIG. 64.

It was found that the energy efficiency is equal to or larger than 100% even when the operation voltage is around 1000 mV except for a case where the fuel concentration is kept at 0.5M, and the energy efficiency is particularly high with the concentration of the fuel being 1, 2 or 3M when the operation voltage is kept equal to or smaller than 600 mV. When the concentration of fuel was 0.5M, no hydrogen evolved when the operation voltage was low. Under this condition, the cell behaved quite differently in terms of energy efficiency.

Hydrogen Generating Example 3-7

The same hydrogen generating cell with that of hydrogen generating example 3-1 was used (except that the air electrode consisted of an oxidizing electrode to which oxidizing gas was flowed). The cell was operated while the temperature being kept at 50° C. with the constant flow of 1M fuel to the fuel electrode kept at 5 ml/min and the flow of oxidizing gas to the oxidizing electrode kept at 14.0 ml/min while oxygen concentration being varied to 10, 21, 40, or 100%. Then, while the current flowing between the oxidizing electrode and the fuel electrode being varied by means of a DC power source from outside, the operation voltage between the fuel electrode and the oxidizing electrode, the rate of hydrogen evolution occurring from the fuel electrode, and the energy efficiency were monitored and analyzed. The oxidizing gas containing 21% oxygen was represented by air, and the oxidizing gas containing 10% oxygen was obtained by mixing air with nitrogen. The oxidizing gas containing 40% oxygen was obtained by adding oxygen (100% oxygen) to air.

Figure 65:
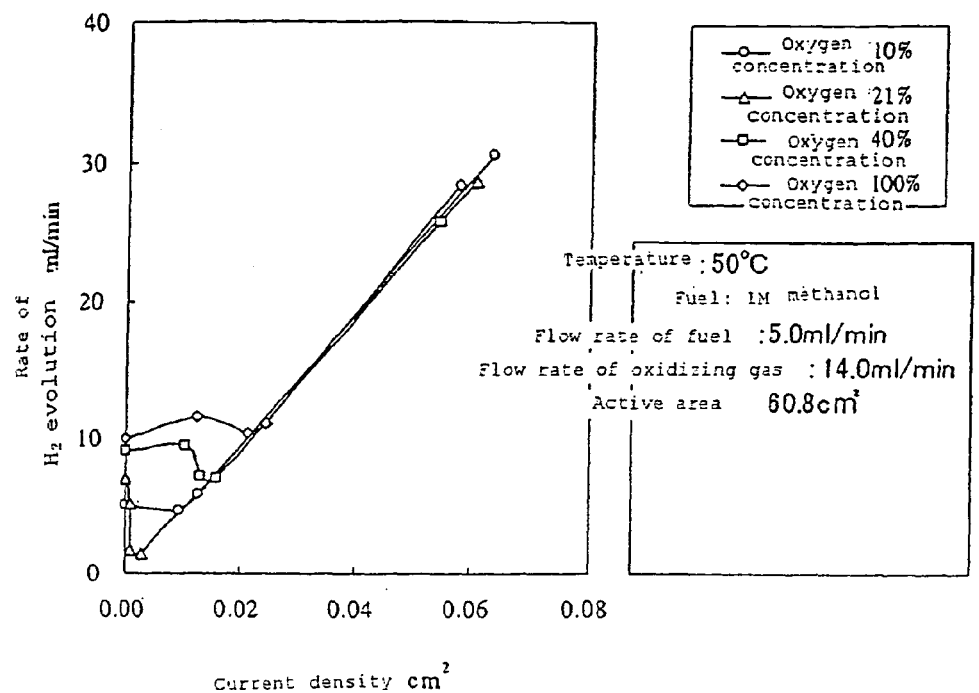
FIG. 65 shows a graph for indicating relation of the rate of hydrogen evolution (charging: temperature at 50° C.) with the current density applied when the concentration of oxygen is varied (hydrogen generating example 3-7).
Figure 66:
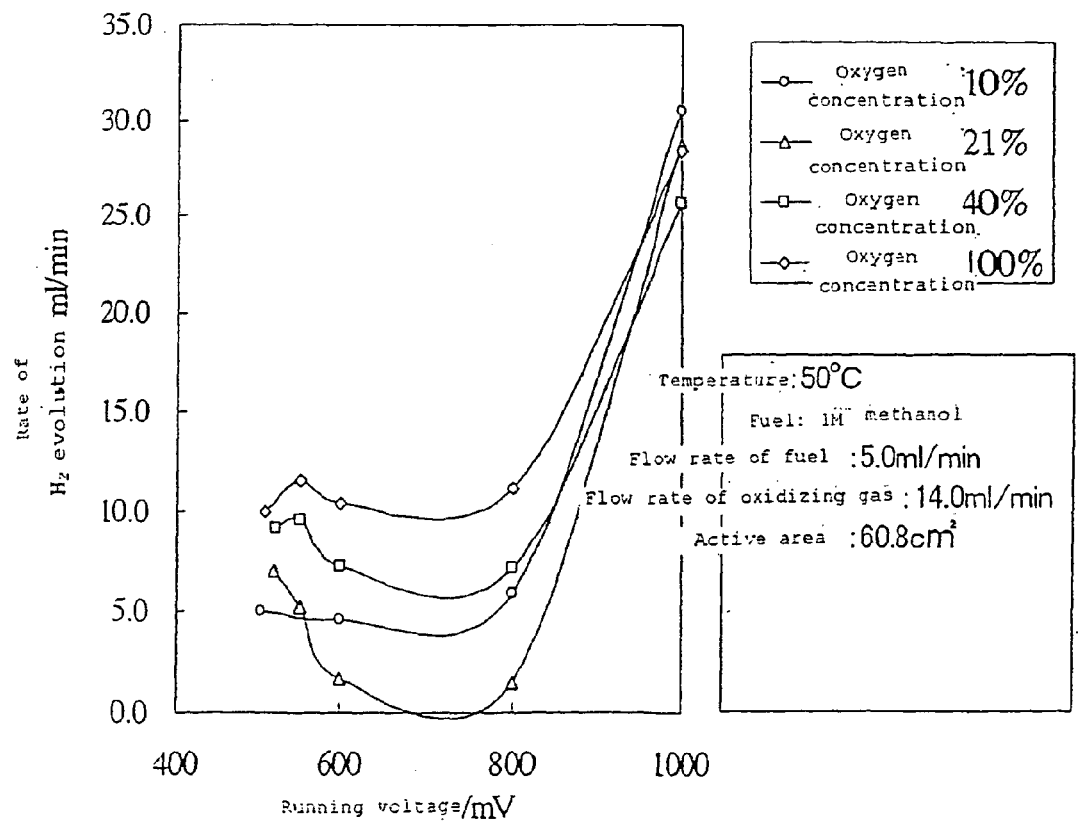
FIG. 66 shows a graph for indicating relation of the rate of hydrogen evolution (charging: temperature at 50° C.) with the operation voltage when the concentration of oxygen is varied (hydrogen generating example 3-7).

Relation of the rate of hydrogen evolution with the current density applied is shown in FIG. 65, and relation of the rate of hydrogen evolution with the operation voltage is shown in FIG. 66.

From this, it was found that the rate of hydrogen evolution grows almost linearly with the increase of current density provided that the current density is equal to or higher than 0.03 A/cm$^2$.

It was also found that the rate of hydrogen evolution tends to depend on the operation voltage, and hydrogen evolves when the operation voltage is equal to or larger than 400 mV; hydrogen is readier to evolve with increase of the concentration of oxygen; and the rate of hydrogen evolution becomes virtually constant under when the operation voltage is in the range of 400 to 800 mV, while it tends to grow when the operation voltage becomes equal to or larger than 800 mV.

Figure 67:
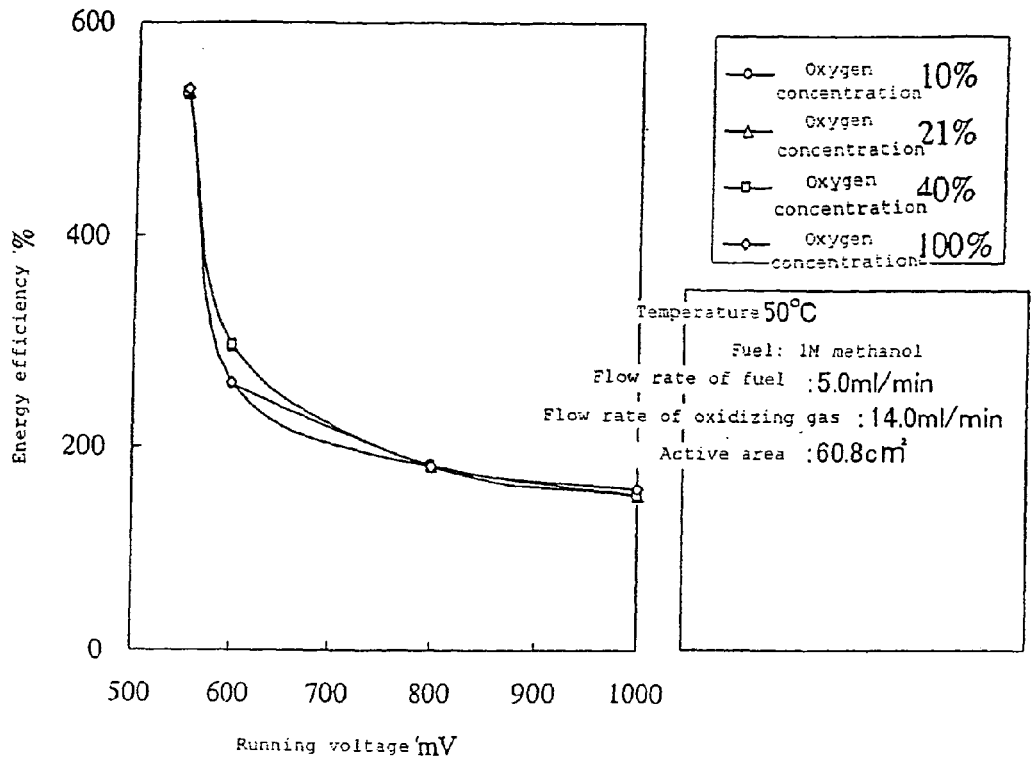
FIG. 67 shows a graph for indicating relation of the energy efficiency (charging: temperature at 50° C.) with the operation voltage when the concentration of oxygen is varied (hydrogen generating example 3-7).

Relation of the energy efficiency with the operation voltage is shown in FIG. 67.

It was found that the energy efficiency is equal to or larger than 100% even when the applied voltage is around 1000 mV, and the energy efficiency is particularly high with the concentration of oxygen being high when the applied voltage is kept equal to or smaller than 600 mV.

Hydrogen Generating Example 3-8

The same hydrogen generating cell as that of hydrogen generating example 3-1 was used (except that the air electrode consisted of an oxidizing electrode to which liquid hydrogen peroxide was flowed). The hydrogen generating cell was placed in an electric furnace where hot air was circulated. The cell was operated while the temperature being varied to 30, 50, 70, or 90° C. with the flow of 1M aqueous solution of methanol to the fuel electrode kept at 5 ml/min and the flow of 1M $H_2O_2$ (hydrogen peroxide) to the oxidizing electrode varied from 2.6 to 5.5 ml/min. Then, while the current flowing between the oxidizing electrode and the fuel electrode being varied by means of a DC power source from outside, the operation voltage between the fuel electrode and the oxidizing electrode, the rate of hydrogen evolution occurring from the fuel electrode, and the energy efficiency were monitored and analyzed.

The flow rate of hydrogen peroxide was adjusted such that the open-circuit voltage was approximately equal to 500 mV for all the temperatures tested.

Figure 68:
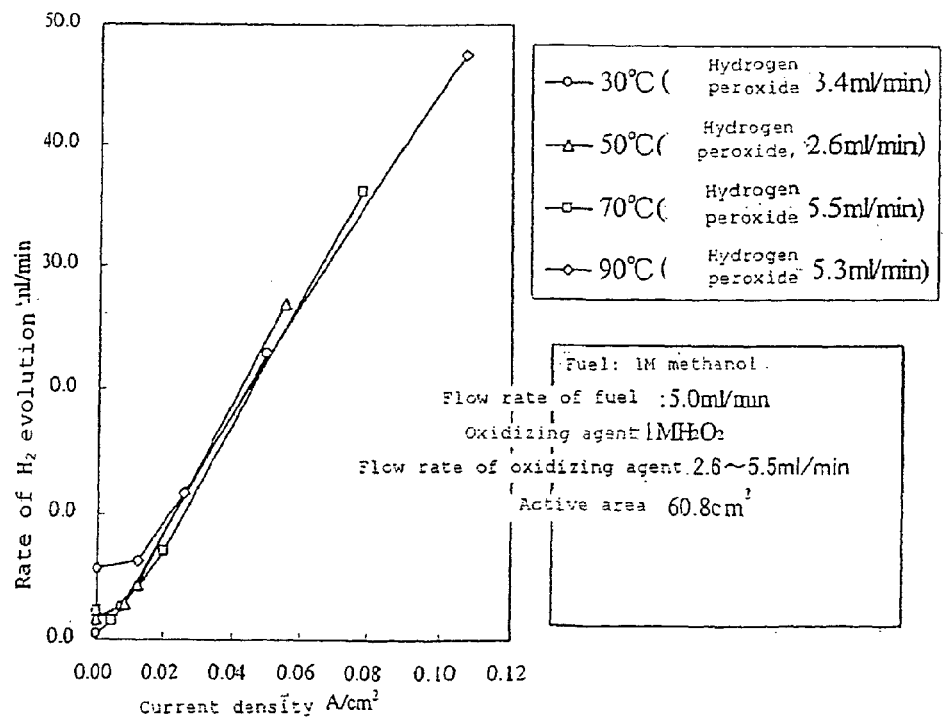
FIG. 68 shows a graph for indicating relation of the rate of hydrogen evolution (charging: oxidizing agent of $H_2O_2$) with the current density applied when the temperature is varied (hydrogen generating example 3-8).
Figure 69:
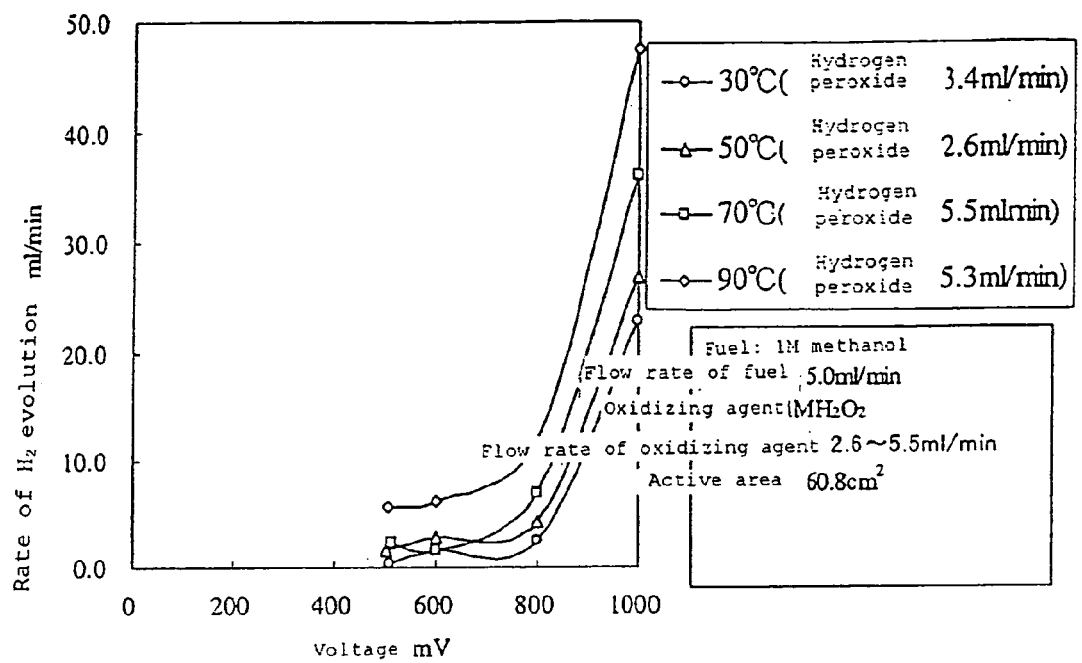
FIG. 69 shows a graph for indicating relation of the rate of hydrogen evolution (charging: oxidizing agent of $H_2O_2$) with the operation voltage when the temperature is varied (hydrogen generating example 3-8).

Relation of the rate of hydrogen evolution with the current density applied is shown in FIG. 68, and relation of the rate of hydrogen evolution with the operation voltage is shown in FIG. 69.

From this, it was found that the rate of hydrogen evolution tends to depend on the operation voltage, and hydrogen evolves when the operation voltage is equal to or larger than 500 mV, and tends to grow when the operation voltage is equal to or larger than 800 mV; and hydrogen is readier to evolve with increase of the operation temperature.

Figure 70:
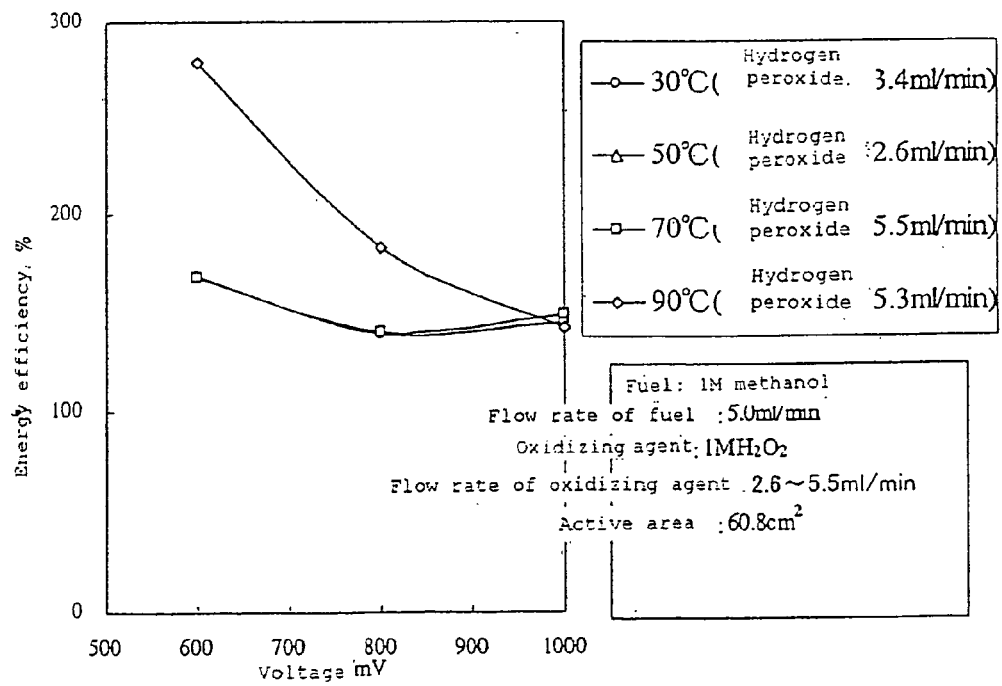
FIG. 70 shows a graph for indicating relation of the energy efficiency (charging: oxidizing agent of $H_2O_2$) with the operation voltage when the temperature is varied (hydrogen generating example 3-8).

Relation of the energy efficiency with the operation voltage is shown in FIG. 70.

It was found that the energy efficiency is equal to or larger than 100% even when the operation voltage is around 1000 mV, and the energy efficiency is particularly high with the temperature of 90° C. when the operation voltage is kept equal to or smaller than 800 mV.

What is important here is that hydrogen was withdrawn from the hydrogen generating cells of Example 3 whose energy content exceeded the electric current supplied from outside. In other words, the hydrogen generating cell of Example 3 generates hydrogen of energy more than inputted electric energy. In addition, conversion of fuel into hydrogen occurred at a surprisingly low temperature of 30 to 90° C. In view of these facts, the hydrogen generating device of the invention is likely to be novel and the effect to use this hydrogen generating device in the hydrogen supply system is profound.

In the following embodiments, examples to produce hydrogen by the hydrogen generating device used in the hydrogen supply system of the invention using a fuel other than methanol will be described.

EXAMPLE 4

Hydrogen was generated by the hydrogen generating device used in the hydrogen supply system of the invention as described in claim 3 of the invention (open circuit condition) using ethanol as a fuel.

The same hydrogen generating cell as that of hydrogen generating example 1-1 was used. At the cell temperature of 80° C., the flow of 1M aqueous solution of ethanol was made at 5 ml/min to flow to the fuel electrode and the flow of air was made at 65 ml/min to the air electrode. Then, the open-circuit voltage of the cell and the rate of gas evolution generated from the fuel electrode were measured. The hydrogen concentration in the generated gas was analyzed by a gas chromatography and the hydrogen evolution rate was acquired.

The result is shown in Table 1:

TABLE 1

| Air/ ml/min | Open-circuit voltage/ mV | Gas evolution rate/ ml/min | $H_2$ concentration/ % | $H_2$ evolution rate/ ml/min |
|---|---|---|---|---|
| 65 | 478 | 0.6 | 65.2 | 0.39 |

As shown in Table 1, it was confirmed that hydrogen was generated at the open-circuit voltage of 478 mV, but the hydrogen evolution rate was small.

EXAMPLE 5

Hydrogen was generated by the hydrogen generating device used in the hydrogen supply system of the invention as described in claim 3 of the invention (open circuit condition) using ethylene glycol as a fuel.

The same hydrogen generating cell as that of hydrogen generating example 1-1 was used. At the cell temperature of 80° C., the flow of 1M aqueous solution of ethylene glycol was made at 5 ml/min to flow to the fuel electrode and the flow of air was made at 105 ml/min to the air electrode. Then, the open-circuit voltage of the cell and the rate of gas evolution generated from the fuel electrode were measured. The hydrogen concentration in the generated gas was analyzed by a gas chromatography and the hydrogen evolution rate was acquired.

The result is shown in Table 2:

TABLE 2

| Air/ ml/min | Open-circuit voltage/ mV | Gas evolution rate/ ml/min | $H_2$ concentration/ % | $H_2$ evolution rate/ ml/min |
|---|---|---|---|---|
| 105 | 474 | 2.4 | 88.4 | 2.12 |

As shown in Table 2, it was confirmed that hydrogen was generated at the open-circuit voltage of 474 mV. The hydrogen evolution rate was larger than the case of aqueous solution of ethanol as a fuel, but considerably smaller than the case of aqueous solution of methanol.

EXAMPLE 6

Hydrogen was generated by the hydrogen generating device used in the hydrogen supply system of the invention as described in claim 3 of the invention (open circuit condition) using 2-propanol as a fuel.

The same hydrogen generating cell as that of hydrogen generating example 1-1 was used. At the cell temperature of 80° C., the flow of 1M aqueous solution of 2-propanol was made at 5 ml/min to flow to the fuel electrode and the flow of air was made at 35 ml/min to the air electrode. Then, the open-circuit voltage of the cell and the rate of gas evolution generated from the fuel electrode were measured. The hydrogen concentration in the generated gas was analyzed by a gas chromatography and the hydrogen evolution rate was acquired.

The result is shown in Table 3:

TABLE 3

| Air/ ml/min | Open-circuit voltage/ mV | Gas evolution rate/ ml/min | $H_2$ concentration/ % | $H_2$ evolution rate/ ml/min |
| --- | --- | --- | --- | --- |
| 35 | 514 | 3.96 | 95.6 | 3.78 |

As shown in Table 3, it was confirmed that hydrogen was generated at the open-circuit voltage of 514 mV, but the hydrogen evolution rate was larger than the case of the aqueous solution of ethanol or the aqueous solution of ethylene glycol as a fuel and the closest to the aqueous solution of methanol. Particularly, the hydrogen concentration in the generated gas was extremely high.

EXAMPLE 7

Hydrogen was generated by the hydrogen generating device used in the hydrogen supply system of the invention as described in claim 3 of the invention (open circuit condition) using diethyl ether as a fuel.

The same hydrogen generating cell as that of hydrogen generating example 1-1 was used. At the cell temperature of 80° C., the flow of 1M aqueous solution of diethyl ether was made at 5 ml/min to flow to the fuel electrode and the flow of air was made at 20 ml/min to the air electrode. Then, the open-circuit voltage of the cell and the rate of gas evolution generated from the fuel elect-rode were measured. The hydrogen concentration in the generated gas was analyzed by a gas chromatography and the hydrogen evolution rate was acquired.

The result is shown in Table 4:

TABLE 4

| Air/ ml/min | Open-circuit voltage/ mV | Gas evolution rate/ ml/min | $H_2$ concentration/ % | $H_2$ evolution rate/ ml/min |
| --- | --- | --- | --- | --- |
| 20 | 565 | 3.0 | 7.6 | 0.23 |

As shown in Table 4, it was confirmed that hydrogen was generated at the open-circuit voltage of 565 mV. The hydrogen concentration in the generated gas was smaller than the cases using alcohol as a fuel and the hydrogen evolution rate was also small.

EXAMPLE 8

Hydrogen was generated by the hydrogen generating device used in the hydrogen supply system of the invention as described in claim 3 of the invention (open circuit condition) using formaldehyde, formic acid as a fuel.

The same hydrogen generating cell as that of hydrogen generating example 1-1 was used. At the cell temperature of 50° C., the flow of 1M aqueous solution of formaldehyde, the flow of 1M aqueous solution of formic acid were made at 5 ml/min respectively to flow to the fuel electrode and the flow of air was made at 0 to 100 ml/min to the air electrode. Then, the open-circuit voltage of the cell and the rate of gas evolution generated from the fuel electrode were measured. The hydrogen concentration in the generated gas was analyzed by a gas chromatography and the hydrogen evolution rate was acquired.

Figure 71:
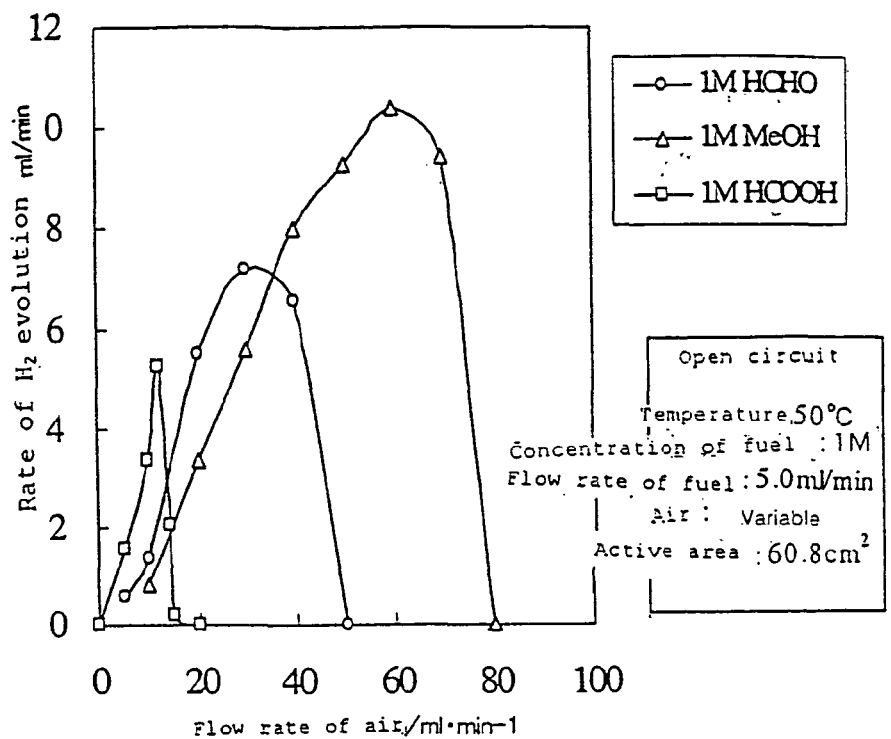
FIG. 71 is a graph for indicating relation of the air flow rate and the rate of hydrogen evolution (open circuit: temperature at 50° C.) (Example 8).
Figure 72:
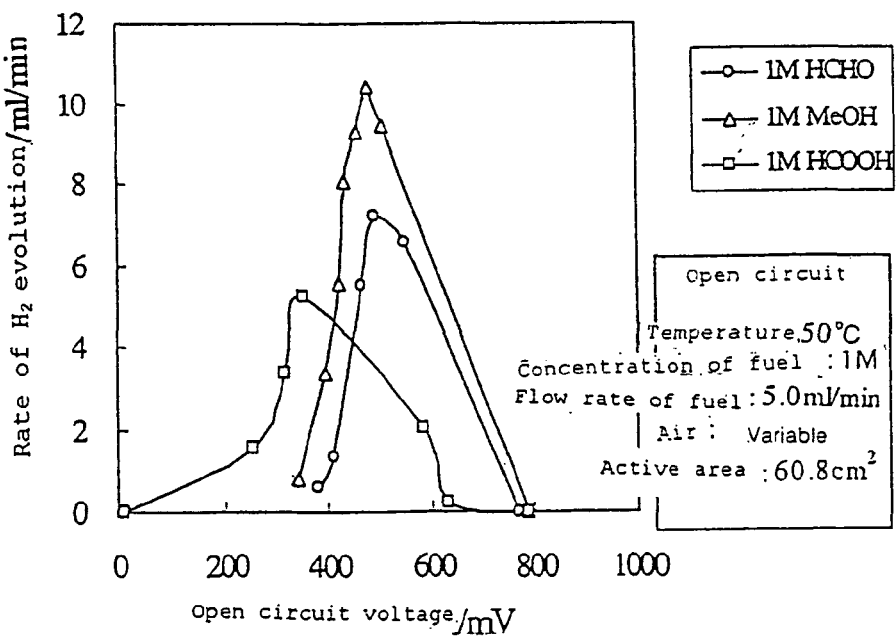
FIG. 72 is a graph for indicating relation of the open voltage and the rate of hydrogen evolution (open circuit: temperature at 50° C.) (Example 8).

The result is shown in FIGS. 71 and 72 with the case where methanol was used.

As shown in FIG. 71, in the case of formaldehyde, formic acid, generation of hydrogen was confirmed form the fuel electrode of the cell by reducing the air flow rate as in the case of methanol. Also, the hydrogen evolution rate is the largest with methanol, followed by formaldehyde and formic acid. Moreover, it was found out that hydrogen was not generated unless the air flow rate is reduced in this order.

From FIG. 72, it was found out that in the case of formaldehyde and formic acid, the hydrogen evolution rate (hydrogen evolution volume) also tends to depend on the open-circuit voltage as with methanol and that hydrogen was generated at the open-circuit voltage of 200 to 800 mV. In the case of formic acid, hydrogen was generated in a state where the open-circuit voltage was lower than that for methanol, formaldehyde. Also, the peak of hydrogen evolution rate was observed at a low open-circuit voltage (about 350 mV) for formic acid, while that of methanol, formaldehyde was about 500 mV.

INDUSTRIAL APPLICABILITY

As seen from above, since the hydrogen generating device used in the hydrogen supply system of the invention can generate a hydrogen-containing gas by decomposing a fuel containing an organic compound at 100° C. or lower, this is useful as a hydrogen supply system for supplying hydrogen to a hydrogen storage tank for supplying hydrogen to a hydrogen storage container loaded on a fuel cell automobile, a fuel cell automobile. It is also useful as a hydrogen supply system when hydrogen is used as a treatment gas or the like in manufacturing a semiconductor device.

The invention claimed is:

1. A hydrogen supply system comprising:
at least hydrogen supply means for supplying hydrogen to hydrogen storing means and a hydrogen generating device producing hydrogen containing gas to be supplied to the hydrogen supply means,
wherein the hydrogen generating device produces the hydrogen containing gas by decomposing a fuel containing an organic compound and comprises a partition membrane, a fuel electrode provided on one surface of the partition membrane for generating hydrogen containing gas, means for supplying a fuel containing the organic compound and water to the fuel electrode, an oxidizing electrode provided on the other surface of the partition membrane, means for supplying an oxidizing agent to the oxidizing electrode, and means for collecting the hydrogen containing gas directly from the fuel electrode, and
wherein an operation temperature of the hydrogen generating device is not higher than 100° C.
2. A hydrogen supply system comprising at least hydrogen supply means for supplying hydrogen to hydrogen storing means and a hydrogen generating device producing hydrogen containing gas to be supplied to the hydrogen supply means, wherein the hydrogen generating device produces the hydrogen containing gas by decomposing a fuel containing an organic compound and comprises a partition membrane, a fuel electrode provided on one surface of the partition membrane, means for supplying a fuel containing the organic compound and water to the fuel electrode, an oxidizing electrode provided on the other surface of the partition membrane, means for supplying an oxidizing agent to the oxidizing electrode, and means for collecting the hydrogen containing gas from the fuel electrode, wherein the hydrogen generating device is an open circuit having neither means for withdrawing electric energy to outside from a hydrogen generating cell constituting the hydrogen generating device, nor means for providing electric energy from outside to the hydrogen generating cell, and wherein an operation temperature of the hydrogen generating device is not higher than 100° C.

3. The hydrogen supply system as described in claim 1, wherein the hydrogen generating device has means for withdrawing electric energy to outside with the fuel electrode serving as a negative electrode and the oxidizing electrode as a positive electrode.

4. The hydrogen supply system as described in claim 1, wherein the hydrogen generating device has means for providing electric energy from outside with the fuel electrode serving as cathode and the oxidizing electrode as anode.

5. The hydrogen supply system as described in claim 1, wherein voltage between the fuel electrode and the oxidizing electrode is 200 to 1000 mV in the hydrogen generating device.

6. The hydrogen supply system as described in claim 2, wherein voltage between the fuel electrode and the oxidizing electrode is 300 to 800 mV in the hydrogen generating device.

7. The hydrogen supply system as described in claim 3, wherein voltage between the fuel electrode and the oxidizing electrode is 200 to 600 mV in the hydrogen generating device.

8. The hydrogen supply system as described in claim 3, wherein voltage between the fuel electrode and the oxidizing electrode and/or the evolution volume of hydrogen-containing gas are/is adjusted by varying the volume of electric energy withdrawn from the hydrogen generating device.

9. The hydrogen supply system as described in claim 4, wherein voltage between the fuel electrode and the oxidizing electrode is 300 to 1000 mV in the hydrogen generating device.

10. The hydrogen supply system as described in claim 4, wherein voltage between the fuel electrode and the oxidizing electrode and/or the evolution volume of hydrogen-containing gas are/is adjusted by varying the volume of electric energy provided in the hydrogen generating device.

11. The hydrogen supply system as described in claim 1, wherein the evolution volume of hydrogen-containing gas is adjusted by varying voltage between the fuel electrode and the oxidizing electrode in the hydrogen generating device.

12. The hydrogen supply system as described in claim 1, wherein voltage between the fuel electrode and the oxidizing electrode and/or the evolution volume of hydrogen-containing gas are/is adjusted by varying the supply volume of the oxidizing agent in the hydrogen generating device.

13. The hydrogen supply system as described in claim 1, wherein voltage between the fuel electrode and the oxidizing electrode and/or the evolution volume of hydrogen-containing gas are/is adjusted by varying the concentration of the oxidizing agent in the hydrogen generating device.

14. The hydrogen supply system as described in claim 1, wherein voltage between the fuel electrode and the oxidizing electrode and/or the evolution volume of hydrogen-containing gas are/is adjusted by varying the supply volume of fuel containing an organic compound and water in the hydrogen generating device.

15. The hydrogen supply system as described in claim 1, wherein voltage between the fuel electrode and the oxidizing electrode and/or the evolution volume of hydrogen-containing gas are/is adjusted by varying the concentration of fuel containing an organic compound and water in the hydrogen generating device.

16. The hydrogen supply system as described in claim 1, wherein the organic compound supplied to the fuel electrode of the hydrogen generating device is one or two or more organic compounds selected from a group consisting of alcohol, aldehyde, carboxyl acid and ether.

17. The hydrogen supply system as described in claim 1, wherein the oxidizing agent supplied to the oxidizing electrode of the hydrogen generating device is an oxygen-containing gas or oxygen.

18. The hydrogen supply system as described in claim 1, wherein the oxidizing agent supplied to the oxidizing electrode of the hydrogen generating device is a liquid containing hydrogen peroxide solution.

19. The hydrogen supply system as described in claim 1, wherein the partition membrane of the hydrogen generating device is a proton conducting solid electrolyte membrane.

* * * * *